United States Patent
Wee et al.

(10) Patent No.: US 11,616,559 B2
(45) Date of Patent: *Mar. 28, 2023

(54) NON-PERSONAL BASIC SERVICE POINT / ACCESS POINT (PCP/AP) COMMUNICATION DEVICE, NON-PCP/AP COMMUNICATION METHOD, PCP/AP COMMUNICATION DEVICE AND PCP/AP COMMUNICATION METHOD

(71) Applicant: Panasonic Intellectual Property Corporation of America, Torrance, CA (US)

(72) Inventors: Yao Huang Gaius Wee, Singapore (SG); Hiroyuki Motozuka, Kanagawa (JP); Lei Huang, Singapore (SG); Tomoya Urushihara, Kanagawa (JP); Masataka Irie, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 113 days.

This patent is subject to a terminal disclaimer.

(21) Appl. No.: 17/149,599

(22) Filed: Jan. 14, 2021

(65) Prior Publication Data
US 2021/0135738 A1    May 6, 2021

Related U.S. Application Data

(63) Continuation of application No. 16/374,622, filed on Apr. 3, 2019, now Pat. No. 10,944,463, which is a
(Continued)

(30) Foreign Application Priority Data

| Nov. 2, 2016 | (JP) | JP2016-215408 |
| Feb. 22, 2017 | (JP) | JP2017-031029 |
| Apr. 27, 2017 | (JP) | JP2017-088864 |

(51) Int. Cl.
*H04B 7/06* (2006.01)
*H04W 40/24* (2009.01)
(Continued)

(52) U.S. Cl.
CPC ......... *H04B 7/0695* (2013.01); *H04B 7/0469* (2013.01); *H04B 7/06* (2013.01);
(Continued)

(58) Field of Classification Search
CPC ...... H04B 7/0695; H04B 7/0469; H04B 7/06; H04B 7/0617; H04B 7/0623; H04B 7/088;
(Continued)

(56) References Cited

U.S. PATENT DOCUMENTS

| 2006/0164969 A1* | 7/2006 | Malik | H04W 16/28 370/328 |
| 2009/0232103 A1* | 9/2009 | Kesselman | H04W 74/08 370/336 |

(Continued)

FOREIGN PATENT DOCUMENTS

| CN | 103718591 A | 4/2014 |
| CN | 105052199 A | 11/2015 |

(Continued)

OTHER PUBLICATIONS

English Translation of Chinese Search Report dated Sep. 10, 2021 for the related Chinese Patent Application No. 201780062116.X, 3 pages.
(Continued)

*Primary Examiner* — Deepa Belur
(74) *Attorney, Agent, or Firm* — Seed IP Law Group LLP

(57) ABSTRACT

A non-personal basic service set control point/access point (non-PCP/AP) communication apparatus includes a recep-
(Continued)

tion circuit, an estimation circuit, and a transmission circuit. The reception circuit receives a Directional Multi-Gigabit (DMG) Beacon frame including a sector sweep (SSW) field, the SSW field including a Parameter subfield indicating a value obtained by using a transmission Equivalent Isotropic Radiated Power (EIRP) of a PCP/AP communication partner apparatus and a reception antenna gain of the PCP/AP communication partner apparatus. The estimation circuit estimates an expected reception power at the PCP/AP communication partner apparatus by using the value of the Parameter subfield, and checks inequality between the estimated expected reception power and a receiver sensitivity value. The transmission circuit transmits a frame for Association Beamforming Training (A-BFT) if the estimated expected reception power is larger than the receive sensitivity value.

8 Claims, 42 Drawing Sheets

Related U.S. Application Data continuation of application No. PCT/JP2017/034851, filed on Sep. 27, 2017.

(51) Int. Cl.

| | | |
|---|---|---|
| *H04W 80/02* | (2009.01) | |
| *H04W 72/044* | (2023.01) | |
| *H04W 72/0446* | (2023.01) | |
| *H04W 16/28* | (2009.01) | |
| *H04B 7/0456* | (2017.01) | |
| *H04B 7/08* | (2006.01) | |
| *H04W 84/12* | (2009.01) | |

(52) U.S. Cl.
CPC ......... *H04B 7/0617* (2013.01); *H04B 7/0623* (2013.01); *H04B 7/088* (2013.01); *H04W 16/28* (2013.01); *H04W 40/244* (2013.01); *H04W 72/046* (2013.01); *H04W 72/0446* (2013.01); *H04W 80/02* (2013.01); *H04W 84/12* (2013.01)

(58) Field of Classification Search
CPC .. H04B 7/0417; H04W 16/28; H04W 40/244; H04W 72/0446; H04W 72/046; H04W 80/02; H04W 84/12
See application file for complete search history.

(56) References Cited

U.S. PATENT DOCUMENTS

| | | | |
|---|---|---|---|
| 2011/0070928 A1 | 3/2011 | Hsu et al. | |
| 2012/0135728 A1 | 5/2012 | Karpoor et al. | |
| 2012/0287797 A1 | 11/2012 | Basson et al. | |
| 2013/0189929 A1 | 7/2013 | Takahashi et al. | |
| 2014/0159647 A1 | 6/2014 | Nishioka | |
| 2014/0177607 A1 | 6/2014 | Li et al. | |
| 2014/0369330 A1 | 12/2014 | Sinha | |
| 2015/0230263 A1 | 8/2015 | Roy et al. | |
| 2015/0244432 A1* | 8/2015 | Wang | H04B 7/0417 375/267 |
| 2015/0271801 A1* | 9/2015 | Matsuo | H04B 7/2656 370/329 |
| 2016/0190686 A1 | 6/2016 | Gao et al. | |
| 2016/0255463 A1 | 9/2016 | Das et al. | |
| 2016/0255660 A1 | 9/2016 | Son et al. | |
| 2016/0285522 A1 | 9/2016 | Kasher et al. | |
| 2017/0134103 A1 | 5/2017 | Tessandori et al. | |
| 2018/0020389 A1 | 1/2018 | Abdallah et al. | |
| 2018/0054245 A1* | 2/2018 | Trainin | H04W 28/16 |
| 2019/0319693 A1 | 10/2019 | Ciochina et al. | |

FOREIGN PATENT DOCUMENTS

| | | | | |
|---|---|---|---|---|
| EP | 3761518 A1 * | 1/2021 | ........... | H04B 7/0417 |
| WO | 2016/159643 A1 | 10/2016 | | |

OTHER PUBLICATIONS

Alexander Maltsev (Intel): "Near-far self-classification capabilities of EDMG STAs", IEEE Draft; 11-17-0762-04-00AY-NEAR-FAR-SELF-CLASSIFICATION-CAPABILITIES-OF-EDMG-STAS, IEEE-SA Mentor, Piscataway, NJ USA, vol. 802.11ay, No. 4 May 8, 2017 (May 8, 2017), pp. 1-12, XP068116024, Retrieved from the Internet: URL:https://mentor.ieee.org/802.11/dcn/17/11-17-0762-04-00ay-near-far-self-classification-capabilities-of-edmg-stas.pptx [retrieved on May 8, 2017].
Communication pursuant to Article 94(3) EPC dated Jun. 25, 2020 for the related European Patent Application No. 17866761.4, 8 pages.
The Extended European Search Report dated Jul. 25, 2019 for the related European Patent Application No. 17866761.4.
IEEE Computer Society, "Part 11: Wireless LAN Medium Access Control (MAC) and Physical Layer (PHY) Specifications—Amendment 3: Enhancements for Very High Throughput in the 60GHz Band," IEEE Std 802.11adTM-2012, IEEE Standard for Information technology—Telecommunications and information exchange between systems Local and metropolitan area networks—Specific requirements, Dec. 28, 2012, 628 pages.
International Search Report, dated Dec. 19, 2017, for International Application No. PCT/JP2017/034851, 2 pages.
Indian Examination Report dated Nov. 23, 2021 for the related Indian Patent Application No. 201947014642, 4 pages.

* cited by examiner

FIG. 6

| VALUE OF TX EIRP FIELD | VALUE OF EIRP |
|---|---|
| 0 | 0 dBm OR LOWER |
| 1 | 0.5 dBm |
| 2 | 1.0 dBm |
| 3 | 1.5 dBm |
| ... | ... |
| 38 | 19.0 dBm |
| 39 | 19.5 dBm |
| 40 | 20.0 dBm |
| 41 | 20.5 dBm |
| 42 | 21.0 dBm |
| 43 | 21.5 dBm |
| ... | ... |
| 252 | 126.0 dBm |
| 253 | 126.5 dBm |
| 254 | 127 dBm OR HIGHER |
| 255 | UNDEFINED |

FIG. 7

| VALUE OF TX EIRP FIELD | VALUE OF EIRP | ACCURACY OF VALUE OF EIRP |
|---|---|---|
| 0 | 0 dBm OR LOWER | 1 dB |
| 1 | 1.0 dBm | |
| 2 | 2.0 dBm | |
| 3 | 3.0 dBm | |
| ... | ... | |
| 124 | 124.0 dBm | |
| 125 | 125.0 dBm | |
| 126 | 126.0 dBm | |
| 127 | 127 dBm OR HIGHER | |
| 128 | 0 dBm OR LOWER | 3 dB |
| 129 | 3.0 dBm | |
| 130 | 6.0 dBm | |
| 131 | 9.0 dBm | |
| ... | ... | |
| 168 | 120.0 dBm | |
| 169 | 123.0 dBm | |
| 170 | 126.0 dBm | |
| 171 | 127 dBm OR HIGHER | |
| 172 | reserved | reserved |
| ... | | |
| 254 | | |
| 255 | UNDEFINED | UNDEFINED |

FIG. 8

| VALUE OF A-BFT RX Antenna Gain FIELD | VALUE OF A-BFT RX Antenna Gain |
|---|---|
| 0 | 0.0 dBi OR LOWER |
| 1 | 0.5 dBi |
| 2 | 1.0 dBi |
| 3 | 1.5 dBi |
| ... | ... |
| 38 | 19.0 dBi |
| 39 | 19.5 dBi |
| 40 | 20.0 dBi |
| 41 | 20.5 dBi |
| 42 | 21.0 dBi |
| 43 | 21.5 dBi |
| ... | ... |
| 125 | 62.5 dBi |
| 126 | 63.0 dBi |
| 127 | 63.5 dBi OR HIGHER |
| 128 | reserved |
| ... | |
| 254 | |
| 255 | UNDEFINED |

FIG. 9

| VALUE OF A-BFT RX Antenna Gain FIELD | VALUE OF A-BFT RX Antenna Gain | ACCURACY OF VALUE OF A-BFT RX Antenna Gain |
|---|---|---|
| 0 | 0 dBi OR LOWER | 1 dB |
| 1 | 1 dBi | |
| 2 | 2 dBi | |
| 3 | 3 dBi | |
| ... | ... | |
| 60 | 60 dBi | |
| 61 | 61 dBi | |
| 62 | 62 dBi | |
| 63 | 63 dBi OR HIGHER | |
| 64 | 0 dBi OR LOWER | 3 dB |
| 65 | 3.0 dBi | |
| 66 | 6.0 dBi | |
| 67 | 9.0 dBi | |
| ... | ... | |
| 82 | 54.0 dBi | |
| 83 | 57.0 dBi | |
| 84 | 60.0 dBi | |
| 85 | 63 dBi OR HIGHER | |
| 86 | reserved | reserved |
| ... | | |
| 254 | | |
| 255 | UNDEFINED | UNDEFINED |

FIG. 12A

| MCS index | RECEPTION SENSITIVITY (Receive sensitivity) (dBm) |
|---|---|
| 0 | -78 |
| 1 | -68 |
| 2 | -66 |
| 3 | -65 |
| 4 | -64 |
| 5 | -62 |
| 6 | -63 |
| 7 | -62 |
| 8 | -61 |
| 9 | -59 |
| 10 | -55 |
| 11 | -54 |
| 12 | -53 |

FIG. 12B

| MCS index | Data rate (Mbps) |
|---|---|
| 1 | 385 |
| 2 | 770 |
| 3 | 962.5 |
| 4 | 1155 |
| 5 | 1251.25 |
| 6 | 1540 |
| 7 | 1925 |
| 8 | 2310 |
| 9 | 2502.5 |
| 10 | 3080 |
| 11 | 3850 |
| 12 | 4620 |

FIG. 15

| VALUE OF TX EIRP FIELD | VALUE OF EIRP |
|---|---|
| 0 | 0 dBm OR LOWER |
| 1 | 5.0 dBm |
| 2 | 10.0 dBm |
| 3 | 15.0 dBm |
| 4 | 20.0 dBm |
| 5 | 25.0 dBm |
| 6 | 30.0 dBm |
| 7 | 35.0 dBm |
| 8 | 40.0 dBm |
| 9 | 45.0 dBm |
| 10 | 50.0 dBm |
| 11 | 55.0 dBm |
| 12 | 60.0 dBm |
| 13 | 65.0 dBm |
| 14 | 70 dBm OR HIGHER |
| 15 | UNDEFINED |

FIG. 16

| VALUE OF A-BFT RX Antenna Gain FIELD | VALUE OF A-BFT RX Antenna Gain |
|---|---|
| 0 | 0.0 dBi OR LOWER |
| 1 | 5.0 dBi |
| 2 | 10.0 dBi |
| 3 | 15 dBi OR HIGHER |

FIG. 19

| VALUE OF Differential Gain FIELD | DIFFERENCE BETWEEN VALUE OF TX EIRP AND VALUES OF A-BFT RX Antenna Gain | ACCURACY OF VALUE OF Differential Gain |
|---|---|---|
| 0 | 0 dB OR LOWER | 3 dB |
| 1 | 3 dB | |
| 2 | 6 dB | |
| 3 | 9 dB | |
| ... | ... | |
| 28 | 84 dB | |
| 29 | 87 dB | |
| 30 | 90 dB | |
| 31 | 93 dB OR LOWER | |
| 32 | 0 dB OR LOWER | 6 dB |
| 33 | 6.0 dB | |
| 34 | 12.0 dB | |
| 35 | 18.0 dB | |
| ... | ... | |
| 44 | 72.0 dB | |
| 45 | 78.0 dB | |
| 46 | 84.0 dB | |
| 47 | 90 dB OR LOWER | |
| 48 | reserved | reserved |
| ... | | |
| 62 | | |
| 63 | UNDEFINED | UNDEFINED |

FIG. 21

| VALUE OF Relative Beamed TX EIRP FIELD | VALUE OF EIRP_AP_Relative | ACCURACY OF VALUE OF EIRP_AP_Relative |
|---|---|---|
| 0 | 0 dB OR LOWER | 1 dB |
| 1 | 1 dB | |
| 2 | 2 dB | |
| 3 | 3 dB | |
| ... | ... | |
| 60 | 60 dB | |
| 61 | 61 dB | |
| 62 | 62 dB | |
| 63 | 63 dB OR HIGHER | |
| 64 | 0 dB OR LOWER | 3 dB |
| 65 | 3.0 dB | |
| 66 | 6.0 dB | |
| 67 | 9.0 dB | |
| ... | ... | |
| 82 | 54.0 dB | |
| 83 | 57.0 dB | |
| 84 | 60.0 dB | |
| 85 | 63 dB OR HIGHER | |
| 86 ... 254 | reserved | reserved |
| 255 | UNDEFINED | UNDEFINED |

| RTS FRAME | Frame Control | Duration | RA | TA | FCS |

| VALUE OF Differential Gain FIELD | VALUE OF (EIRP_Beacon − RxGain_ABFT − ADD_GAIN_AP) |
|---|---|
| 0 | 0 dB OR LOWER |
| 1 | 6 dB |
| 2 | 12 dB |
| 3 | 18 dB |
| 4 | 24 dB |
| 5 | 30 dB |
| 6 | 36 dB |
| 7 | 42 dB |
| 8 | 48 dB |
| 9 | 54 dB |
| 10 | 60 dB |
| 11 | 66 dB |
| 12 | 72 dB |
| 13 | 78 dB |
| 14 | 84 dB OR HIGHER |
| 15 | UNDEFINED |

FIG. 34

| VALUE OF<br>AP Selection Parameter FIELD | VALUE OF (EIRP_Beacon −<br>RxGain_ABFT − ADD_GAIN_AP) |
| --- | --- |
| 0 | q-omni TX |
| 1 | 9 dB OR LOWER |
| 2 | 12 dB |
| 3 | 15 dB |
| 4 | 18 dB |
| 5 | 21 dB |
| 6 | 24 dB |
| 7 | 27 dB |
| 8 | 30 dB |
| 9 | 33 dB |
| 10 | 36 dB |
| 11 | 39 dB |
| 12 | 42 dB |
| 13 | 45 dB |
| 14 | 48 dB OR HIGHER |
| 15 | UNDEFINED |

FIG. 38

| SSW FIELD (BTI) | Direction | CDOWN | Sector ID | DMG Antenna ID | AP Selection Parameter | Reserved |
|---|---|---|---|---|---|---|
| BITS: | 1 | 9 | 6 | 2 | 4 | 2 |

NON-PERSONAL BASIC SERVICE POINT / ACCESS POINT (PCP/AP) COMMUNICATION DEVICE, NON-PCP/AP COMMUNICATION METHOD, PCP/AP COMMUNICATION DEVICE AND PCP/AP COMMUNICATION METHOD

BACKGROUND

1. Technical Field

The present disclosure relates to a non-personal basic service point/access point (PCP/AP) communication device, a non-PCP/AP communication method, a PCP/AP communication device and a PCP/AP communication method.

2. Description of the Related Art

IEEE 802.11 is one of wireless LAN related standards, one of which is, for example, the IEEE 802.11ad (hereinafter referred to as "11ad standard") (e.g., see IEEE 802.11adTM-2012 pp 278-314). Beamforming (BF) technology is used in the 11ad standard. Beamforming is a method where communication is performed by changing the directionality of one or more antennas of a transmission unit and reception unit included in a wireless terminal, to set antenna directionality so that communication quality, such as reception strength for example, is optimal.

SUMMARY

However, communication areas of wireless terminals are not taken into consideration, there are cases where, even if a first wireless terminal can receive a frame used for training for beamforming from a second wireless terminal, it is difficult for the second wireless terminal receive a frame used for training for beamforming from the first wireless terminal, and it is difficult for the wireless terminals to establish a wireless link.

In communication device according to an aspect of the present disclosure, a wireless device (STA) can determine whether or not an SSW frame in A-BFT will reach a communication device (AP) or not, thereby contributing to providing of a communication device and communication method where unnecessary transmission of SSW frames can be avoided, so electric power consumption of the communication device (STA) can be reduced, and occurrence of unnecessary interference waves as to other STAs can be reduced.

In one general aspect, the techniques disclosed here feature A non-personal basic service point/access point (PCP/AP) communication device, that includes a reception circuit that receives a DMG Beacon frame, a judging circuit that judges whether or not to transmit a frame used for beamforming training (BFT), using information relating to reception antenna gain of a PCP/AP communication device included in a DMG Beacon frame and information relating to reception power of a DMG Beacon frame, and a transmission circuit that transmits the frame used for BFT in a case of the judging circuit having judged to transmit the frame used for BFT.

According to a communication device and communication method of an aspect of the present disclosure, a wireless device (STA) can determine whether or not an SSW frame in A-BFT will reach a communication device (AP) or not, and unnecessary transmission of SSW frames can be avoided, so electric power consumption of the communication device (STA) can be reduced, and occurrence of unnecessary interference waves as to other STAs can be reduced.

It should be noted that general or specific embodiments may be implemented as a system, a device, a method, an integrated circuit, a computer program, a storage medium, or any selective combination of system, device, method, integrated circuit, computer program, and storage medium.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 6 is a diagram illustrating an example of correlation between a value of a TX EIRP field and an EIRP value, according to the first embodiment of the present disclosure;

FIG. 7 is a diagram illustrating another example of correlation between a value of a TX EIRP field and an EIRP value, according to the first embodiment of the present disclosure;

FIG. 8 is a diagram illustrating an example of correlation between a value of an A-BFT RX Antenna Gain field and a value of reception antenna gain of the communication device (AP) in A-BFT, according to the first embodiment of the present disclosure;

FIG. 9 is a diagram illustrating another example illustrating correlation between a value of an A-BFT RX Antenna Gain field and a value of reception antenna gain, according to the first embodiment of the present disclosure;

FIG. 12A is a diagram illustrating an example of values of reception sensitivity levels as to MCS in the 11ad standard, according to the first embodiment of the present disclosure;

FIG. 12B is a diagram illustrating an example of values of maximum throughput as to MCS in the 11ad standard, according to the first embodiment of the present disclosure;

FIG. 15 is a diagram illustrating an example of a value of a TX EIRP field according to the second embodiment of the present disclosure;

FIG. 16 is a diagram illustrating an example of a value of an A-BFT RX Antenna Gain field according to the second embodiment of the present disclosure;

FIG. 19 is a diagram illustrating an example of values of a Differential Gain field according to the second embodiment of the present disclosure;

FIG. 21 is a diagram illustrating an example of values of a Relative Beamed TX EIRP field according to the second embodiment of the present disclosure;

FIG. 29 is a diagram illustrating a format of an RTS frame in the 11ad standard according to the fourth embodiment of the present disclosure;

FIG. 32 is a diagram illustrating an example of a relation between a value of the Differential Gain field and a value of (EIRP_Beacon−RxGain_ABFT−ADD_GAIN_AP), according to a modification of the first and second embodiments of the present disclosure;

FIG. 34 is a diagram illustrating an example of a value of an AP Selection Parameter field according to the fifth embodiment of the present disclosure;

FIG. 38 is a diagram illustrating an example of a format of an SSW field according to the fifth embodiment of the present disclosure;

DETAILED DESCRIPTION

Figure 1:
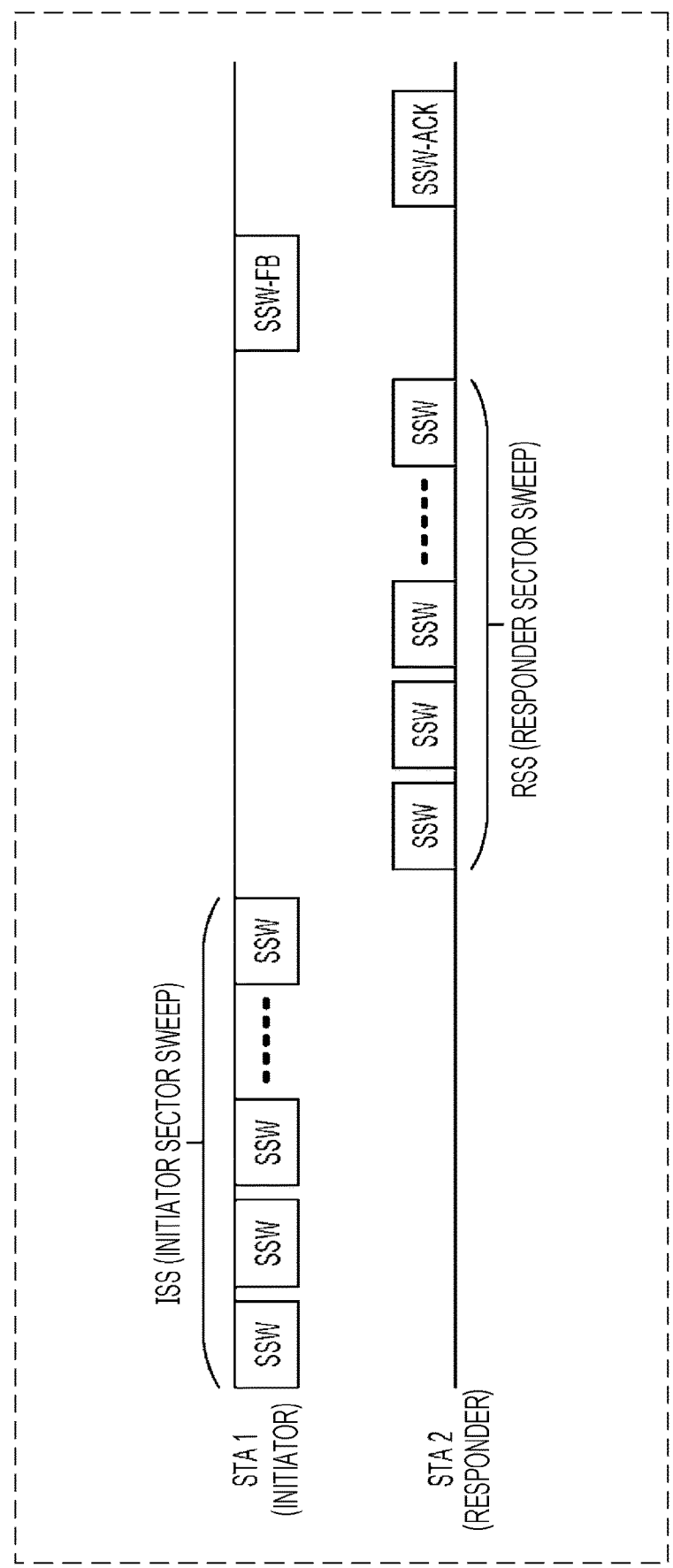
FIG. 1 is a diagram illustrating an example of SLS procedures according to the present disclosure.

In the 11ad standard, procedures called Sector Level Sweep (SLS) are stipulated, to select, from multiple antenna directionality settings (hereinafter referred to as "sector"), an optimal sector. FIG. 1 is a diagram illustrating an example of SLS procedures. SLS is performed between two terminals (hereinafter referred to as "STA", meaning Station). Note that hereinafter, one STA will be referred to as Initiator, and the other as Responder.

First, the Initiator transmits multiple Sector Sweep (SSW) including sector Nos. in the SSW frame while changing sectors. This transmission processing is called Initiator Sector Sweep (ISS). In ISS, the Response measures the reception quality of each SSW frame, and identifies the sector No. of the SSW frame of which the reception quality was the best. This sector at the Initiator corresponding to the sector No. is referred to as the best sector of the Initiator.

Next, the Responder transmits multiple SSW frames while changing sectors. This transmission processing is called Responder Sector Sweep (RSS). In a RSS, the Responder includes a No. of a best sector of the Initiator identified in ISS in the SSW frames and transmits. In RSS, the Initiator measures the reception quality of each SSW frame, and identifies the sector No. included in the SSW frames of which reception quality was the best. The sector at the Responder corresponding to this sector No. is referred to as best sector of the Responder.

Finally, the Initiator includes the No. of the best sector of the Responder identified in RSS in an SSW Feedback (SSW-FB) frame, and transmits. The Responder may, upon receiving the SSW-FB, transmit an SSW-ACK (SSW Acknowledgement) indicating that the SSW-FB has been received.

Although SLS has been described for performing beam forming training for transmission Transmitter Sector Sweep (TXSS), SLS may be used for beam forming training for reception Receiver Sector Sweep (RXSS). A STA that transmits SSW frames sequentially transmits multiple SSW frames in single sectors, and a STA that receives SSW frames switches the sectors of the reception antennas for each SSW frame to receive.

In the 11ad standard, a part of STAs are STAs called Personal basic service point (PCP) and Access point (AP) (hereinafter referred to as PCP/AP). STAs that are not a PCP/AP are referred to as non-PCP/AP STA. Upon starting communication, a non-PCP/AP STA first establishes a wireless link with a PCP/AP.

Figure 2:
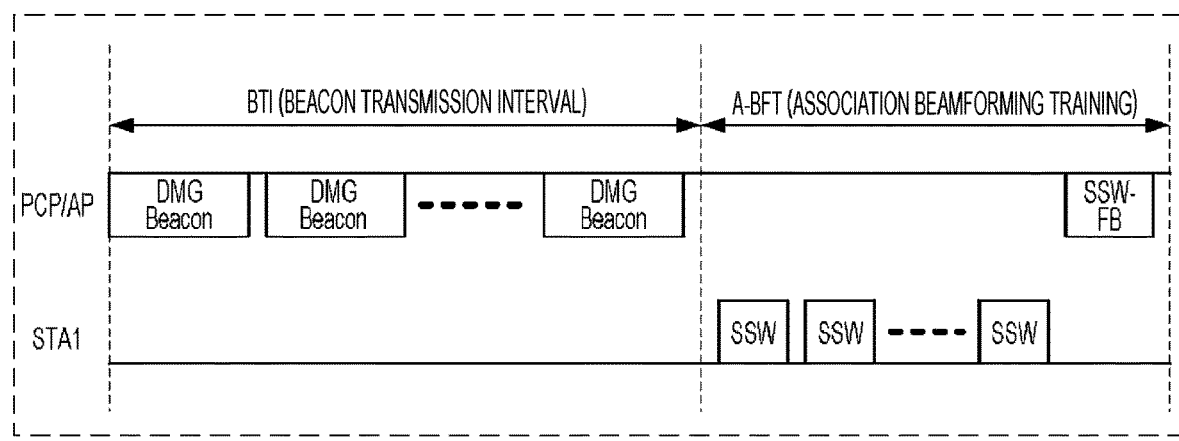
FIG. 2 is a diagram illustrating an example of a method of a PCP/AP and non-AP STA establishing a wireless link according to the present disclosure.

FIG. 2 illustrates an example of a method for establishing a wireless link between a PCP/AP and a non-PCP/AP STA. The PCP/AP transmits multiple Directional Multi-Gigabit Beacon (DMG Beacon) frames while changing sectors.

In the 11ad standard, the duration of the PCP/AP transmitting a DMG Beacon is called a Beacon Transmission Interval (BTI). A period called Association Beamforming Training (A-BFT) may be set following the BTI.

In the A-BFT, A STA1 (non-PCP/AP STA) transmits multiple SSW frames while changing sectors. In a case where SSW frames are received in A-BFT, the PCP/AP includes information identifying SSW frames of which the reception quality was good in a SSW-FB (SSW Feedback) frame, and transmits to the STA1.

As described above, in a case of having received a DMG Beacon, a non-PCP/AP STA transmits SSW frames in the A-BFT, and establishes a wireless link with the PCP/AP. However, the antennas of the PCP/AP and non-PCP/AP STA do not take into consideration communication area of the antenna, so there are cases where it is difficult for the PCP/AP to receive SSW frames in A-BFT even if the non-PCP/AP STA is capable of receiving DMG Beacon frames, and establishing of a wireless link between the PCP/AP and non-AP STA is difficult. Also, the non-AP STA transmits unnecessary SSW frames even though establishing of a wireless link between the PCP/AP and non-AP STA is difficult, which increases electric power consumption, and causes unnecessary interference for other STAs.

Figure 3A:
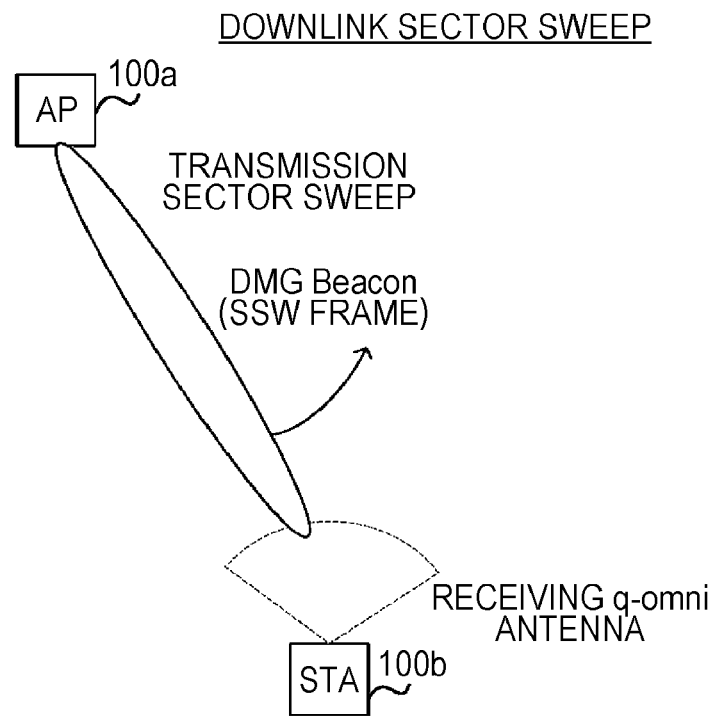
FIG. 3A is a diagram illustrating an example of PCP/AP operations in a downlink sector sweep regarding a non-PCP/AP STA according to the present disclosure.

FIG. 3A illustrates an example of operations of a PCP/AP (hereinafter, communication device (AP) 100a) in a downlink sector sweep as to a non-PCP/AP STA (hereinafter, communication device (STA) 100b). A downlink sector sweep is processing of the PCP/AP transmitting DMG Beacon frames in FIG. 2, for example. A downlink sector sweep may also be the ISS in FIG. 1.

The communication device (AP) 100a uses a transmitting array antenna 106 (see FIG. 4) to transmit DMG Beacon frames while changing sectors. The best sector is unknown, i.e., optimal settings of a receiving array antenna 116 (see FIG. 4) for communicating with the communication device (AP) 100a are unknown to the communication device (STA) 100b, so the communication device (STA) 100b performs DMG Beacon reception using a receiving quasi-omnidirectional (q-omni) antenna 115 (see FIG. 4).

Figure 3B:
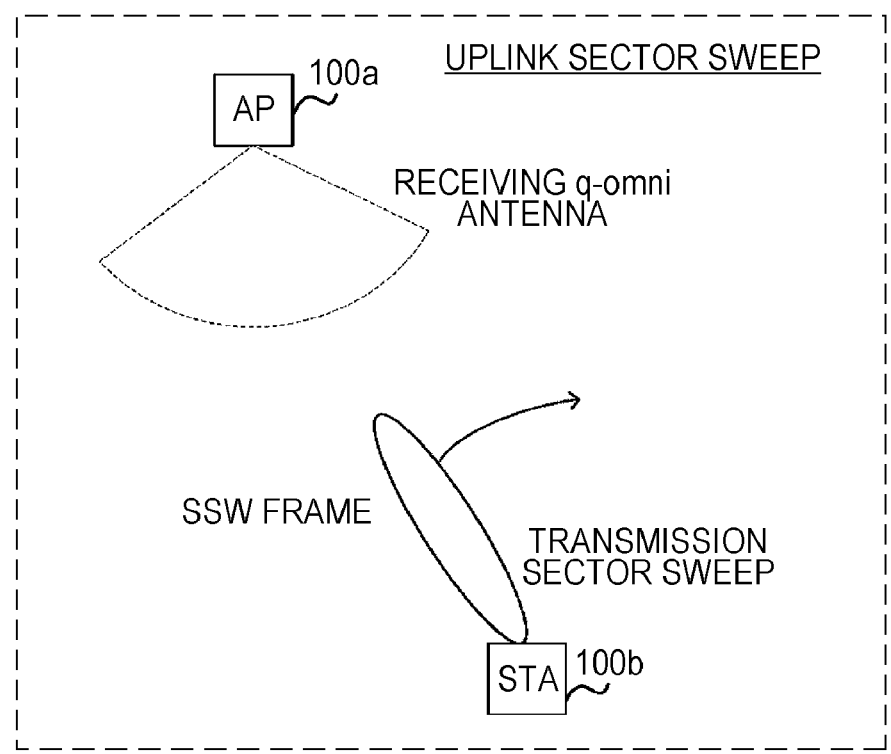
FIG. 3B is a diagram illustrating an example of non-PCP/AP STA operations in an uplink sector sweep regarding a PCP/AP according to the present disclosure.

FIG. 3B illustrates an example of operations of the non-PCP/AP STA (communication device (STA) 100b) in an uplink sector sweep as to the PCP/AP (communication device (AP) 100a). An uplink sector sweep is processing of the non-PCP/AP STA transmitting SSW frames in the A-BFT in FIG. 2, for example. Note that FIG. 3B illustrates a state where the communication device (AP) 100a does not receive SSW frames of the communication device (STA) 100b.

The communication device (STA) 100b transmits SSW frames while changing sectors, using the transmitting array antenna 106. The best sector is unknown, i.e., optimal settings of the receiving array antenna 116 for communicating with the communication device (STA) 100b are unknown to the communication device (AP) 100a, so the communication device (AP) 100a performs SSW frame reception using the receiving q-omni antenna 115.

The gain is different between the transmitting array antennas 106 (see FIG. 4) and receiving q-omni antennas 115 of the communication device (AP) 100a and communication device (STA) 100b, so in FIG. 3A the communication device (STA) 100b receives DMG Beacons, while in FIG. 3b the communication device (AP) 100a does not receive SSW frames.

For example, the communication device (AP) 100a has the transmitting array antenna 106 that includes a great number of elements, and the transmitting array antenna 106 of the communication device (STA) 100b has a smaller number of antenna elements as compared to the communication device (AP) 100a. In this case, the transmitting antenna gain of the communication device (AP) 100a is great, and the input power to the transmitting array antenna is great. That is to say, the communication device (AP) 100a has greater EIRP (Equivalent Isotropic Radiated Power) as compared to the communication device (STA) 100b.

In a case where the communication device (STA) 100b receives one or more DMG Beacons or SSW frames in the downlink sector sweep in FIG. 3A, the communication device (AP) 100a receives one or more SSW frames in an uplink sector sweep that is omitted from illustration, communication between the communication device (AP) 100a and communication device (STA) 100b is established. At this time, the best sector is known to the communication device (AP) 100a and communication device (STA) 100b.

After the sector sweep, the communication device (AP) 100a and communication device (STA) 100b may carry out procedures for Beam Refinement Protocol (BRP) stipulated in the 11ad standard to perform beamforming training with even higher precision. BRP enables the communication device (AP) 100a and communication device (STA) 100b to strengthen directionality of the best sector and increase gain.

However, it is difficult for the communication device (AP) 100a to decide a best sector with increased gain by the downlink sector sweep in FIG. 3A. The reason is that a sector with increased gain has strong directionality and the beam width is small, so a great number of DMG Beacon and SSW frames need to be transmitted in the sector sweep for the DMG Beacon and sector frames to reach the communication device (STA) 100b, so the sector sweep takes a greater amount of time.

On the other hand, it is difficult for the communication device (AP) 100a to perform BRP before the sector sweep is completed. The reason is that the best sector is unknown to the communication device (AP) 100a, so it is difficult to get the communication device (STA) 100b to receive a BRP packet for performing BRP. That is to say, the communication device (AP) 100a can reduce the time for the sector sweep by mid-level directionality illustrated in FIG. 3, i.e., broadening the beam width in FIG. 3C, and once the best sector has been decided, use BRP to decide the best sector with increased gain.

After having decided the best sector for the transmitting array antenna 106 by the sector sweep, the communication device (AP) 100a and communication device (STA) 100b may carry out the BRP procedures and perform training for the receiving array antenna 116. Accordingly, the communication device (AP) 100a and communication device (STA) 100b decide the best sector for the receiving array antenna 116.

Note that after having decided the best sector for the transmitting array antenna 106, the communication device (AP) 100a and communication device (STA) 100b may decide the best sector for the receiving array antenna 116 using SLS (e.g., FIG. 1), or may carry out a combination of SLS and BRP. There are cases where the best sector for the transmitting array antenna 106 and the best sector for the receiving array antenna 116 are different.

Figure 3C:
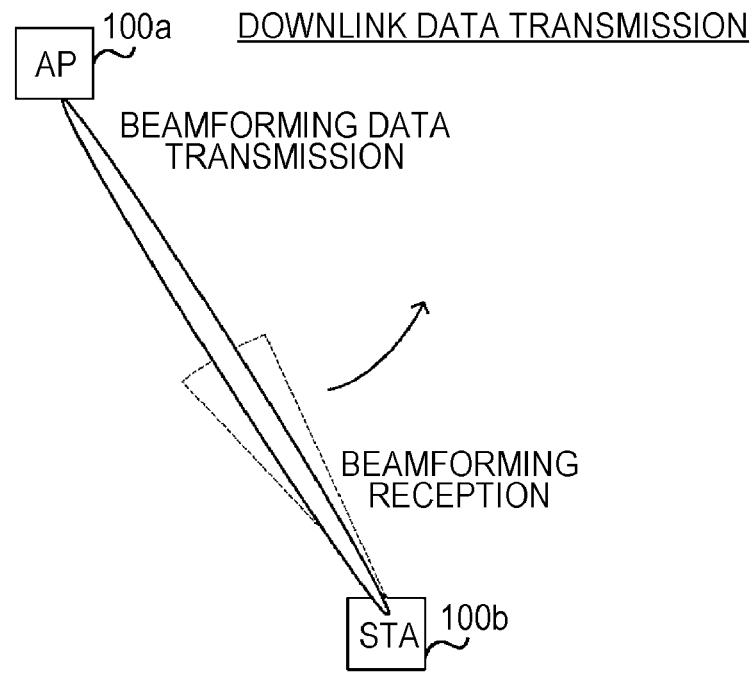
FIG. 3C is a diagram illustrating an example of PCP/AP operations in downlink data transmission as to a non-PCP/AP STA according to the present disclosure.

FIG. 3C illustrates an example of operations of the communication device (AP) 100a in downlink data transmission as to the communication device (STA) 100b. The communication device (AP) 100a sets the transmitting array antenna 106 to the best sector with gain increased by BRP, and performs data frame transmission. That is to say, in FIG. 3C, the communication device (AP) 100a uses a beam with a narrower width than the beam used in FIG. 3A, so the best sector used by the communication device (AP) 100a has a higher gain and stronger directionality as compared to the sector used in FIG. 3A. In FIG. 3C, the communication device (STA) 100b sets the receiving array antenna 116 to the best sector, and receives data frames.

Figure 3D:
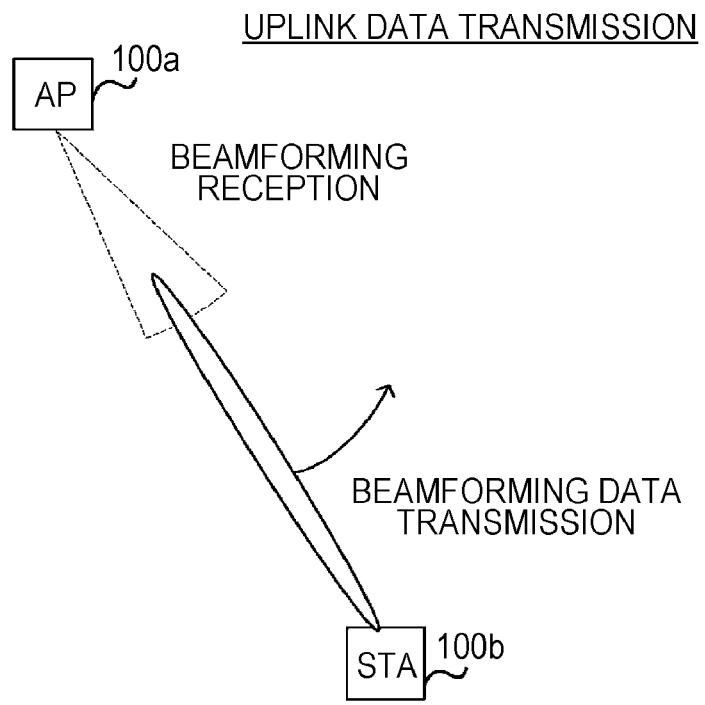
FIG. 3D is a diagram illustrating an example of non-PCP/AP STA operations in uplink data transmission as to a PCP/AP according to the present disclosure.

FIG. 3D illustrates an example of operations of the communication device (STA) 100b in uplink data transmission as to the communication device (AP) 100a. The communication device (STA) 100b sets the transmitting array antenna 106 to the best sector with gain increased by BRP, and performs data frame transmission. In FIG. 3D, the communication device (STA) 100b uses a beam with a narrower width than the beam used in FIG. 3B, so the best sector used by the communication device (STA) 100b has a higher gain and stronger directionality as compared to the sector used in FIG. 3B. In FIG. 3D, the communication device (AP) 100a sets the receiving array antenna 116 to the best sector, and receives data frames.

Thus, in each of a case where the communication device (AP) 100a transmits a DMG Beacon (e.g., FIG. 3A), a case where the communication device (STA) 100b transmits a response to a DMG Beacon (e.g., FIG. 3B), a case where the communication device (AP) 100a transmits a data packet (e.g., FIG. 3C), and a case where the communication device (STA) 100b transmits a data packet (e.g., FIG. 3D), the transmitting antenna gain and receiving antenna gain are different, so it is difficult for the communication device (STA) 100b to judge whether or not a wireless link with the communication device (AP) 100a can be established based on the reception power of a DMG Beacon. It is also difficult for the communication device (STA) 100b to judge whether or not desired data throughput can be realized based on the reception power of a DMG Beacon.

The Specification of U.S. Pat. No. 8,521,158 discloses a method of transmitting a Beacon frame with EIRP and Threshold value of reception power included. Accordingly, in a case where the AP and STA are omni-directional, the STA can determine whether or not a wireless link can be established with the AP.

However, in the Specification of U.S. Pat. No. 8,521,158, no consideration is given to the communication device (AP) 100a switching to the receiving q-omni antenna 115 in a case where the communication device (STA) 100b performs a sector sweep, so it is difficult in FIG. 3B for the communication device (STA) 100b to determine whether or not a wireless link can be established with the communication device (AP) 100a.

Also, in the Specification of U.S. Pat. No. 8,521,158, no consideration is given to the communication device (STA) 100b setting the receiving array antenna 116 to the best sector in a case where the communication device (AP) 100a performs downlink data transmission. Accordingly, in a case of the communication device (AP) 100a performing downlink data transmission, it is difficult for the communication device (STA) 100b to judge whether or not predetermined data throughput can be realized based on reception power of DMG Beacon.

Also, in the Specification of U.S. Pat. No. 8,521,158, no consideration is given to the communication device (AP) setting the receiving array antenna 116 to the best sector in a case of the communication device (STA) performing transmission. Accordingly, when performing uplink transmission, it is difficult for the communication device (STA) to judge whether or not predetermined data throughput can be realized based on reception power of DMG Beacon.

That is to say, even if it is difficult for the communication device (STA) 100b to establish a wireless link with the communication device (AP) 100a, SSW frame transmission in A-BFT is performed, so electric power consumption increases, and unnecessary interference to other STAs occurs.

Also, the communication device (STA) performs SSW frame transmission in A-BFT even though realization of desired data throughput is difficult when performing downlink and uplink data transmission, so electric power consumption increases, and other STAs are subjected to unnecessary interference.

Based on the above, it is an object of the communication device according to the embodiments of the present disclosure that will be described below, to determine whether or not an SSW frame will reach a communication device that is a communication partner in A-BFT.

First Embodiment

In a first embodiment, description will be made regarding a method of the communication device (STA) 100b determining whether or not the communication device (AP) 100a can receive an SSW frame in an uplink sweep, using DMG Beacon reception power, and reception gain of the quasi-omnidirectionality (quasi-omni) antenna of the communication device (AP) 100a used at the time of the uplink sector sweep included in the DMG Beacon in a downlink sector sweep.

Figure 4:
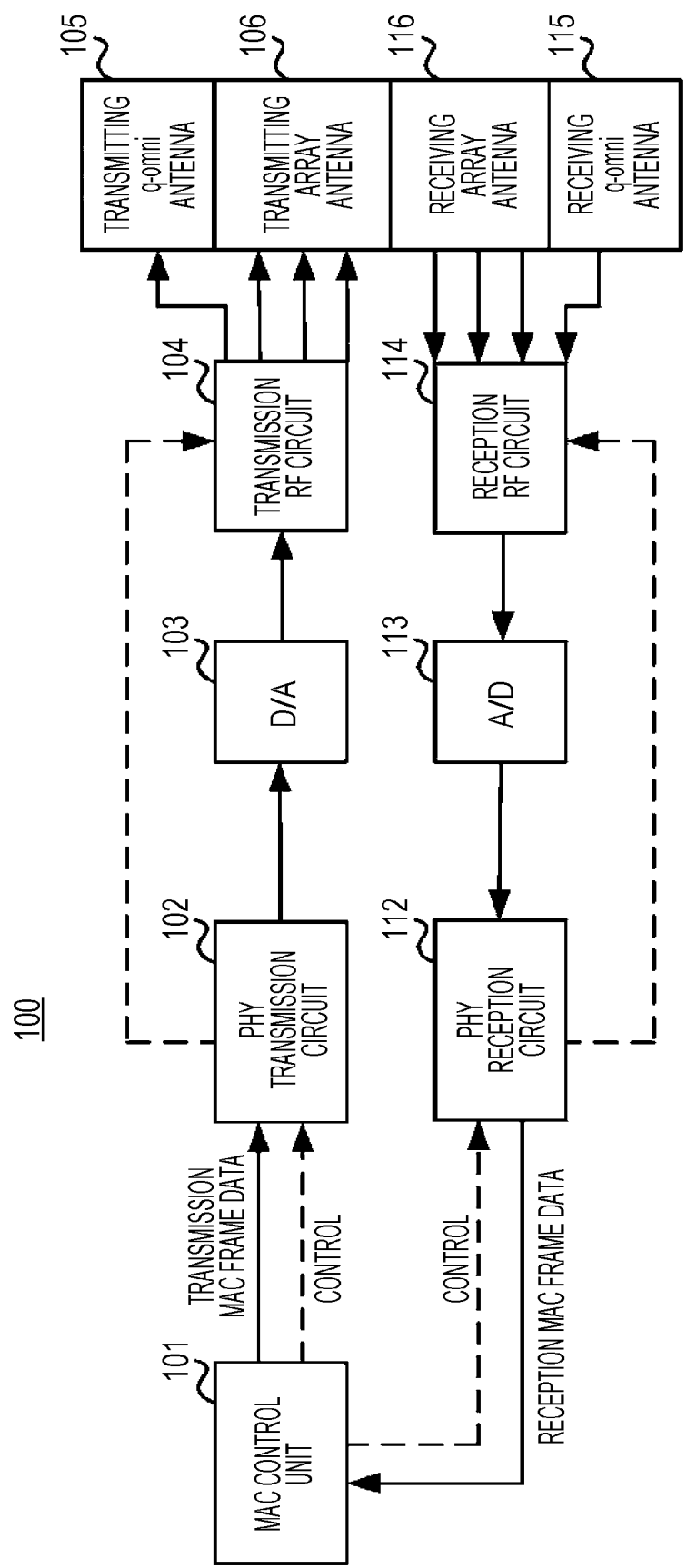
FIG. 4 is a diagram illustrating an example of the configuration of a communication device according to a first embodiment of the present invention.

FIG. 4 is a diagram illustrating an example of the configuration of a communication device 100 according to the present disclosure. The communication device 100 includes a MAC control unit 101, a PHY transmission circuit 102, a D/A converter 103, a transmission RF circuit 104, a transmitting q-omni antenna 105, the transmitting array antenna 106, a PHY reception circuit 112, an A/D converter 113, a reception RF circuit 114, the receiving q-omni antenna 115, and the receiving array antenna 116.

The MAC control unit 101 generates transmission MAC frame data. For example, the MAC control unit 101 generates SSW frame data in the ISS in SLS procedures, and outputs to the PHY transmission circuit 102. The MAC control unit 101 also outputs control information for appropriate encoding and modulation of the generated transmission MAC frame (including header information of the PHY frame and information relating to transmission timing) to the PHY transmission circuit 102.

The PHY transmission circuit 102 performs encoding processing and modulation processing based on the transmission MAC frame data and control information input from the MAC control unit 101, and generates PHY frame data. The generated PHY frame is converted into analog signals by the D/A converter 103, and is converted into wireless signals by the transmission RF circuit 104.

The PHY transmission circuit 102 controls the transmission RF circuit 104. Specifically, the PHY transmission circuit 102 performs setting of center frequency in accordance with a specified channel, control of transmission power, and control of directionality, with regard to the transmission RF circuit 104.

The transmitting q-omni antenna 105 transmits wireless signals input from the transmission RF circuit 104 as quasi-omnidirectional wireless signals. Note that q-omni is short for quasi-omnidirectionality (quasi-omni).

The transmitting array antenna 106 transmits wireless signals input from the transmission RF circuit 104 as wireless signals having directionality. The transmitting array antenna 106 does not have to be an array configuration, but will be referred to as an array antenna to clarify that directionality is controlled.

The transmitting q-omni antenna 105 has a broader beam width as compared with the transmitting array antenna 106. On the other hand, the transmitting array antenna 106 has a larger gain in a particular direction as compared to other directions, in accordance with control of directionality. The gain of the transmitting array antenna 106 in a particular direction may be larger than the gain of the transmitting q-omni antenna 105.

The input power from the transmission RF circuit 104 may be greater for the transmitting array antenna 106 as compared to the transmitting q-omni antenna 105. For example, in a case where the transmission RF circuit 104 has a transmission amplifier for each antenna element making up the transmitting q-omni antenna 105 and transmitting array antenna 106, the transmitting array antenna 106 that has a great number of antenna elements has a greater input power than the transmitting q-omni antenna 105 that has few antenna elements.

The communication device 100 may transmit quasi-omnidirectional wireless signals using the transmitting array antenna 106. That is to say, the transmitting array antenna 106 may include the transmitting q-omni antenna 105.

For example, in the communication device 100, the transmitting array antenna 106 has multiple antenna elements, and the transmitting array antenna 106 transmits wireless signals with directionality by the transmission RF circuit 104 being controlled so as to input power to the multiple antenna elements. Also, in the communication device 100, the transmitting array antenna 106 transmits quasi-omnidirectional wireless signals by the transmission RF circuit 104 being controlled to input power to one or more of the multiple antenna elements of the transmitting array antenna 106. Note that it is sufficient for quasi-omnidirectional wireless signals to use a smaller count of antenna elements than when transmitting directional wireless signals.

The receiving q-omni antenna 115 outputs wireless signals, received from the communication device that is a communication partner, to the reception RF circuit 114. The receiving q-omni antenna 115 has quasi-omnidirectionality in the relationship between direction of arrival of wireless signals and gain.

The receiving array antenna 116 outputs wireless signals to the reception RF circuit 114. The receiving array antenna 116 has stronger directionality than the receiving q-omni antenna 115 in the relationship between direction of arrival of wireless signals and gain. The receiving array antenna 116 does not have to be an array configuration, but will be referred to as an array antenna to clarify that directionality is controlled.

The receiving q-omni antenna 115 has a broader beam width as compared to the receiving array antenna 116. On the other hand, the receiving array antenna 116 has a greater gain in a particular direction as compared to other directions, in accordance with control of directionality. The gain of the receiving array antenna 116 in the particular direction may be larger than that of the receiving q-omni antenna 115.

The reception RF circuit 114 convers the wireless signals that the receiving q-omni antenna 115 and receiving array antenna 116 have received into baseband signals. the A/D converter 113 converts the baseband signals from analog signals into digital signals.

The PHY reception circuit 112 subjects the received digital baseband signals to synchronization, channel estimation, equalization, and demodulation, for example, to obtain reception PHY frames. Further, the PHY reception circuit 112 performs header signal analysis of the reception PHY frames and error-correction decoding, to generate reception MAC frame data.

The reception MAC frame data is input to the MAC control unit 101. The MAC control unit 101 analyzes the contents of the reception MAC frame data, transmits the data to an upper layer (omitted from illustration), and generates transmission MAC frame data to perform responds in accordance to the reception MAC frame data. For example, in a case of having judged that the final SSW frame of ISS in SLS procedures has been received, the MAC control unit 101 generates an SSW frame for RSS including appropriate SSW feedback information, and inputs to the PHY transmission circuit as transmission MAC frame data.

The PHY reception circuit 112 controls the reception RF circuit 114. Specifically, the PHY reception circuit 112 performs setting of center frequency in accordance with a specified channel, control of reception power including Automatic Gain Control (AGC), and control of directionality, with regard to the reception RF circuit 114.

The MAC control unit 101 also controls the PHY reception circuit 112. Specifically, the MAC control unit 101 performs starting or stopping of reception, and starting or stopping of Carrier Sense, with regard to the PHY reception circuit 112.

Figure 5:
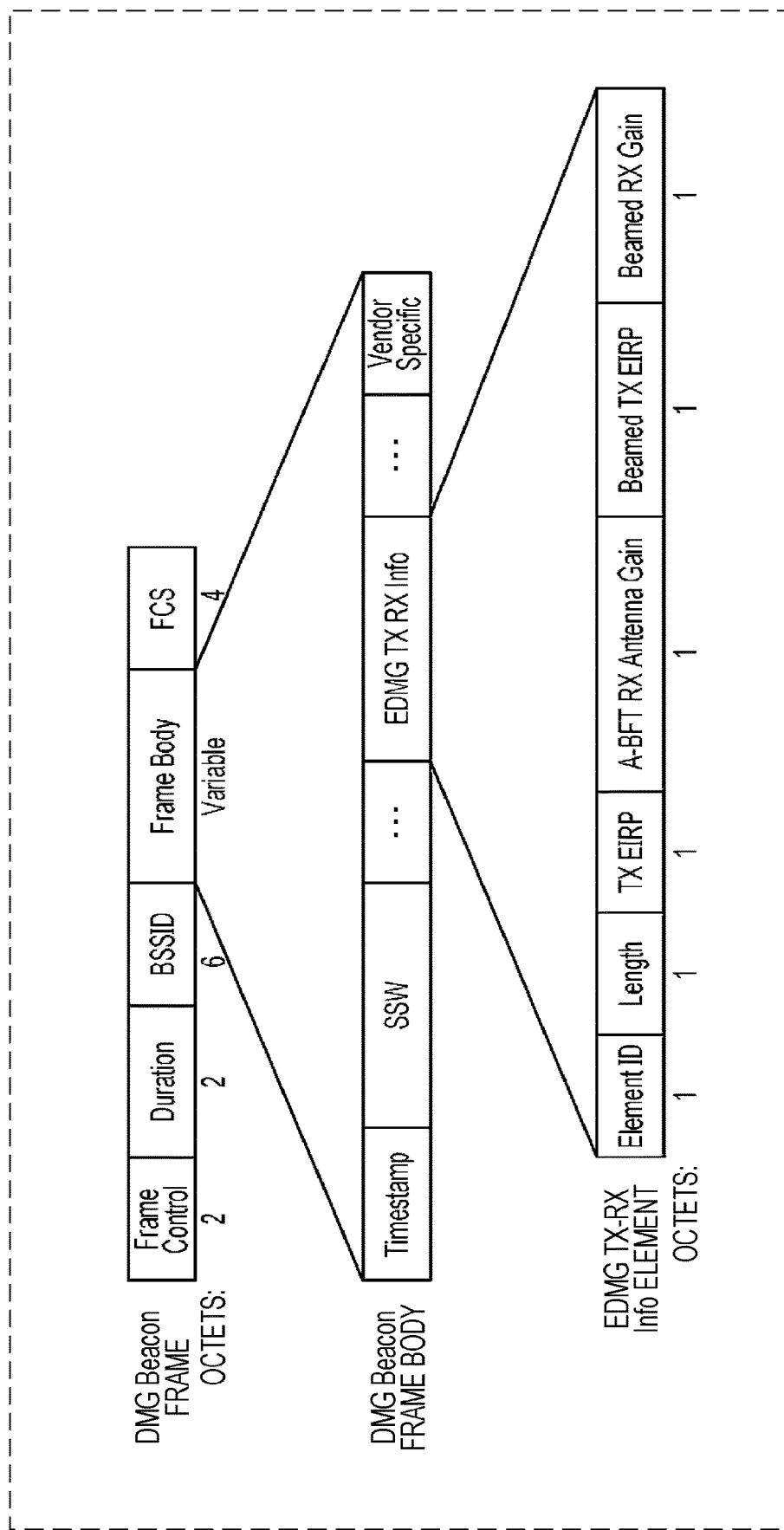
FIG. 5 is a diagram illustrating an example of a DMB Beacon frame that a communication device (AP) according to the first embodiment of the present disclosure transmits.

FIG. 5 illustrates an example of a DMB Beacon frame that the communication device (AP) 100a transmits. A DMB Beacon frame includes a Frame Body field. The Frame Body field includes an EDMG TX RX Info element. The EDMG TX RX Info element includes an Element ID field, a Length field, a TX EIRP field, an A-BFT RX Antenna Gain field, a Beamed TX EIRP field, and a Beamed RX Gain field. The communication device (STA) 100b uses the EDMG TX RX Info element to judge whether or not to perform an uplink sector sweep.

The fields that the EDMG TX RX Info element includes will be described in detail. The Element ID field includes an ID unique to the EDMG TX RX Info element. That is to say, this is a field indicating that the Frame Body field includes the EDMG TX RX Info element.

The Length field indicates the length of the EDMG TX RX Info element in increments of octets. In FIG. 5, the EDMG TX RX Info element is made up of six octets, so the value of the Length field is 6.

The TX EIRP field includes an EIRP in a case where the communication device (AP) 100*a* is to transmit a DMG Beacon. FIG. 6 illustrates an example of correlation between values of the TX EIRP field and values of EIRP.

In a case where the value of the EIRP in the DMG Beacon that the communication device (AP) 100*a* is to transmit (hereinafter, EIRP) is 0 dBm or lower, the communication device (AP) 100*a* sets the value of the TX EIRP field to 0. In a case where the EIRP exceeds 0 dBm but lower than 127 dBm, the communication device (AP) 100*a* doubles the value of the EIRP and sets the closest integer value in the TX EIRP field. In a case where the EIRP is 127 dBm or higher, the communication device (AP) 100*a* sets the value of the TX EIRP field to 254. Also, in a case where the value of the EIRP is not to be notified to the communication device (STA) 100*b*, the communication device (AP) 100*a* sets the value of the TX EIRP field to 255.

The communication device (AP) 100*a* may transmit each DMG Beacon at the same EIRP. Alternatively, the communication device (AP) 100*a* may transmit each DMG Beacon at a different EIRP. For example, in the communication device (AP) 100*a*, the EIRP changes in accordance with the directionality pattern by changing the directionality of the transmitting array antenna 106. The communication device (AP) 100*a* includes the value of the EIRP in each DMG Beacon in the TX EIRP field of each DMG Beacon.

The communication device (AP) 100*a* may transmit part of the DMG Beacon by the transmitting q-omni antenna 105, and the remainder of the DMG Beacon by the transmitting array antenna 106. In a case of the communication device (AP) 100*a* transmitting the DMG Beacon by the transmitting q-omni antenna 105, the value of the EIRP of the transmitting q-omni antenna 105 is included in the TX EIRP field. The EIRP of the transmitting q-omni antenna 105 is smaller than the EIRP of the transmitting array antenna 106, so the communication device (STA) 100*b* may reference the value of the received TX EIRP field and distinguish whether the received DMG Beacon is a quasi-omnidirectional wireless signal or a directional wireless signal.

The communication device (AP) 100*a* may also change the transmission power and gain for each DMG Beacon when transmitting. The communication device (AP) 100*a* may set an EIRP value in accordance with the transmission power and gain of each DMG Beacon, in the TX EIRP field of each DMG Beacon, and transmit. For example, the communication device (AP) 100*a* may make settings whether the gain is maximum when directionality is controlled to the frontal direction, and the gain is several dB smaller as compared to the maximum gain when directionality is controlled to a direction different from the frontal direction.

FIG. 7 illustrates a different example illustrating the correlation between the value of the TX EIRP field and the EIRP value. In a case where the accuracy of the EIRP of the communication device (AP) 100*a* is 1 dB, the communication device (AP) 100*a* sets the value of the TX EIRP field to one of 0 through 127. For example, in a case where the accuracy of the EIRP is 1 dB and the value of the EIRP is 3 dBm, the communication device (AP) 100*a* sets the value of the TX EIRP field to 3.

In a case where the accuracy of the EIRP of the communication device (AP) 100*a* is 3 dB, the communication device (AP) 100*a* sets the value of the TX EIRP field to one of 128 through 171. For example, in a case where the EIRP is 6 dBm, the value of the TX EIRP field is set to 130.

The A-BFT RX Antenna Gain field includes the receiving antenna gain of the communication device (AP) 100*a* in A-BFT, i.e., the receiving antenna gain of the receiving q-omni antenna 115.

FIG. 8 illustrates an example of the correlation between the value of the A-BFT RX Antenna Gain field and the value of the receiving antenna gain of the communication device (AP) 100*a* in A-BFT. In a case where the value of receiving antenna gain of the communication device (AP) 100*a* in A-BFT (hereinafter, receiving antenna gain) is 0 dBi or lower, the communication device (AP) 100*a* sets the value of the A-BFT RX Antenna Gain field to 0. In a case where the receiving antenna gain is more than 0 dBi but less than 63.5 dBi, the communication device (AP) 100*a* doubles the value of receiving antenna gain and sets the closest integer value to the A-BFT RX Antenna Gain field. In a case where the receiving antenna gain is 63.5 dBi or grater, the communication device (AP) 100*a* sets the value of the A-BFT RX Antenna Gain field to 254. Also, in a case of not notifying the value of the receiving antenna gain to the communication device (STA) 100*b*, the communication device (AP) 100*a* sets the value of the A-BFT RX Antenna Gain field to 255.

FIG. 9 illustrates a different example illustrating the correlation between the value of the A-BFT RX Antenna Gain field and the value of the receiving antenna gain. In a case where the accuracy of the receiving antenna gain of the communication device (AP) 100*a* is 1 dB, the communication device (AP) 100*a* sets the value of the A-BFT RX Antenna Gain field to one of 0 through 63. For example, in a case where the accuracy of the receiving antenna gain is 1 dBi, and the receiving antenna gain is 3 dBi, the value of the A-BFT RX Antenna Gain field is set to 3.

Also, in a case where the accuracy of the reception antenna gain is 3 dB, the communication device (AP) 100*a* sets the value of the A-BFT RX Antenna Gain field to either 64 or 85. For example, in a case where the accuracy of the reception antenna gain is 3 dB and the reception antenna gain is 6 dBi, the value of the A-BFT RX Antenna Gain field is set to 66.

Note that in A-BFT, the communication device (AP) 100*a* receives SSW frames using the antenna that has the broadest beam width, so the A-BFT RX Antenna Gain field may be referred to as Wide RX Antenna Gain field.

The Beamed Tx EIRP field includes the value of the EIRP in transmission of data packets by the communication device (AP) 100*a*. That is to say, this is antenna gain used in a case where the communication device (AP) 100*a* controls the transmitting array antenna 106 to perform transmission by beamforming. The communication device (AP) 100*a* sets the value of the Beamed Tx EIRP field in the same way as in FIG. 6 or FIG. 7.

The Beamed Rx Gain field includes the value of the receiving antenna gain in reception of data packets by the communication device (AP) 100*a*. That is to say, this is antenna gain used in a case of the communication device (AP) 100*a* controlling the receiving array antenna 116 and performing reception by beamforming. The communication device (AP) 100*a* sets the value of the Beamed Rx Gain field in the same way as in FIG. 8 or FIG. 9.

Figure 10:
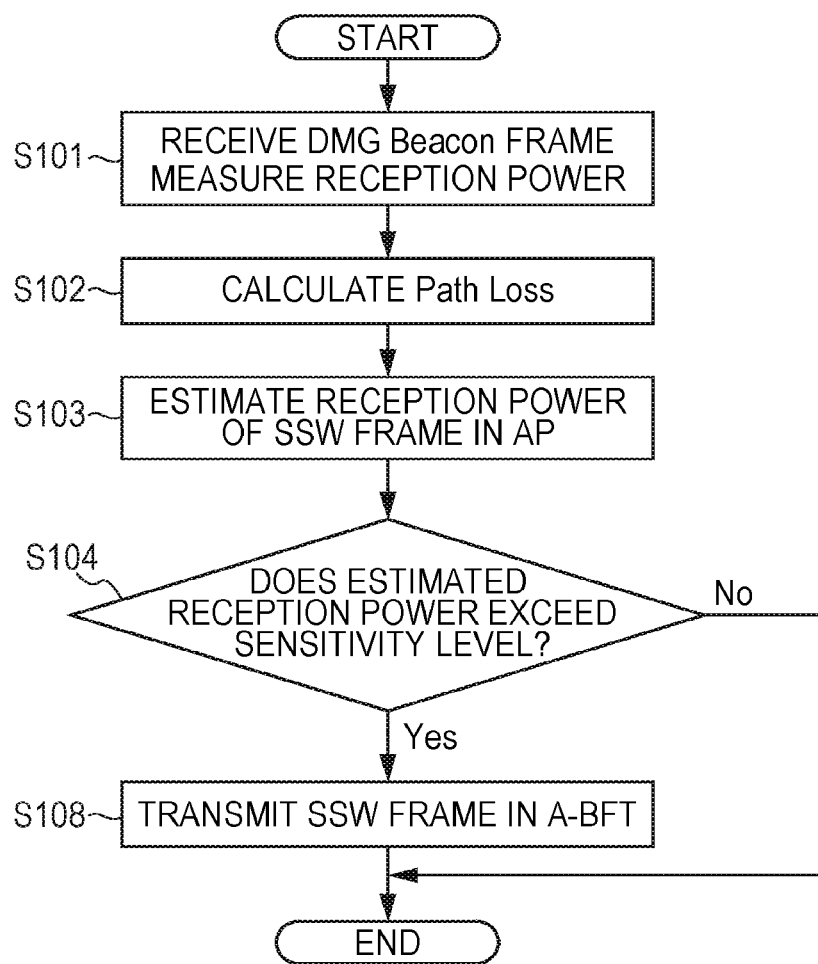
FIG. 10 is a flowchart illustrating an example of reception processing of the DMG Beacon frame in FIG. 5 by a communication device (STA) according to the first embodiment of the present disclosure.

FIG. 10 illustrates an example of reception processing of the DMG Beacon frame in FIG. 5 by the communication device (STA) 100*b*. The communication device (STA) 100*b* judges whether or not connection can be made to the communication device (AP) 100*a* in an uplink sector sweep, by performing reception processing of a DMG Beacon frame.

In step S101, the communication device (STA) 100b receives a DMG Beacon frame and measures the reception power. The communication device (STA) 100b may convert the reception power into RSSI (Receive signal strength indicator). Hereinafter, the converted reception power will be written as RSSI_Beacon (in units of dBm).

Note that in step S101, in a case where the communication device (STA) 100b has received multiple DMG Beacon frames, the reception power of the DMG Beacon frame of which the reception quality is best is set as the RSSI_Beacon.

Also, the value of the EIRP, where the value of the TX EIRP field of the DMG Beacon frame received by the communication device (STA) 100b has been converted using FIG. 6 or FIG. 7, is set as EIRP_Beacon (in units of dBm).

Also, the value of the receiving antenna gain, where the value of the A-BFT RX Antenna Gain field of the DMG Beacon frame received by the communication device (STA) 100b has been converted using FIG. 8 or FIG. 9, is set as RxGain_ABFT (in units of dBi).

Also, the value of the EIRP, where the value of the Beamed Tx EIRP field of the DMG Beacon frame received by the communication device (STA) 100b has been converted using FIG. 6 or FIG. 7, is set as EIRP_AP_Data (in units of dBm).

Also, the value of the receiving antenna gain, where the value of the Beamed RX Gain field of the DMG Beacon frame received by the communication device (STA) 100b has been converted using FIG. 8 or FIG. 9, is set as RxGain_AP_Data (in units of dBm).

In step S102, the communication device (STA) 100b uses Expression 1 to calculate loss on the propagation channel (hereinafter referred in as PathLoss_Beacon (in increments of dB)) in FIG. 3A.

$$PathLoss\_Beacon = EIRP\_Beacon + RxGain\_Beacon - RSSI\_Beacon \quad \text{(Expression 1)}$$

In Expression 1, RxGain_Beacon is the receiving antenna gain of the communication device (STA) 100b in FIG. 3A (i.e., gain of the receiving q-omni antenna).

In step S103, the communication device (STA) 100b uses Expression 2 to estimate the power (referred to as RSSI_ABFT, in units of dBm) of the communication device (AP) 100a receiving an SSW frame in FIG. 3B (i.e., A-BFT).

$$RSSI\_ABFT = EIRP\_ABFT - PathLoss\_Beacon + RxGain\_ABFT \quad \text{(Expression 2)}$$

Now, EIRP_ABFT (in units of dBm) is an EIRP at which the communication device (STA) 100b transmits SSW frames in A-BFT. The communication device (STA) 100b assumes that the losses of the propagation channels in FIGS. 3A and 3B are equal.

In a case where the value of the RSSI_ABFT calculated in step S103 exceeds the value of the sensitivity level, the communication device (STA) 100b transmits an SSW frame in A-BFT (step S105). The value of the sensitivity level is a specification requesting reception power that is determined corresponding to the Modulation and Coding Scheme (MCS) used in transmission of SSW frames in A-BFT. For example, in the 11ad standard, the sensitivity level for MCS0 is −78 dBm.

In a case where case where the value of the RSSI_ABFT calculated in step S103 does not exceed the value of the sensitivity level (No in step S104), the communication device (STA) 100b does not transmit an SSW frame in A-BFT, and the processing ends. In this case, the communication device (STA) 100b may transition to a standby state to receive a DMG Beacon frame from another communication device (AP) 100c, or may transition to step S101.

Note that in a case where a value obtained by adding estimated loss to the value of the RSSI_ABFT calculated in step S103 exceeds the value of the sensitivity level (Yes in step S104), the communication device (STA) 100b may transmit an SSW frame in A-BFT in step S105. The communication device (STA) 100b may determine an estimation error in accordance with error occurring in measurement of reception power in step S101. The estimation error is 3 dB, for example.

Also, the communication device (STA) 100b may determine the estimation error by adding the accuracy of the EIRP_Beacon illustrated in FIG. 7, and the RxGain_ABFT illustrated in FIG. 9, to the measurement accuracy of reception power in step S101. For example, in a case where the measurement accuracy of reception power is 3 dB, the value of the TX EIRP field of the DMG Beacon is 131 (i.e., the accuracy of the value of the EIRP is 3 dB), and the value of the A-BFT RX Antenna Gain field of the DMG Beacon is 40 (i.e., the accuracy of the value of the gain is 1 dB), the measurement error may be determined to be 7 dB (3 dB+3 dB+1 dB).

The communication device (STA) 100b may also repeat step S101 through step S103 for multiple APs (communication device (AP) 100a and communication device (AP) 100c), and estimate the reception power in step S103 for each AP. The communication device (STA) 100b may perform the processing of steps S104 and S105 for the AP of which the estimated reception power is the greatest.

In a case where a wireless link with a PCP/AP (communication device (AP) 100c) other than the communication device (AP) 100a that has transmitted the DMG Beacon in step S101 has already been established, the communication device (STA) 100b may perform the processing of the steps with regard to the communication device (AP) 100a in a case where the power of the DMG Beacon measured in step S101 is greater than the reception power of the DMG Beacon received from the communication device (AP) 100c.

In a case of making judgement of No in step S104, SSW frames that the communication device (STA) 100b transmits do not reach the communication device (AP) 100a, so the communication device (STA) 100b does not perform transmission of an SSW frame to the communication device (AP) 100a (step S105) to the communication device (AP) 100a, and connection with the communication device (AP) 100c is continued.

In a case of making judgement of Yes in step S104, SSW frames that the communication device (STA) 100b transmits reach the communication device (AP) 100a, so the communication device (STA) 100b performs transmission of an SSW frame to the communication device (AP) 100a (step S105) to the communication device (AP) 100a.

In this case, the communication device (STA) 100b may transmit a frame notifying the communication device (AP) 100c of separation (e.g., a Disassociation frame) after step S105, and transmit a frame notifying the communication device (AP) 100a of connection (e.g., an Association frame). Accordingly, the communication device (STA) 100b can select and connect to an AP with better reception quality.

Figure 11:
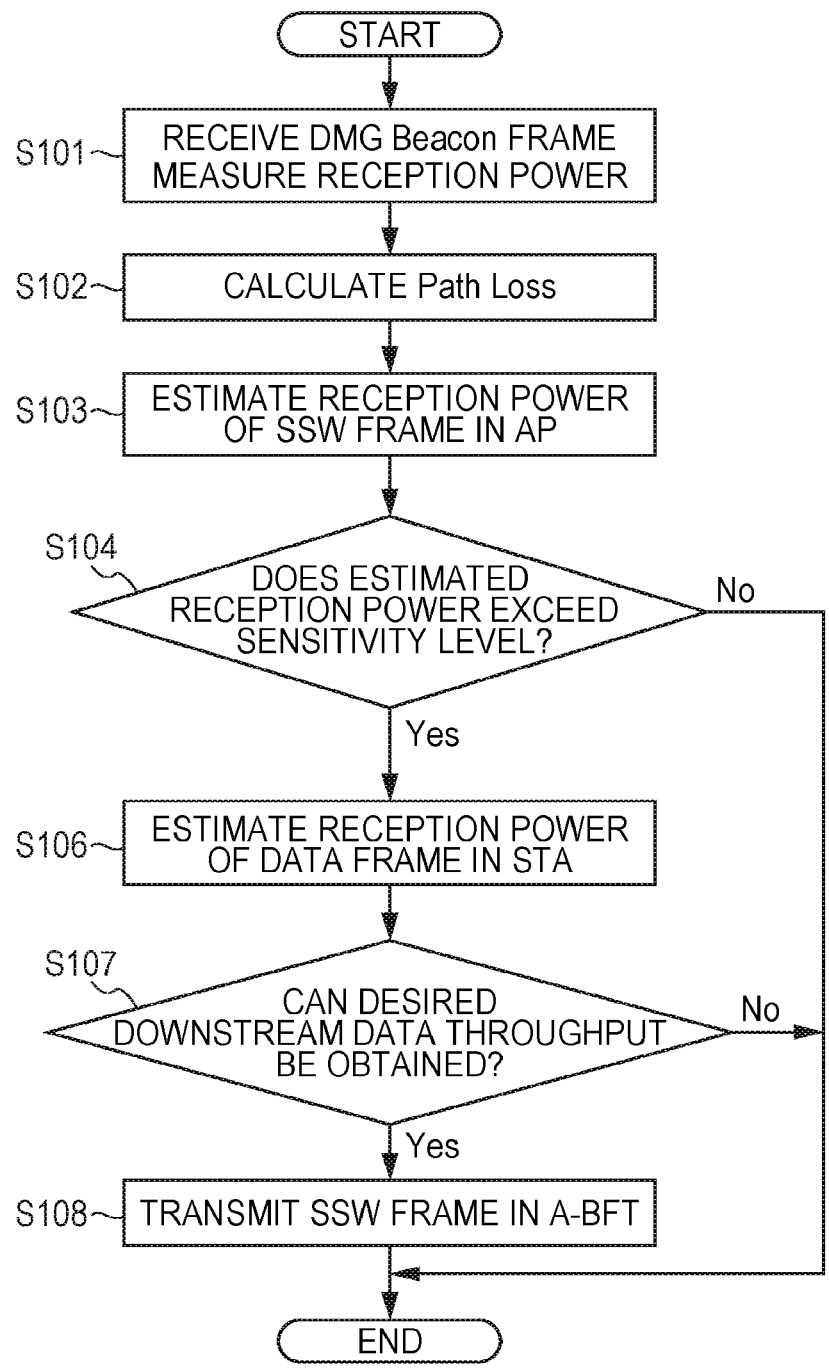
FIG. 11 is a flowchart illustrating another example of reception processing of the DMG Beacon frame in FIG. 5 by a communication device (STA) according to the first embodiment of the present disclosure.

FIG. 11 illustrates a different example of reception processing of the DMG Beacon frame illustrated in FIG. 5 by the communication device (STA) 100b. Steps that are the same as in FIG. 10 are denoted by the same numerals, and description will be omitted.

In step S104, in a case where case where the value of the RSSI_ABFT calculated in step S103 does not exceed the value of the sensitivity level (No in step S104), the communication device (STA) 100b does not perform transmission of an SSW in A-BFT (step S108), and ends processing.

In step S104, in a case where the value of the RSSI_ABFT calculated in step S103 exceeds the value of the sensitivity level (Yes in step S104), the communication device (STA) 100b calculates the estimation value of reception power of data packets received by the communication device (STA) 100b in FIG. 3C (called RSSI_STA_Data) using Expression 3 (step S106).

$$RSSI\_STA\_Data = EIRP\_AP\_Data - PathLoss\_Beacon + RxGain\_STA\_Data \quad \text{(Expression 3)}$$

In Expression 3, RxGain_STA_Data is reception antenna gain of the communication device (STA) 100b in FIG. 3C, i.e., reception antenna gain in a case where the communication device (STA) 100b has set the receiving array antenna 116 to the best sector. Also, the communication device (STA) 100b assumes that the losses of the propagation channels in FIGS. 3A and 3C are equal in Expression 3.

In step S107, the communication device (STA) 100b determines whether or not desired throughput can be obtained in downlink data communication, based on the value of RxGain_STA_Data.

FIG. 12A illustrates an example of values of reception sensitivity level (Receive sensitivity) as to MCS in the 11ad standard. FIG. 12B illustrates an example of maximum throughput values as to MCS in the 11ad standard.

For example, the communication device (STA) 100b compares the value of RxGain_STA_Data and the value of the reception sensitivity level as to MCS in the 11ad standard that is illustrated in FIG. 12A, and decides the greatest MCS capable of reception. For example, in a case where the value of RxGain_STA_Data is −60 dBm, the MCS that has a reception sensitivity level smaller than the value of RxGain_STA_Data is MCS8. That is to say, the largest MCA that the communication device (STA) 100b can receive in FIG. 3C is 8.

The communication device (STA) 100b may also calculate the greatest throughput that can be received, based on the maximum throughput values as to MCS in the 11ad standard illustrated in FIG. 12B. For example, in a case where the RxGain_STA_Data is −60 dBm, the greatest MCS that the communication device (STA) 100b can receive is 8, so the greatest throughput is 2310 Mbps.

In a case where the greatest MCS that can be received, calculated in step S106, is a value decided beforehand or greater (Yes in step S107), the communication device (STA) 100b transmits an SSW frame in A-BFT (step S108). On the other hand, in a case where the greatest MCS that can be received, calculated in step S106, is smaller than the value decided beforehand (No in step S107), the communication device (STA) 100b does not transmit an SSW frame in A-BFT (step S108), and the processing ends.

Also, in a case where the maximum throughput that can be received, calculated in step S106, is a value decided beforehand or greater (Yes in step S107), the communication device (STA) 100b transmits an SSW frame in A-BFT (step S108). On the other hand, in a case where the maximum throughput that can be received, calculated in step S106, is smaller than the value decided beforehand (No in step S107), the communication device (STA) 100b does not transmit an SSW frame in A-BFT (step S108), and the processing ends.

Also, in a case where the communication device (STA) 100b has already established a wireless link with a different PCP/AP than the communication device (AP) 100a that has transmitted the DMG Beacon in step S101 (hereinafter, referred to as different PCP/AP), the communication device (STA) 100b transmits an SSW frame in step S108 in a case where the greatest MCS that can be received, calculated in step S106, is greater than the MCS that can be used with the different PCP/AP (Yes in step S107). On the other hand, in a case where the greatest MCS that can be received, calculated in step S106, is equal to or less than the MCS that can be used with the different PCP/AP (Yes in step S107), the communication device (STA) 100b does not transmit an SSW frame in A-BFT (step S108), and ends processing.

In this case, the communication device (STA) 100b may transmit a frame notifying the different PCP/AP of separation (e.g., a Disassociation frame) after step S108, and transmit a frame notifying the communication device (AP) 100a of connection (e.g., an Association frame). Accordingly, the communication device (STA) 100b can select and connect to an PCP/AP with better reception quality.

Also, the communication device (STA) 100b may compare a value where estimation error has been subtracted from the RxGain_STA_Data value, and the value of reception sensitivity level in FIG. 12A. Accordingly, the communication device (STA) 100b can avoid repeated disconnection and connection among multiple PCP/APs having equivalent throughput.

Also, in a case of having a different communication arrangement from the 11ad standard (e.g., 5 GHz Wi-Fi-communication, IEEE 802.11ac standard, etc.) the communication device (STA) 100b may transmit an SSW frame in A-BFT in a case where the maximum throughput that can be received, calculated in step S106, exceeds throughput in the different communication arrangement.

Note that in a case where the value of RSSI_ABFT calculated in step S103 exceeds the value of the sensitivity level (Yes in step S104), the communication device (STA) 100b may calculate the estimation value of reception power of data packets received by the communication device (AP) 100a in FIG. 3D (called RSSI_AP_Data) using Expression 4.

$$RSSI\_AP\_Data = EIRP\_STA\_Data - PathLoss\_Beacon + RxGain\_AP\_Data \quad \text{(Expression 4)}$$

In Expression 4, EIRP_STA_Data is transmission antenna gain of the communication device (STA) 100b in FIG. 3D, i.e., EIRP in a case where the communication device (STA) 100b has set the transmitting array antenna 106 to the best sector. Also, the communication device (STA) 100b assumes that the losses of the propagation channels in FIGS. 3A and 3D are equal in Expression 4.

In step S107, the communication device (STA) 100b determines whether or not desired throughput can be obtained in uplink data communication, based on the value of RxGain_AP_Data. The communication device (STA) 100b may calculate the greatest MCS that the communication device (AP) 100a can receive, and calculate a realizable throughput, as described regarding downlink data communication.

In a case where the greatest MCS that the communication device (AP) 100a can receive, calculated in step S106, is equal to or greater than a value decided beforehand (Yes in step S107), the communication device (STA) 100b transmits an SSW frame in A-BFT (step S108).

Also, in a case where the throughput that can be realized in uplink data communication, calculated in step S106, is equal to or greater than a value decided beforehand (Yes in step S107), the communication device (STA) 100*b* transmits an SSW frame in A-BFT (step S108).

Note that an arrangement may be made where, in a case where the throughput that can be realized in both downlink and uplink data communication is equal to or greater than a value decided beforehand (Yes in step S107), the communication device (STA) 100*b* transmits an SSW frame in A-BFT (step S108).

Also note that the communication device (AP) 100*a* may perform notification of information relating to the EDMG TX RX Info element using a communication format other than millimeter wave communication (11ad and 11ay).

Note that the communication device (AP) 100*a* may include information regarding the MIMO stream count in the DMG Beacon and transmit, in step S101 in FIG. 11. The communication device (STA) 100*b* calculates a realizable MIMO stream from information of MIMO stream count of the communication device (AP) 100*a* included in the DMG Beacon, and information of the MIMO stream count of the communication device (STA) 100*b*. For example, the communication device (STA) 100*b* may select the smaller figure regarding MIMO streams of the communication device (AP) 100*a* and communication device (STA) 100*b*.

In step S107 in FIG. 11, the communication device (STA) 100*b* may multiply the calculated realizable throughput by the value of realizable MIMO streams, and calculate the realizable throughput in MIMO. The communication device (STA) 100*b* may use the value of realizable throughput in MIMO to determine whether the desired downlink throughput can be obtained.

Also, in a case of calculating realizable throughput in MIMO, the communication device (STA) 100*b* may subtract a value corresponding to the MIMO stream count, from the reception power of data frames calculated using Expression 3, in step S106 FIG. 11. For example, in a case where the MIMO stream count is two, the communication device (STA) 100*b* may subtract 3 dB from the calculated reception power, deeming the power to be dispersed among two streams.

Note that in step S101 in FIG. 11, the communication device (AP) 100*a* may transmit the information in the DMG Beacon, including information of the channel count regarding channel bonding and channel aggregation therein.

The communication device (STA) 100*b* may calculate realizable throughput in channel bonding and channel aggregation in the same way as with MIMO. That is to say, the communication device (STA) 100*b* may multiply the value of realizable throughput by the channel count. The calculated reception power may also be adjusted in accordance with the channel count. For example, subtracting 3 dB in a case of two channels, and subtracting 6 dB in a case of four channels, may be performed.

Although an example has been described in the present embodiment regarding a case where the communication device (AP) 100*a* transmits a DMG Beacon and the communication device (STA) 100*b* transmits an SSW frame in A-BFT, the communication device (STA) 100*b* may transmit a DMG Beacon and the communication device (AP) 100*a* transmit an SSW frame in A-BFT.

As described above, in the first embodiment, the communication device (AP) 100*a* transmits a DMG Beacon frame including the TX EIRP field and A-BFT RX Antenna Gain field, so judgment can be made at the communication device (STA) 100*b* regarding whether or not an SSW frame in A-BFT will reach the communication device (AP) 100*a*. Accordingly, transmission of unnecessary SSW frames can be avoided, so electric power consumption of the communication device (STA) 100*b* can be reduced, and occurrence of unnecessary interference waves to other STAs can be reduced.

Also, in the first embodiment, the communication device (AP) 100*a* transmits a DMG Beacon frame including the TX EIRP field, A-BFT RX Antenna Gain field, Beamed TX EIRP field, and Beamed RX gain field, so judgment can be made at the communication device (STA) 100*b* regarding whether or not communication at a desired data throughput can be realized. Accordingly, transmission of unnecessary SSW frames can be avoided, so electric power consumption of the communication device (STA) 100*b* can be reduced, and occurrence of unnecessary interference waves to other STAs can be reduced.

Also, in the first embodiment, the communication device (AP) 100*a* transmits a DMG Beacon frame including the TX EIRP field, A-BFT RX Antenna Gain field, Beamed TX EIRP field, and Beamed RX gain field, so data throughput can be estimated at the communication device (STA) 100*b*, and accordingly the PCP/AP and communication format with the highest data throughput can be selected.

Second Embodiment

Although an arrangement has been described in the first embodiment where a DMG Beacon frame is transmitted including the TX EIRP field, A-BFT RX Antenna Gain field, Beamed TX EIRP field, and Beamed RX gain field, a case will be described in a second embodiment regarding an arrangement where a DMG Beacon frame is transmitted including the TX EIRP field and A-BFT RX Antenna Gain field, and further, a Probe Request frame is transmitted including the Beamed TX EIRP field and Beamed RX gain field.

Figure 13:
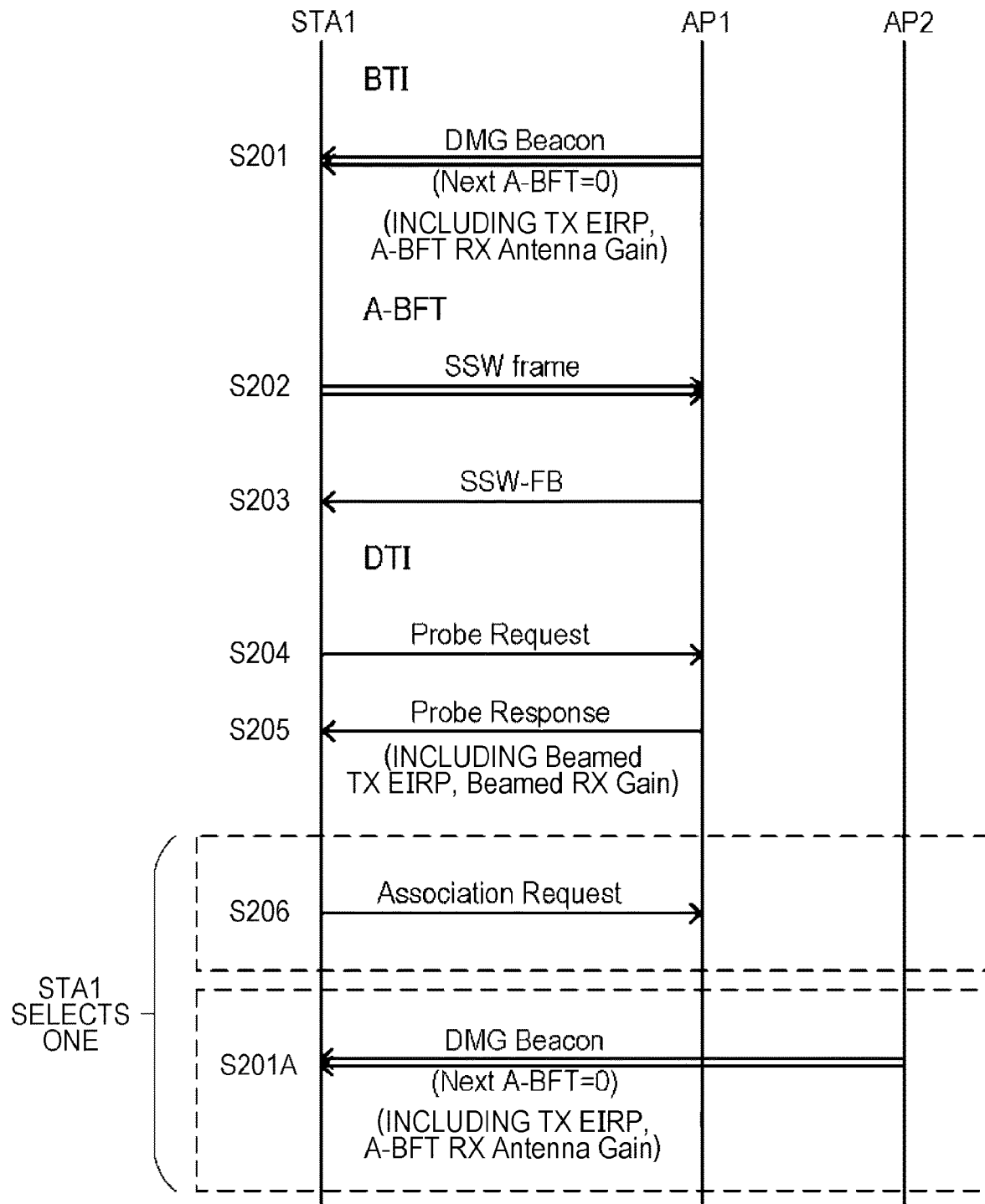
FIG. 13 is a diagram illustrating an example of procedures for a communication device (AP) and communication device (STA) to perform communication, according to a second embodiment of the present disclosure.

FIG. 13 is a diagram illustrating an example of procedures for performing communication between the communication device (AP) 100*a* (hereinafter, AP1) and the communication device (STA) 100*b* (hereinafter, STA1).

Figure 14:
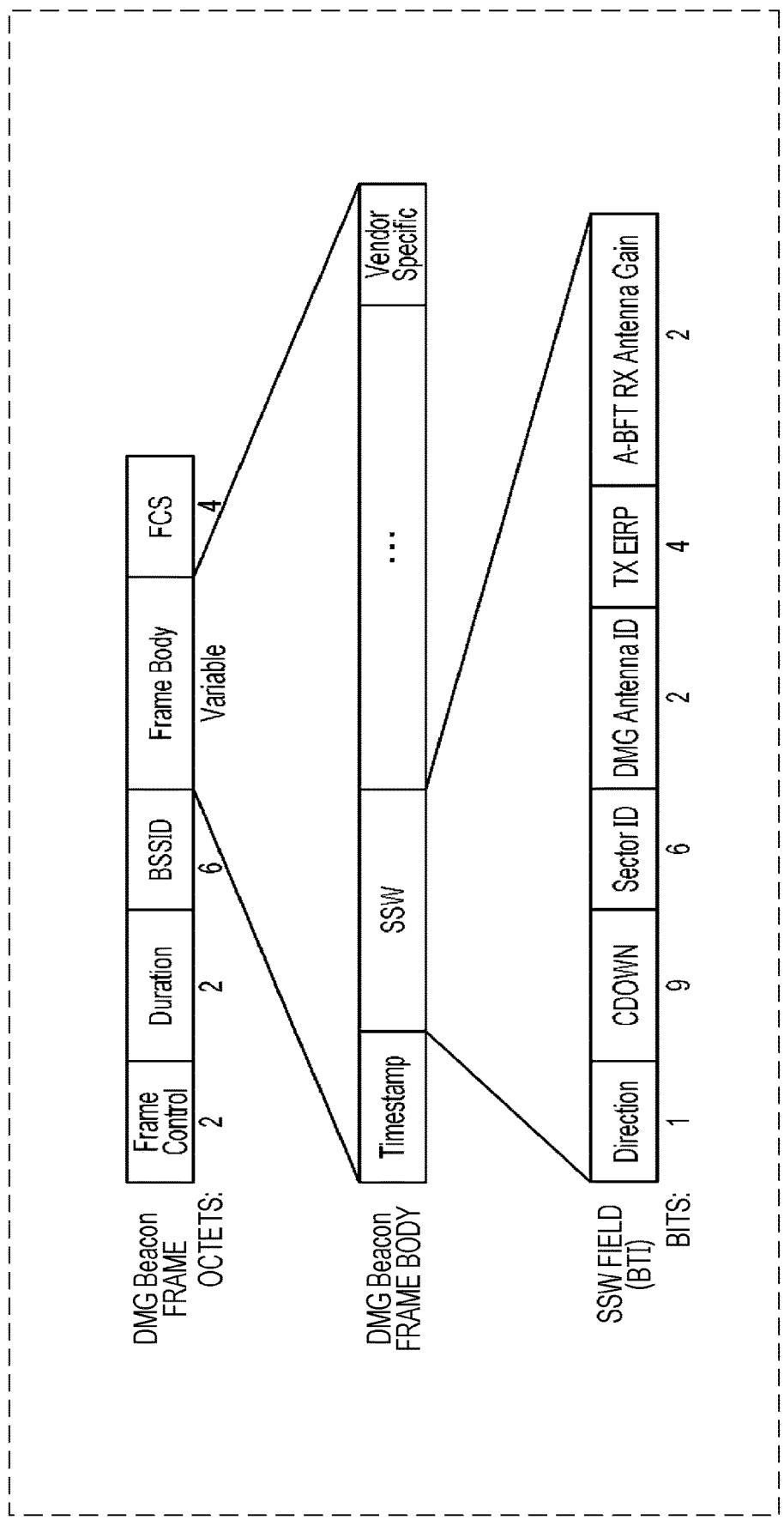
FIG. 14 is a diagram illustrating an example of a format of a DMG Beacon frame according to the second embodiment of the present disclosure.

In step S201, the AP1 changes sectors and transmits each DMG Beacon frame in each sector. FIG. 14 illustrates an example of the format of a DMG Beacon frame. The DMG Beacon frame in FIG. 14 includes an SSW field in a Frame Body. The SSW field includes a TX EIRP field and A-BFT RX Antenna Gain field.

The TX EIRP field and A-BFT RX Antenna Gain field in FIG. 14 are used in the same way as in FIG. 5, but the bit count differs from FIG. 5. FIG. 15 illustrates an example of TX EIRP field values. The TX EIRP field is four bits, and the values are in 5 dB increments. FIG. 16 illustrates an example of values of the A-BFT RX Antenna Gain field. The A-BFT RX Antenna Gain field is two bits, and the values are in 5 dB increments. Note that in a case where the value of A-BFT RX Antenna Gain is undetermined, the AP1 may set the value of the A-BFT RX Antenna Gain field to 0 (i.e., the smallest value of A-BFT RX Antenna Gain field).

In step S202, the STA1 estimates the power (RSSI_ABFT) of the communication device (AP) 100*a* receiving an SSW frame in FIG. 3B (i.e., A-BFT), using the TX EIRP value and A-BFT RX Antenna Gain value received in step S201, using Expression 1 and Expression 2.

In a case where the value of the RSSI_ABFT is equal to or greater than sensitivity level of the SSW frame in A-BFT (e.g., −78 dBm which is the sensitivity level of MCS0 in the 11ad standard), the STA1 transmits an SSW frame in A-BFT.

The AP1 receives the SSW frame in step S202, and in step S203 transmits an SSW-FB frame.

In step S204, the STA1 transmits a Probe Request frame, and requests a Probe Response frame from the AP1.

Figure 17:
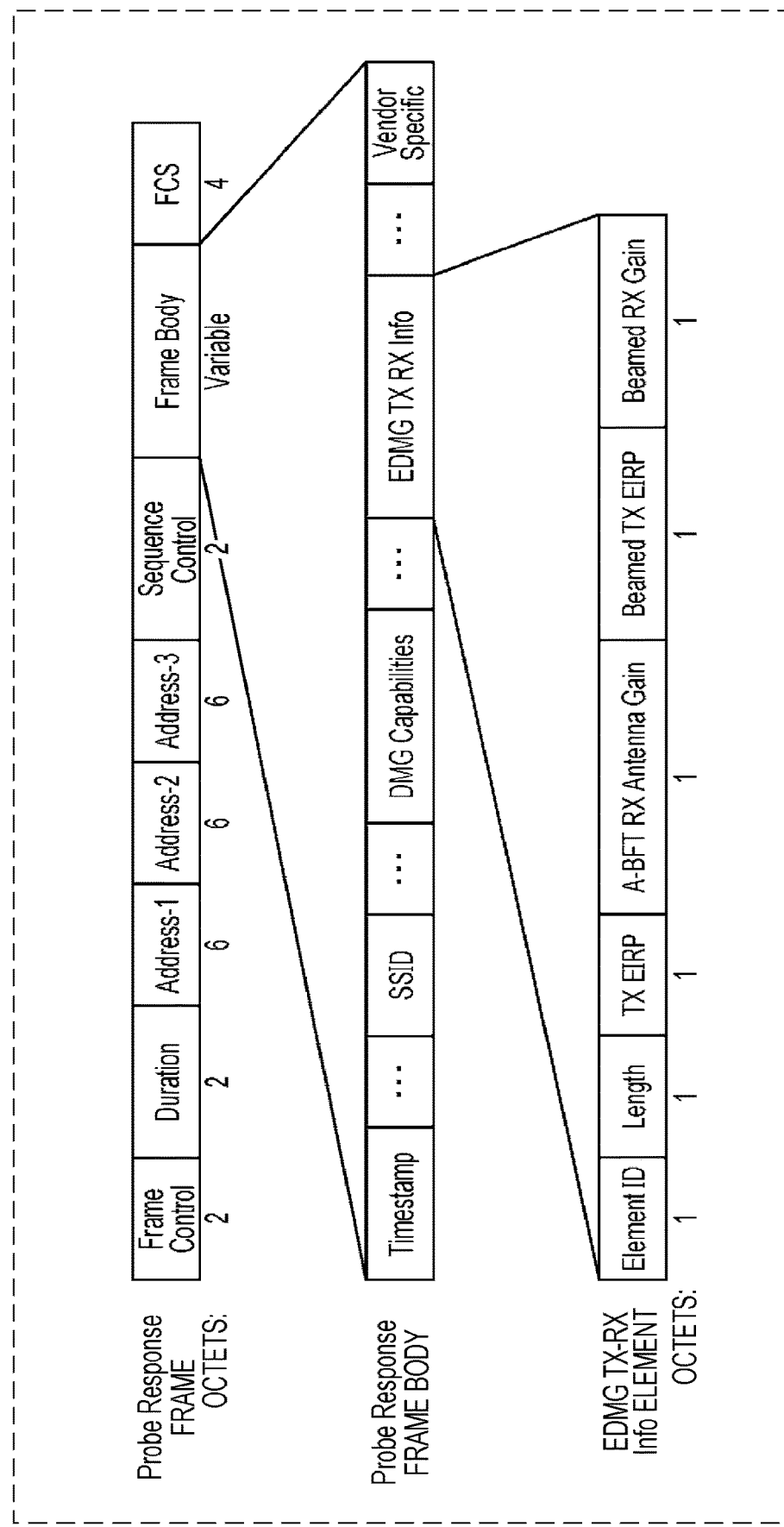
FIG. 17 is a diagram illustrating an example of a Probe Request frame according to the second embodiment of the present disclosure.

In step S205, the AP1 transmits a Probe Response frame. FIG. 17 illustrates an example of a Probe Response frame.

The Probe Response frame includes information necessary for the STA1 to connect (association) the AP1. Included, for example, are an Service set identifier (SSID) field and a DMB Capabilities field. The EDMG TX RX Info field is also included. The configuration of the EDMG TX RX Info field is the same as that in the first embodiment (see FIG. 5).

In step S205, the STA1 calculates the values of RSSI_S-TA_Data and RSSI_AP_Data using the same procedures as step S106 in FIG. 11 and Expression 3 and Expression 4, and determines whether or not desired data throughput is realizable with regard to the AP1.

In a case of having determined that the desired data throughput is realizable, the STA1 transmits an Association Request to the AP1, and performs association. After having performed association regarding the AP1, the STA1 may use SLS and BRP to perform beamforming training of the receiving array antenna. Also, after having performed association regarding the AP1, the STA1 may use SLS and BRP to perform high-accuracy beamforming training of the transmitting array antenna. That is to say, the STA1 further narrows the beam width in comparison with the sector used in step S202 (A-BFT) to raise gain, and performs SLS and BRP (step S206).

Also, after the STA1 has performed association regarding the AP1, the AP1 may use SLS and BRP to perform beamforming training of the receiving array antenna and high-accuracy beamforming training of the transmitting array antenna. That is to say, the AP1 further narrows the beam width in comparison with the sector used in step S201 (transmission of DMG Beacon) to raise gain, and performs SLS and BRP.

In a case of judging that the desired data throughput is not realizable, the STA1 does not transmit an Association Request frame to the AP1. In this case, the STA1 may standby for a DMG Beacon from another AP (e.g., AP2), and receive (step S201A).

In a case of having received a DMG Beacon from another AP in step S201A, the STA1 may perform the processing of step S202 and hereafter with regard to the other AP.

In this way, the STA1 avoids connection with an AP regarding which the desired throughput is not realizable (e.g., AP1), and performs A-BFT regarding an AP regarding which the desired throughput is realizable (e.g., AP2), so connection with an suitable AP can be realized.

The AP1 transmits a DMG Beacon frame, SSW-FB frame, and Probe Response frame, in steps S201, S203, and S205, at the same EIRP. The STA1 receives the DMG Beacon frame, SSW-FB frame, and Probe Response frame, in steps S201, S203, and S205, using the receiving q-omni antenna 115 (see FIG. 3A). That is to say, the EIRP of the AP1 and the reception antenna gain of the STA1 differ from that in downlink data communication (see FIG. 3C). Accordingly, it is difficult for the STA1 to estimate data throughput based on reception power of the DMG Beacon frame, SSW-FB frame, and Probe Response frame.

On the other hand, the communication device (AP) 100a according to the second embodiment transmits the DMG Beacon frame including the TX EIRP field and A-BFT RX Antenna Gain field, and transmits the Probe Request frame including the Beamed TX EIRP field and Beamed RX gain field, so the communication device (STA) 100b can judge whether the desired throughput can be realized before association, and can connect with a suitable AP.

The communication device (AP) 100a according to the second embodiment transmits the DMG Beacon frame including the TX EIRP field and A-BFT RX Antenna Gain field, and transmits the Probe Request frame including the Beamed TX EIRP field and Beamed RX gain field, so the DMG Beacon frame can be made shorter as compared to the first embodiment.

The communication device (AP) 100a transmits multiple DMG Beacon frames while changing sectors, so shortening the DMG Beacon frame enables reduction of the amount of time to connect to a STA, and reduction of interference to other STAs.

Modification of Second Embodiment

Although the value of the TX EIRP and the value of the A-BFT RX Antenna Gain are each transmitted in a DMG Beacon frame in the second embodiment, a difference between the value of the TX EIRP field and the value of the A-BFT RX Antenna Gain is transmitted in a modification of the second embodiment.

Figure 18:
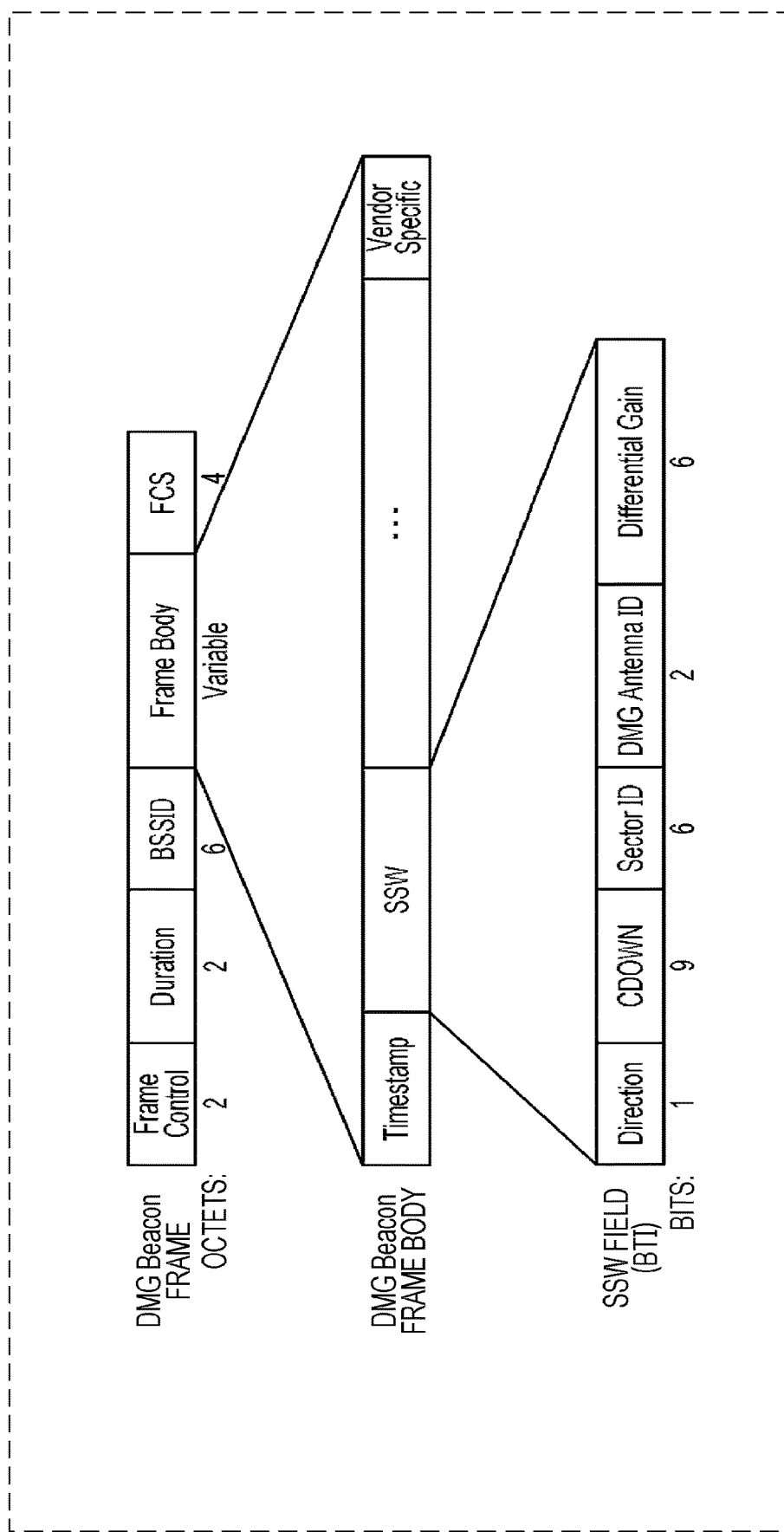
FIG. 18 is a diagram illustrating another example of a format of a DMG Beacon frame according to the second embodiment of the present disclosure.

FIG. 18 illustrates a different example of the format of the DMG Beacon frame. The DMG Beacon frame in FIG. 18 includes the SSW field in the Frame Body, and includes the Differential Gain field in the SSW field.

FIG. 19 illustrates an example of the value of the Differential Gain field. The value of Differential Gain (DIFF_Gain_Beacon) represents the difference between the value of the TX EIRP and the value of the A-BFT RX Antenna Gain, and is calculated by Expression 5.

$$\text{DIFF\_Gain\_Beacon} = \text{EIRP\_Beacon} - \text{RxGain\_ABFT} \quad \text{(Expression 5)}$$

The AP1 decides the value of the Differential Gain field in accordance with the accuracy of the value of Differential Gain and the value calculated in Expression 5 using FIG. 19. For example, in a case where the accuracy of Differential Gain is 3 dB, and the value of Differential Gain calculated by Expression 5 is 9 dB, the value of the Differential Gain field is 3. Note that in a case of having received the DMG Beacon in FIG. 14, the STA1 may calculate the value of DIFF_Gain_Beacon using Expression 5.

In step S201 in FIG. 13, the STA1 estimates the power (RSSI_ABFI) of the communication device (AP) 100a receiving an SSW frame in FIG. 3B (i.e., A-BFT) using the value of the Differential Gain that has been received, using Expression 6 that is a combination of Expression 1, Expression 2, and Expression 5.

$$\begin{aligned}
&\text{RSSI\_ABFT} \\
&= \text{EIRP\_ABFT} - \text{PathLoss\_Beacon} + \text{RxGain\_ABFT} \\
&= \text{EIRP\_ABFT} - (\text{EIRP\_Beacon} + \text{RxGain\_Beacon} - \text{RSSI\_Beacon}) + \text{RxGain\_ABFT} \\
&= \text{RSSI\_Beacon} + \text{EIRP\_ABFT} - \text{RxGain\_Beacon} - (\text{EIRP\_Beacon} - \text{RxGain\_ABFT}) \\
&= \text{RSSI\_Beacon} + \text{EIRP\_ABFT} - \text{RxGain\_Beacon} - \text{DIFF\_Gain\_Beacon}
\end{aligned} \quad \text{(Expression 6)}$$

In Expression 6, RSSI_Beacon is the reception power strength of the DMG Beacon that the STA1 measures in step S201 in FIG. 13. Also, RxGain_Beacon is the antenna gain at the STA1 at the time of receiving the DMG Beacon frame, and EIRP_ABFT is the transmission EIRP of the STA1 at the time of A-BFT. That is to say, the STA1 receives the value of DIFF_Gain_Beacon in step S201 in FIG. 13, and accordingly can calculate the value of RSSI_ABFT using Expression 6. Accordingly, the STA1 can distinguish whether or not an SSW frame will reach the AP1, before performing SSW frame transmission in step S202 in FIG. 13.

Figure 20:
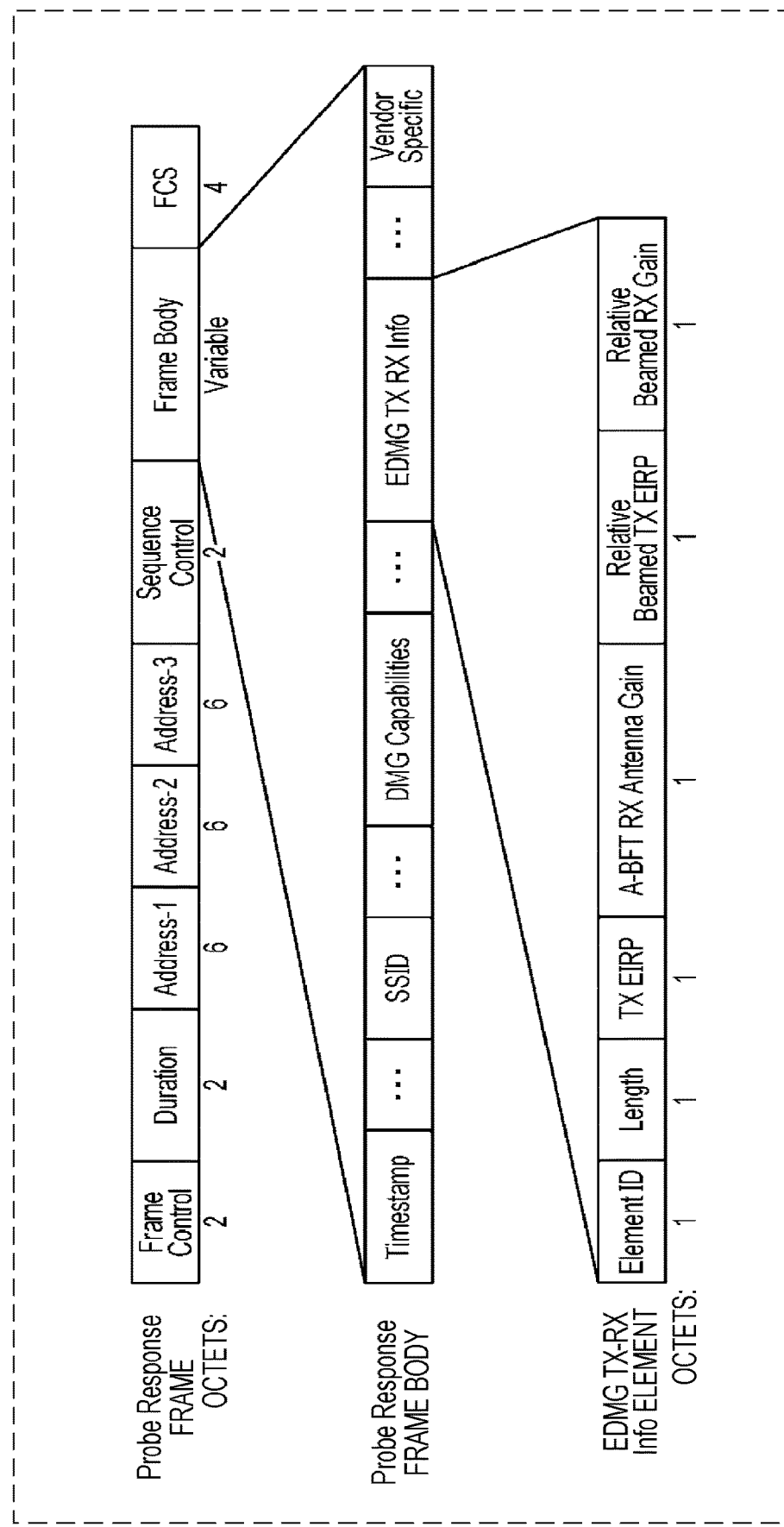
FIG. 20 is a diagram illustrating another example of a format of a Probe Response frame according to the second embodiment of the present disclosure.

FIG. 20 illustrates a different example of a format of a Probe Response frame. The Probe Response frame illustrated in FIG. 20 includes a Relative Beamed TX EIRP field and Relative Beamed Rx Gain field, unlike that in FIG. 17.

The Relative Beamed TX EIRP field represents the difference between the value of EIRP_AP_Data and the value of EIRP_Beacon, determined in Expression 7 (hereinafter written as EIRP_AP_Relative).

EIRP_AP_Relative=EIRP_AP_Data−EIRP_Beacon   (Expression 7)

FIG. 21 illustrates an example of values of the Relative Beamed TX EIRP field. The communication device (AP) 100a selects the values of the Relative Beamed TX EIRP field in accordance with the value of EIRP_AP_Relative and the accuracy, in the same way as in FIGS. 9 and 18.

The Relative Beamed Rx Gain field represents the difference between the value of RxGain_AP_Data and the value of RxGain_ABFT determined in Expression 8 (hereinafter written as RxGain_AP_Relative).

RxGain_AP_Relative=RxGain_AP_Data−
  RxGain_ABFT   (Expression 8)

The communication device (AP) 100a selects the value of the Relative Beamed Rx Gain field in accordance with the value of EIRP_AP_Relative and the accuracy, in the same way as with the Relative Beamed Tx EIRP field (see FIG. 21).

In step S205 in FIG. 13, the STA1 calculates the value of RSSI_STA_Data using Expression 9, and determines whether or not the desired MCS and data throughput can be realized in a down data link (FIG. 3C).

RSSI_STA_Data

=EIRP_AP_Data−PathLoss_Beacon+RxGain_
  STA_Data

=EIRP_AP_Data−(EIRP_Beacon+RxGain_Beacon−
  RSSI_Beacon)+RxGain_STA_Data

=RSSI_Beacon+(EIRP_AP_Data−EIRP_Beacon)+
  (RxGain_STA_Data−RxGain_Beacon)

=RSSI_Beacon+EIRP_AP_Relative+(RxGain_
  STA_Data−RxGain_Beacon)   (Expression 9)

In Expression 9, RSSI_Beacon is the reception power strength of the DMG Beacon that the STA1 has measured in step S201 in FIG. 13. RxGain_Beacon is the antenna gain of the STA1 at the time of receiving the DMG Beacon frame, and RxGain_STA_Data is the reception antenna gain of the STA1 at the time of data communication. That is to say, the STA1 receives the value of EIRP_AP_Relative in step S205, so the value of RSSI_STA_Data can be calculated using Expression 9.

In step S205 in FIG. 13, the STA1 may calculate the value of RSSI_AP_Data using Expression 10, and determine whether or not the desired MCS and data throughput can be realized in an up data link (FIG. 3D).

RSSI_AP_Data

=EIRP_STA_Data−PathLoss_Beacon+RxGain_
  AP_Data

=EIRP_STA_Data−(EIRP_Beacon+RxGain_Beacon−
  RSSI_Beacon)+RxGain_AP_Data

=RSSI_Beacon−(EIRP_Beacon−RxGain_AP_Data)+
  (EIRP_STA_Data−RSSI_Beacon)

=RSSI_Beacon+(RxGain_STA_Data−RxGain_Beacon)−(DIFF_Gain_Beacon+RxGain_ABFT−
  RxGain_AP_Relative−RxGain_ABFT)

=RSSI_Beacon+(RxGain_STA_Data−RxGain_Beacon)−(DIFF_Gain_Beacon−RxGain_AP_Relative)   (Expression 10)

In Expression 10, RSSI_Beacon is the reception power strength of the DMG Beacon that the STA1 has measured in step S201 in FIG. 13. RxGain_Beacon is the antenna gain of the STA1 at the time of receiving the DMG Beacon frame, and RxGain_STA_Data is the reception antenna gain of the STA1 at the time of data communication. That is to say, the STA1 receives the value of DIFF_Gain_Beacon in step S201 in FIG. 13, and receives the value of RxGain_AP_Relative in step S205, so the value of RSSI_AP_Data can be calculated using Expression 10.

Note that in the present embodiment, description has been made regarding an example of a case where the communication device (AP) 100a transmits DMG Beacon and Probe Response frames including information related to antenna gain, but this is the same for a case of the communication device (STA) 100b transmitting a DMG Beacon. In this case, the transmission direction of frames in steps S201, S202 and S203 in FIG. 13 is reverse, and in step S201, the communication device (STA) 100b transmits the DMG Beacon frame in FIG. 14. Also, unlike FIG. 13, the communication device (STA) 100b transmits the Probe Request frame in step S204 with the EDMG TX RX Info element (see FIG. 17) included.

The communication device (AP) 100a uses the value included in the EDMG TX RX Info element to calculate the realizable throughput, and determines whether or not the desired throughput is realizable. If not realizable, the communication device (AP) 100a transmits an Association Response including a field (e.g., status code) notifying non-permission of association, after having received the Association Request in step S206.

Also, the communication device (AP) 100a may notify a control device that is omitted from illustration of the calculated realizable throughput. The control device receives the value of the realizable throughput relating to the communication device (STA) 100b from multiple APs (e.g., communication device (AP) 100a and communication device (AP) 100c), and transmits a signal recommending association with the communication device (STA) 100b to the AP with the highest value (e.g., communication device (AP) 100a). Also, the address of an AP regarding which association with the communication device (STA) 100b is recommended (e.g., address of communication device (AP) 100a) may be notified to multiple APs.

For example, in a case of having received a signal recommending association with the communication device (STA) 100b, the communication device (AP) 100a may transmit an Association Response to the STA1 and permit association with the STA1, upon having received an Association Request in step S206 in FIG. 13.

Also, in a case of having not received a signal recommending association with the communication device (STA) 100b, the communication device (AP) 100a may transmit an Association Response to the STA1 including a field notifying non-permission of association (e.g., status code), upon having received an Association Request in step S206 in FIG. 13.

The communication device (AP) 100*a* may in step S205 transmit a Probe Response frame to the communication device (STA) 100*b* including the address of the AP regarding which association with the communication device (STA) 100*b* is recommended, that has been notified by the control device.

The communication device (AP) 100*a* may change the transmission power and gain for each DMG Beacon when transmitting. The communication device (AP) 100*a* may set the value of Differential Gain in accordance with the transmission power and gain, and gain of receiving q-omni antenna 115, of each DMG Beacon, in the Differential Gain field of each DMG Beacon, and transmit. For example, the communication device (AP) 100*a* may make settings whether the gain is maximum when directionality of the transmitting array antenna 106 is controlled to the frontal direction, and the gain is several dB smaller as compared to the maximum gain when directionality is controlled to a direction different from the frontal direction.

Also, the communication device (AP) 100*a* may have gain where the gain of the receiving q-omni antenna 115 differs in accordance with the direction of arrival of wireless signals. The communication device (AP) 100*a* may set the value of the transmitting EIRP, and the value of Differential Gain in accordance with the value of gain of the receiving q-omni antenna 115 corresponding to the transmission direction of each DMG Beacon frame, in the Differential Gain field of each DMG Beacon. Thus, the communication device (STA) 100*b* can associate with the AP that has the best communication quality.

The communication device (AP) 100*a* according to the modification of the second embodiment transmits DMG Beacon frames including the DIFF_Gain_Beacon field, and transmits Probe Request frames including the Relative Beamed Tx EIRP field and Relative Beamed Rx Gain field, so the communication device (STA) 100*b* can judge whether or not desired throughput can be realized before association, and connection with a suitable AP can be made.

The communication device (AP) 100*a* according to the modification of the second embodiment transmits DMG Beacon frames including the DIFF_Gain_Beacon field, and transmits Probe Request frames including the Relative Beamed Tx EIRP field and Relative Beamed Rx Gain field, so the DMG Beacon frame fan be made shorter as compared to the first embodiment.

The communication device (AP) 100*a* transmits the DMG Beacon frames in each sector while changing sectors, so shortening the DMG Beacon frame can reduce time necessary to connect to a STA, and reduce interference as to other STAs.

Third Embodiment

Although the communication device (STA) 100*b* determines whether or not to transmit an SSW frame based on a DMG Beacon frame received from one communication device (AP) 100*a* in the first embodiment and second embodiment, the communication device (STA) 100*b* determines whether or not to transmit an SSW frame based on a DMG Beacon frame received from multiple communication devices (AP) 100*a* in a third embodiment.

Figure 22:
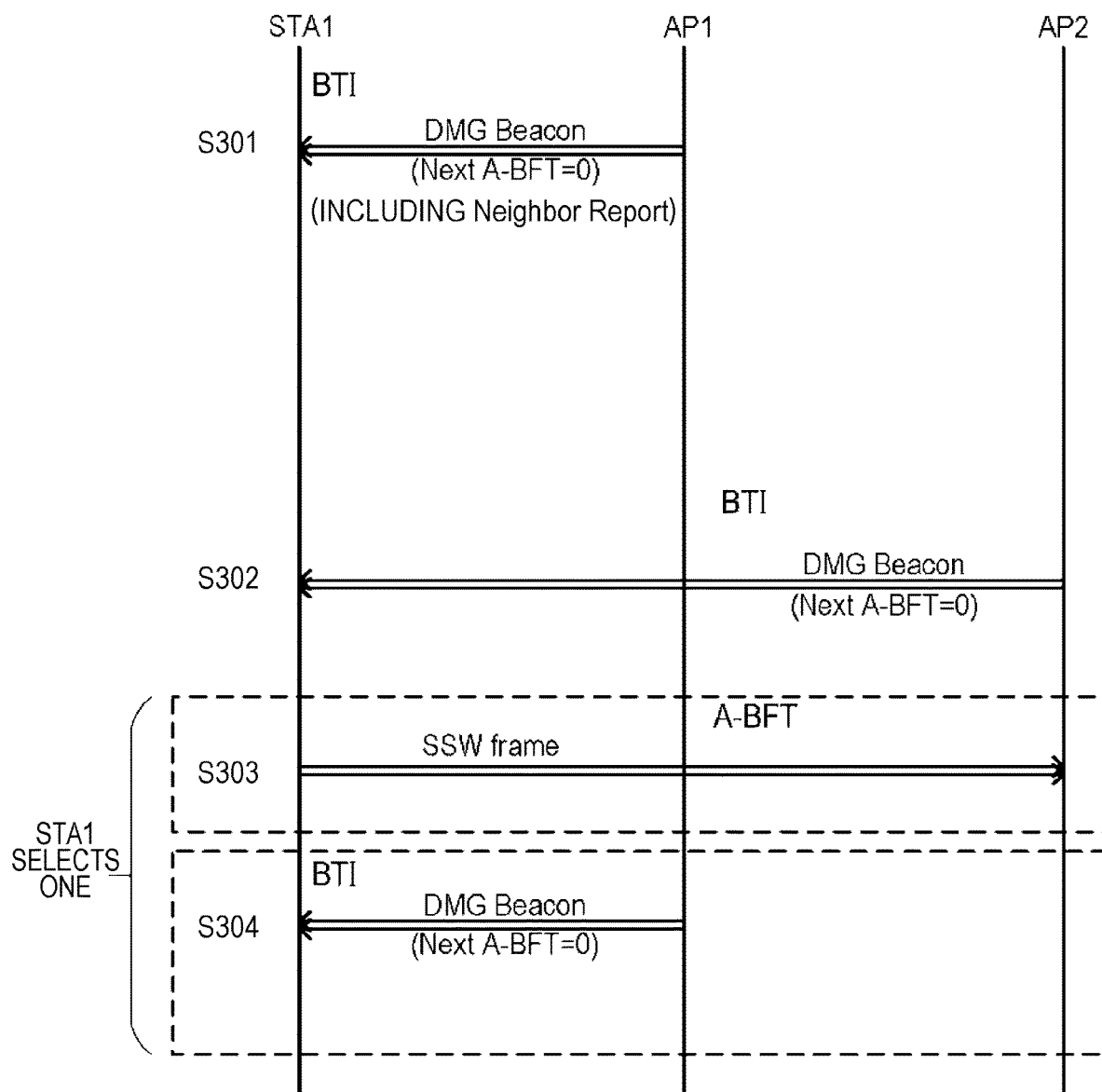
FIG. 22 is a diagram illustrating an example of procedures for a communication device (AP) and communication device (STA) to perform communication, according to a third embodiment of the present disclosure.

FIG. 22 is a diagram illustrating an example of procedures for communication between the communication device (AP) 100*a* (hereinafter, AP1) and communication device (STA) 100*b* (hereinafter, STA1).

In step S301, the AP1 transmits a DMG Beacon frame with a Neighbor Report element included therein. Note that the STA1 has already completed association with the AP1 before step S301.

Figure 23:
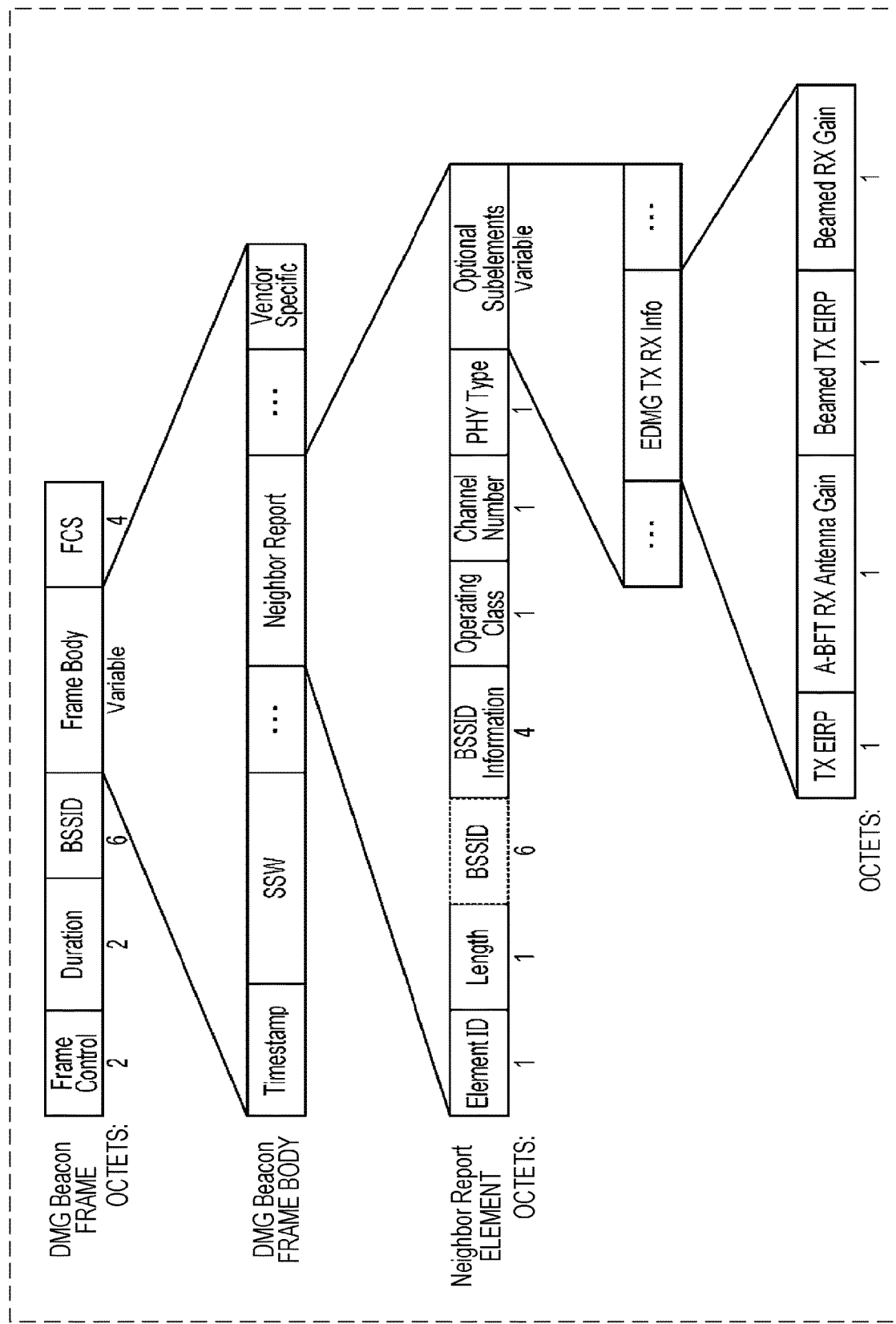
FIG. 23 is a diagram illustrating an example of a format of a DMG Beacon frame according to the third embodiment of the present disclosure.

FIG. 23 illustrates an example of the format of a DMG Beacon frame. The Neighbor Report element includes information of APs present nearby the AP1 (e.g., AP2), that the AP1 has detected. In the DMG Beacon frame, the AP1 includes an EDMG TX RX Info field in an Optional Sub-elements portion of the Neighbor Report element and transmits.

The EDMG TX RX Info field in FIG. 23 is equivalent to the fields of the EDMG TX RX Info element in FIG. 5 (first embodiment) from which the start Element ID field and Length field have been removed. That is to say, the EDMG TX RX Info field includes the TX EIRP field, A-BFT RX Antenna Gain field, Beamed TX EIRP field, and Beamed RX gain field. The way to determine the values of these fields is as illustrated in the first embodiment.

However, while information relating to the AP1 is included in the value of the EDMG TX RX Info field in FIG. 5 in the first embodiment, information relating to the AP2 is included in FIG. 23. That is to say, the TX EIRP field in FIG. 23 includes the value of EIRP_Beacon of the AP2, and the A-BFT RX Antenna Gain field includes the value of RxGain_ABFT of the AP2.

The AP2 notifies the AP1 of the values of the TX EIRP field, A-BFT RX Antenna Gain field, Beamed TX EIRP field, and Beamed RX gain field, relating to the AP2 before step S301.

In step S302, the STA1 receives the DMG Beacon frame that the AP2 has transmitted. Note that the AP2 does not have to include the EDMG TX RX Info field in the DMG Beacon, so as to shorten the length of the DMG Beacon frame.

The STA1 judges whether or not an SSW frame in A-BFT will reach the AP2, based on Expression 1 and Expression 2, using the value of the EDMG TX RX Info field of the AP2 included in the Neighbor Report in step S301. Also, the STA1 judges whether or not the desired data throughput can be realized in uplink and downlink data communication with the AP2, e.g., whether or not data throughput exceeding that in data communication with the AP1 can be exceeded, based on Expression 1 and Expression 2.

In a case of having judged that an SSW frame can reach the AP2 in A-BFT, and the desired data throughput can be realized with downlink and uplink data communication with the AP2, the STA1 transmits an SSW frame in A-BFT to the AP2 (step S303).

In a case of having judged that an SSW frame cannot reach the AP2 in A-BFT, or that it will be difficult to realize the desired data throughput with downlink and uplink data communication with the AP2, the STA1 does not transmit an SSW frame in A-BFT to the AP2. In this case, the STA1 may maintain association with the AP1, and communicate with the AP1 (step S304).

The AP1 may periodically include a Neighbor Report in the DMG Beacon frame. For example, the AP1 may include a Neighbor Report once every ten beacon intervals. That is to say, the AP1 does not include a Neighbor Report in the DMG Beacon for nine beacon intervals, and includes a Neighbor Report in all DMG Beacons during the BTI period. Accordingly, the amount of time necessary to transmit a DMG Beacon frame can be reduced, and interference as to other STAs can be reduced.

The STA1 has association with the AP1, and accordingly receives the DMG Beacon frame each time. Accordingly, even in cases where a Neighbor Report is periodically included in the DMG Beacon frames, the STA1 can receive DMG Beacons including a Neighbor Report.

The STA1 can store the received Neighbor Report, and use the value of the EDMG TX RX Info field of the AP2 included in the Neighbor Report, as necessary. Accordingly, in a case of having received a DMG Beacon from the AP2 in step S302, the STA2 can perform calculation of Expression 1 through Expression 4, and can judge whether or not to connect to the AP2 without performing transmission in A-BFT.

The AP2 may periodically include an EDMG TX RX Info element (see FIG. 5) in the DMG Beacon frame. Accordingly, the value of the EDMG TX RX Info field at the AP2 can be notified to the AP1 without increasing the data amount of the DMG Beacon frame.

Figure 24:
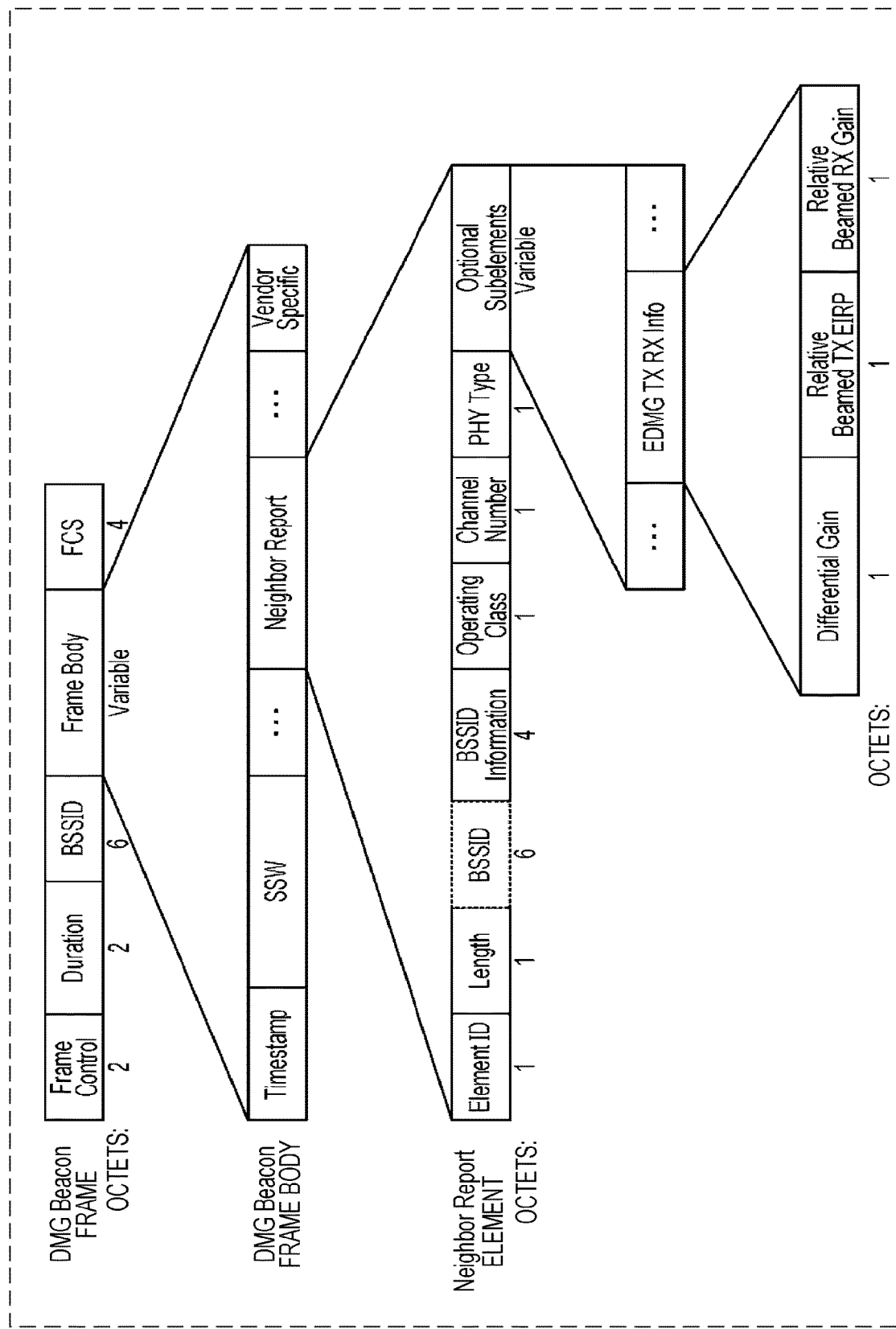
FIG. 24 is a diagram illustrating another example of a DMG Beacon frame according to the third embodiment of the present disclosure.

FIG. 24 illustrates a different example of a DMG Beacon frame. Unlike FIG. 23, the EDMG TX RX Info field in FIG. 24 includes the Differential Gain field (the same as in FIG. 18), Relative Beamed TX EIRP field, and Relative Beamed RX gain field (the same as in FIG. 20). The AP1 can shorten the fame length of the DMG Beacon as compared to that in FIG. 23 by using the format for the DMG Beacon frame in FIG. 24.

Figure 25:
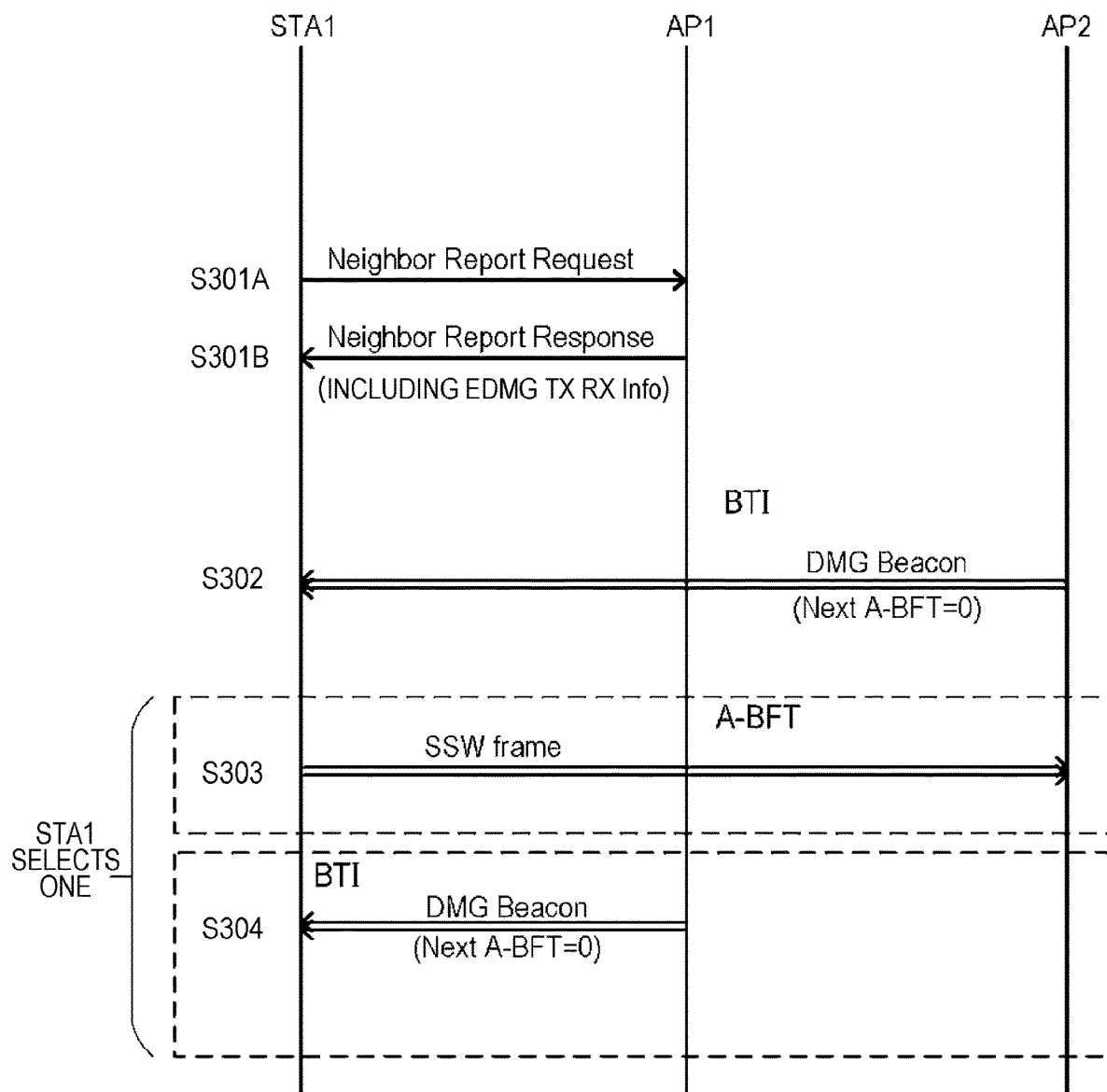
FIG. 25 is a diagram illustrating an example of procedures of an AP1 according to the third embodiment of the present disclosure including an EDMG TX RX Info field relating an AP2 in a Neighbor Report Response frame and transmitting.

FIG. 25 illustrates an example of the procedures of the AP1 including an EDMG TX RX Info field relating to AP2 in a Neighbor Report Response frame and transmitting.

In step S301A, the STA1 transmits a Neighbor Report Request frame to the AP1.

Figure 26:
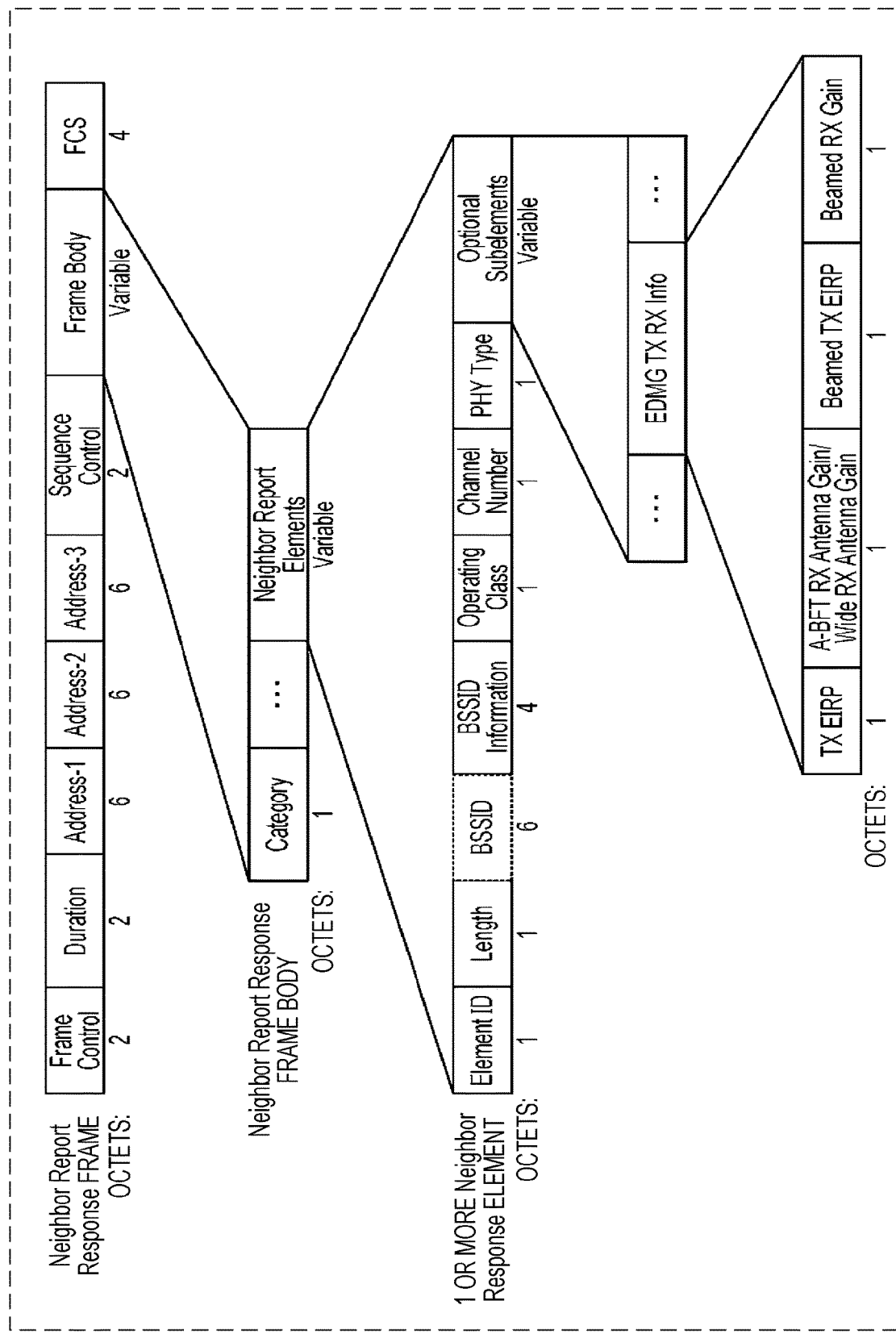
FIG. 26 is a diagram illustrating an example of a Neighbor Report Response frame according to the third embodiment of the present disclosure.

In step S301B, the AP1 transmits a Neighbor Report Response frame to the STA1. FIG. 26 illustrates an example of a Neighbor Report Response frame. The configuration of the EDMG TX RX Info field in FIG. 26 is the same as in FIG. 25.

The AP1 may include the Neighbor Report element including the EDMG TX RX Info field in the Association Response frame, Authentication frame, DMG Beacon frame, Neighbor Report Response frame, BSS Transition Management Query frame, BSS Transition Management Request, and BSS Transition Management Response frame.

Note that the AP1 may make notification of information relating to the Neighbor Report element including the EDMG TX RX Info field using a communication format other than millimeter wave communication (11ad and 11ay).

The communication device (AP) 100a according to the third embodiment transmits the TX EIRP field, A-BFT RX Antenna Gain field, Beamed TX EIRP field, and Beamed RX gain field, relating to another AP, in the Neighbor Report element in the DMG Beacon frame, so the communication device (STA) 100b can judge whether desired throughput can be realized before association, and can connect with a suitable AP.

The communication device (AP) 100a according to the third embodiment periodically transmits the TX EIRP field, A-BFT RX Antenna Gain field, Beamed TX EIRP field, and Beamed RX gain field, relating to another AP, in the Neighbor Report element in the DMG Beacon frame, so the time required to transmit the DMG Beacon frame can be shortened.

The communication device (AP) 100a according to the third embodiment transmits the Differential Gain field, Relative Beamed TX EIRP field, and Relative Beamed RX gain field, relating to another AP, in the Neighbor Report element in the DMG Beacon frame, so the communication device (STA) 100b can judge whether desired throughput can be realized before association, and can connect with a suitable AP.

Fourth Embodiment

In the first through third embodiments, the communication device (STA) 100b determines whether or not to transmit an SSW frame based on a DMG Beacon, and cancels connection with the communication device (AP) 100a in a case of determining not to transfer. In a fourth embodiment, a method will be described to transmit information necessary to establish a wireless link using another wireless format, even if judgment is made based on the DMG Beacon not to transmit an SSW frame.

Figure 27:
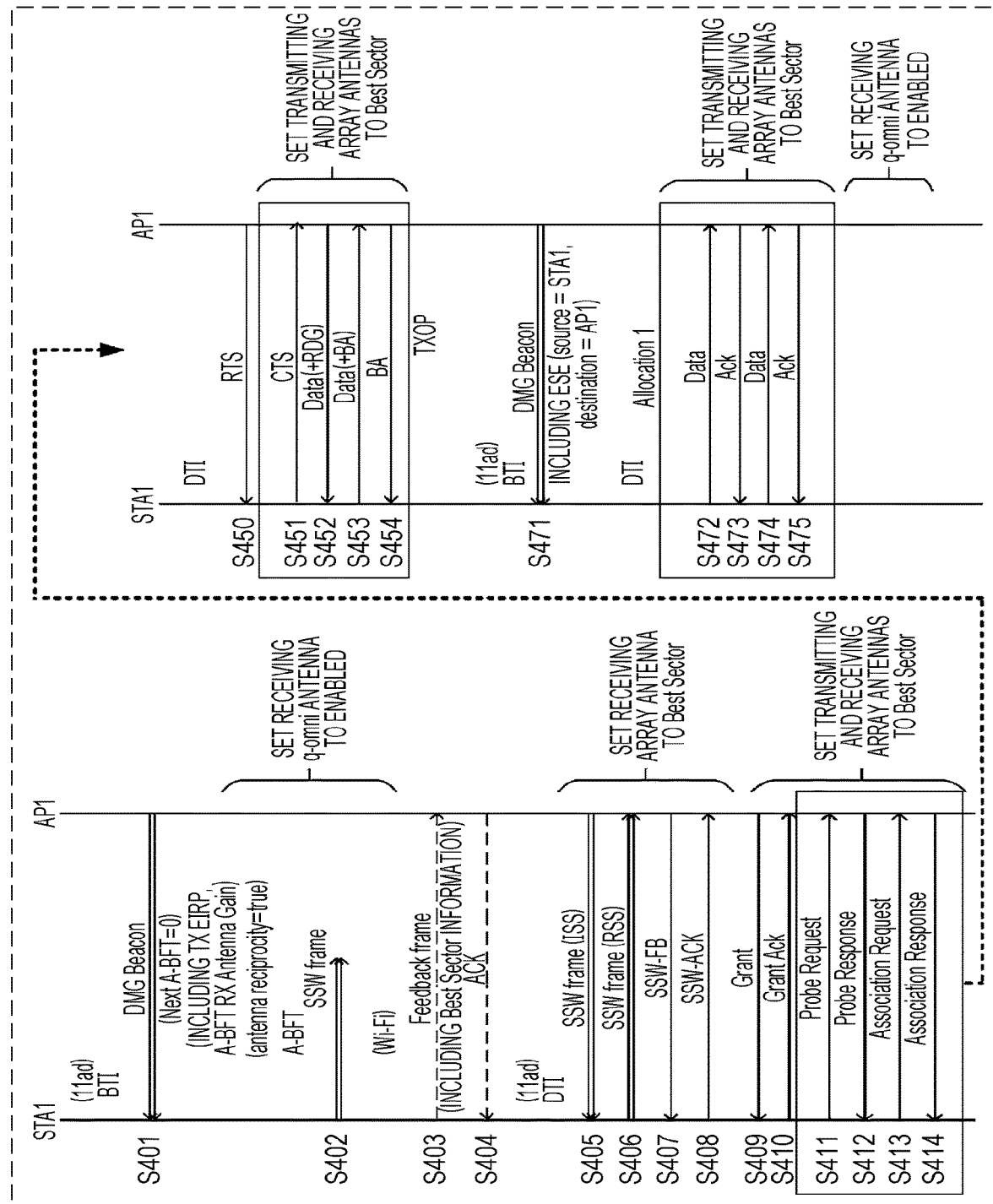
FIG. 27 is a diagram illustrating an example of procedures for a communication device (AP) and communication device (STA) to perform communication, according to a fourth embodiment of the present disclosure.

FIG. 27 is a diagram illustrating an example of procedures of communication between the communication device (AP) 100a (hereinafter, AP1) and communication device (STA) 100b (hereinafter, STA1). In FIG. 27, the AP1 and STA1 include wireless units corresponding to a communication format that differs from millimeter wave communication (hereinafter referred to as WLAN) besides millimeter wave communication (11ad and 11ay).

Examples of WLAN include the IEEE 802.11n format that uses the 2.4 GHz band and 5 GHz band. Another example of WLAN is the Bluetooth (a registered trademark) format that uses the 2.4 GHz band. Cellular communication (e.g., Long Term Evolution (LTE)) may be used to substitute for WLAN. Multihop communication (also referred to as Relay) in millimeter wave communication (IEEE 802.11ad and IEEE 802.11ay) may be used, as another example of WLAN. That is to say, in a case of including information relating to a best sector in a Feedback frame and transmitting the communication device (STA) 100b may use Multihop communication instead of using WLAN.

In FIG. 27, the AP1 and STA1 are in a state capable of data communication using WLAN. That is to say, in a case where the WLAN is the IEEE 802.11ac format, the AP1 and STA1 are in a state where the STA1 is associated with the AP1, and in a case where the WLAN is LTE, the AP1 and STA1 are in a state where the STA1 is attached to the AP1.

Also, FIG. 27 illustrates a state where it is difficult for the AP1 to receive an SSW frame that the STA1 transmits in a case of receiving packets using the receiving q-omni antenna 115. That is to say, the AP1 and STA1 are in a state corresponding to the state illustrated in FIG. 3B, so communication by sector sweep is difficult. On the other hand, the AP1 and STA1 correspond to the states in FIGS. 3A, 3C, and 3D, and accordingly are capable of data communication in a case where the best sector can be set.

In a case where the gain of the transmitting array antenna 106 and receiving array antenna 116 of the AP1 is greater as compared to the gain of the transmitting array antenna 106 and receiving array antenna 116 of the STA1, the situation illustrated in FIG. 27 occurs. For example, a case where AP1 is a wireless bases station or access point having a great number of antenna elements, and the STA1 is a mobile terminal (e.g., cellular phone or smartphone) having a relatively small number of antenna elements, falls under this.

The AP1 also has Antenna Reciprocity. That is to say, the directionalities of the transmitting array antenna 106 and the receiving array antenna 116 are generally equal. Accordingly, the probability that the best sector for the transmitting array antenna 106 is also the best sector for the receiving array antenna 116 is high. The best sector at the transmitting array antenna 106 is equal to or greater than a semi-best sector (i.e., a sector having a gain close to that of the case of the best sector) at the receiving array antenna 116, and the best sector at the receiving array antenna 116 is equal to or greater than a semi-best sector at the transmitting array antenna 106.

In step S401, the AP1 transmits the DMG Beacon frames in each sector while changing sectors. The AP1 may include the TX EIRP field and A-BFT RX Antenna Gain field in the DMG Beacon frame and transmit (see FIGS. 5 and 14). The AP1 may also include the Differential Gain field in the DMG Beacon frame and transmit (see FIG. 18). The AP1 also includes information of Antenna Reciprocity in the DMG Beacon, thereby notifying the STA1 that the AP1 has antenna reciprocity.

In step S401, the STA1 is in the positional relation illustrated in FIG. 3A as to the AP1, and is capable of receiving a DMG Beacon.

The STA1 uses the reception power (RSSI_Beacon) of the DMG Beacon frame and information included in the DMG Beacon frame (e.g., the TX EIRP field and A-BFT RX Antenna Gain field) to determine whether or not an SSW frame can reach the AP1 in A-BFT. In a case where determination is made that it will be difficult for an SSW frame in A-BFT to reach the AP1, the STA1 does not transmit the SSW frame.

Note that an arrangement may be made where determination is made regarding whether or not an SSW frame can reach the AP1, by the STA1 transmitting the SSW frame in A-BFT and depending on whether or not an SSW-FB frame is received from the AP1 (step S402).

In A-BFT, the AP1 may receive an SSW frame from other STA besides the STA1. That is to say, in A-BFT, the AP1 receives packets using the receiving q-omni antenna 115. That is to say, the AP1 and STA1 are in a relation corresponding to the relation illustrated in FIG. 3B, so it is difficult for an SSW frame transmitted by the STA1 in A-BFT to reach the AP1.

In a case of having judged that it will be difficult for an SSW frame in A-BFT to reach the AP1, the STA1 uses WLAN to transmit a Feedback frame to the AP1. The STA1 includes information of the best sector selected in reception of the DMG Beacon in the Feedback frame and transmits (step S403).

Figure 28:
FIG. 28 is a diagram illustrating an example of a Feedback frame according to the fourth embodiment of the present disclosure.

FIG. 28 illustrates an example of Feedback frame. The Header field is a header used in WLAN. For example, the Header field includes transmission destination address (MAC address of AP1), transmission source address (MAC address of the STA1), frame length, and so forth.

The DMG Source Address field includes the transmission source address (MAC address of the STA1) as an 11ad device. The DMG Destination Address field includes the transmission destination address (MAC address of AP1) as an 11ad device. That is to say, the MAC address for WLAN included in the Header field and the MAC address for 11ad may be different for the AP1 and STA1.

The DMG Capabilities field includes information relating to attributes regarding the 11ad standard for the STA1. For example, the DMG Capabilities field includes the number of sectors that the STA1 supports, MCS (Modulation Coding Scheme) No. supported, and so forth. These include information necessary for the AP1 to transmit/receive SSW frames in steps S405 and S406, described later. The AP1 may use the same format as the DMG Capabilities element stipulated in the 11ad standard, as the DMG Capabilities field in FIG. 28.

The DMG SSW Feedback field includes best sector information selected by the STA1 in DMG Beacon reception. The STA1 may use the same format as the SSW Feedback field included in the SSW frame in A-BFT, as the DMG SSW Feedback field.

The AP1 transmits an Ack frame to the STA1 using WLAN, and makes notification regarding reception of the Feedback frame (step S404).

The AP1 can know the best sector of the transmitting array antenna 106 to be used in a case of transmitting data to the STA1 (i.e., FIG. 3C), by receiving the Feedback frame in step S403. The AP1 has antenna reciprocity, so the best sector of the receiving array antenna 116 to be used in a case of receiving data from the STA1 (i.e., FIG. 3D) is set to be the same as the best sector of the transmitting array antenna 106.

In step S405, the AP1 transmits an SSW frame to the STA1 using the information included in the Feedback frame (i.e., performs ISS). For example, the AP1 sets the destination address of the SSW frame to the MAC address for 11ad of the STA1 that has been obtained by the Feedback frame, and transmits. The AP1 also decides the number of SSW frames to be transmitted in accordance with information of the sector count of the STA1 included in the DMG Capabilities field of the Feedback frame.

Note that the AP1 may transmit each SSW frame in each sector while changing sectors in step S405 (e.g., normal SLS). Alternatively, the AP1 may transmit a single SSW frame in step S405, using the best sector included in the Feedback frame.

In step S406, the STA1 transmits each SSW frame in each sector while changing sectors (i.e., performs RSS). In step S406, the STA1 sets the receiving array antenna 116 to the best sector included in the Feedback frame. That is to say, the positional relation between the AP1 and STA1 is the same as in FIG. 3D in step S406, so SSW frames transmitted by the STA1 can reach the AP1.

In step S407, the AP1 transmits an SSW-FB frame, notifying the STA1 that the SSW frame has been received.

In step S408, the STA1 transmits an SSW-ACK frame, notifying the AP1 that the SSW-FB frame has been received. Thus, the communication device (STA) 100b includes information relating to the best sector in a Feedback frame and transmits using WLAN, so even in a case where SSW frames in A-BFT do not reach the communication device (AP) 100a (FIG. 3B), SLS can be performed.

In this arrangement, the communication device (AP) 100a sets the receiving array antenna 116 to the best sector and performs SLS based on information received in a Feedback frame using WLAN, so SLS can be performed even in a case of not receiving an SSW frame in A-BFT (FIG. 3B) from the communication device (STA) 100b. That is to say, the communication device (AP) 100a is capable of communication with a distant communication device (STA) 100b.

Next, a method of the STA1 performing association with the AP1 regarding 11ad will be described. The AP1 sets the receiving q-omni antenna 115 to enabled and stands by, so the positional relation between the AP1 and STA1 is that in FIG. 3B, and it is difficult for the STA1 to transmit an Association Request frame.

Accordingly, after step S408, the AP1 sets the transmitting array antenna 106 to the best sector, and transmits a Grant frame to the STA1 (step S409). Note that hereinafter, the AP1 sets the transmitting array antenna 106 to the best sector in a case of transmitting packets to the STA1, unless stated otherwise in particular.

In step S410, the STA1 transmits a Grant Ack frame to the AP1, to notify of reception of the Grant. The STA1 transmits a Probe Request frame in the range of the time period information included in the Grant frame in step S409. The AP1 sets the receiving array antenna 116 to the best sector in the range of the time period information included in the Grant frame in step S409 (step S411).

That is to say, the positional relation between the AP1 and STA1 corresponds to that in FIGS. 3C and 3D, in the range of the time period information included in the Grant frame in step S409, so transmitted packets can reach the AP1.

In step S412 through step S414, the AP1 transmits a Probe Response frame, the STA1 transmits an Association Request frame, and the AP1 transmits an Association Response frame. Thus, the STA1 completes association with the AP1.

Thus, the communication device (STA) 100b includes information relating to the best sector in a Feedback frame and transmits using WLAN, and transmits an Association Request frame after having received a Grant frame, so even in a case where SSW frames in A-BFT do not reach the communication device (AP) 100a, association by millimeter wave communication can be performed.

The communication device (AP) 100a receives the Feedback frame using WLAN, transmits a Grant frame, and sets the receiving array antenna 116 to the best sector based on information of the Feedback frame in the period indicated by the Grant frame, and performs SLS, so even in a case where an SSW frame is not received in A-BFT from the communication device (STA) 100b, association by millimeter wave communication can be performed.

Next, a method of the STA1 and AP1 performing data communication using millimeter wave communication (11ad and 11ay) will be described. The AP1 sets the receiving q-omni antenna 115 to enabled and stands by, so the positional relation between the AP1 and STA1 is that in FIG. 3B, and it is difficult for the STA1 to transmit data frames using 11ad and 11ay.

FIG. 27 illustrates procedures of the AP1 transmitting an RTS frame to the STA1, and performs data communication with the STA1 (step S450 through step S454).

In step S450 in FIG. 27, the AP1 sets the transmitting array antenna 106 to the best sector, and transmits an RTS frame to the STA1. The STA1 may receive the RTS frame using the receiving q-omni antenna 115 (see FIG. 3A).

FIG. 29 illustrates the format of an RTS frame in 11ad. The Frame Control field includes Type information indicating that the frame is RTS. The Duration field includes information of time period in increments of microseconds, and indicates the time of the AP1 performing communication (TX opportunity (TXOP)) after the RTS frame. The RA field means receiving address, and in step S450 in FIG. 27, the AP1 sets the RA field to the MAC address of the STA1. The TA field means transmitting address, and in step S450 in FIG. 27, the AP1 sets the TA field to the MAC address of the STA1. The FCS (Frame check sequence) field includes error detection code.

In a case of having received the RTS frame in which the address of the STA1 has been set in the RA field, the STA1 transmits a CTS frame to the AP1. The AP1 sets the receiving array antenna 116 to the best sector, and receives the CTS frame. The TXOP is enabled when the AP1 receives the CTS frame (step S451).

The AP1 that has acquired the TXOP may transmit a data frame to the STA1. The AP1 includes an RDG (Reverse Direction Grant) field in the data frame addressed to the STA1 and transmits, thereby granting the STA1 permission to transmit data (step 452).

In a case of having received a data frame including an RDG (permission for the STA1 to transmit), the STA1 includes a BA (Block Ack, i.e., a reception configuration) regarding the data frame received in step S452 in the data frame, and transmits to the AP1 (step 453).

The AP1 transmits a BA regarding the data frame of step S453 to the STA1 (step S454).

As described above, the AP1 transmits an RTS frame to the STA1 and acquires a TXOP, sets the transmitting array antenna 106 and receiving array antenna 116 to the best sector during the TXOP period, and transmits an RDG to the STA1. Accordingly, even if reception of a transmission packet from the STA1 by the receiving q-omni antenna 115 is difficult, data frames from the STA1 can be received using the receiving array antenna 116.

The AP1 may transmit a Grant frame to the STA1 in step S450, instead of the RTS frame, receive a Grant Ack frame in step S451 instated of the CTS frame, and enable data communication with the STA1. These procedures are the same as step S409 through S414, so description will be omitted.

Note that in step S409 and step S450 (in a case of transmitting a Grant frame), the AP1 may transmit a Poll frame to the STA1 before transmitting the Grant frame. The STA1 that has received the Poll frame transmits an SPR (Service period request) frame to the AP1, notifying whether or not it has data to be transmitted to the AP1. That is to say, the STA1 performs a transmission time allocation request to the AP1 using an SPR.

The AP1 sets the receiving array antenna 116 to the best sector, and receives the SPR frame. In a case of the STA1 having judged that data transmission to the AP1 is necessary, the AP1 may transmit a Grant frame in step S409 and step S450 (in a case of transmitting a Grant frame), in accordance with the content of the SPR frame.

The AP1 may also include an ESE (Extended Schedule Element) in the DMG Beacon frame, and schedule the period for performing communication with the STA1 (e.g., Allocation-1 in FIG. 30) (step S471).

Figure 30:
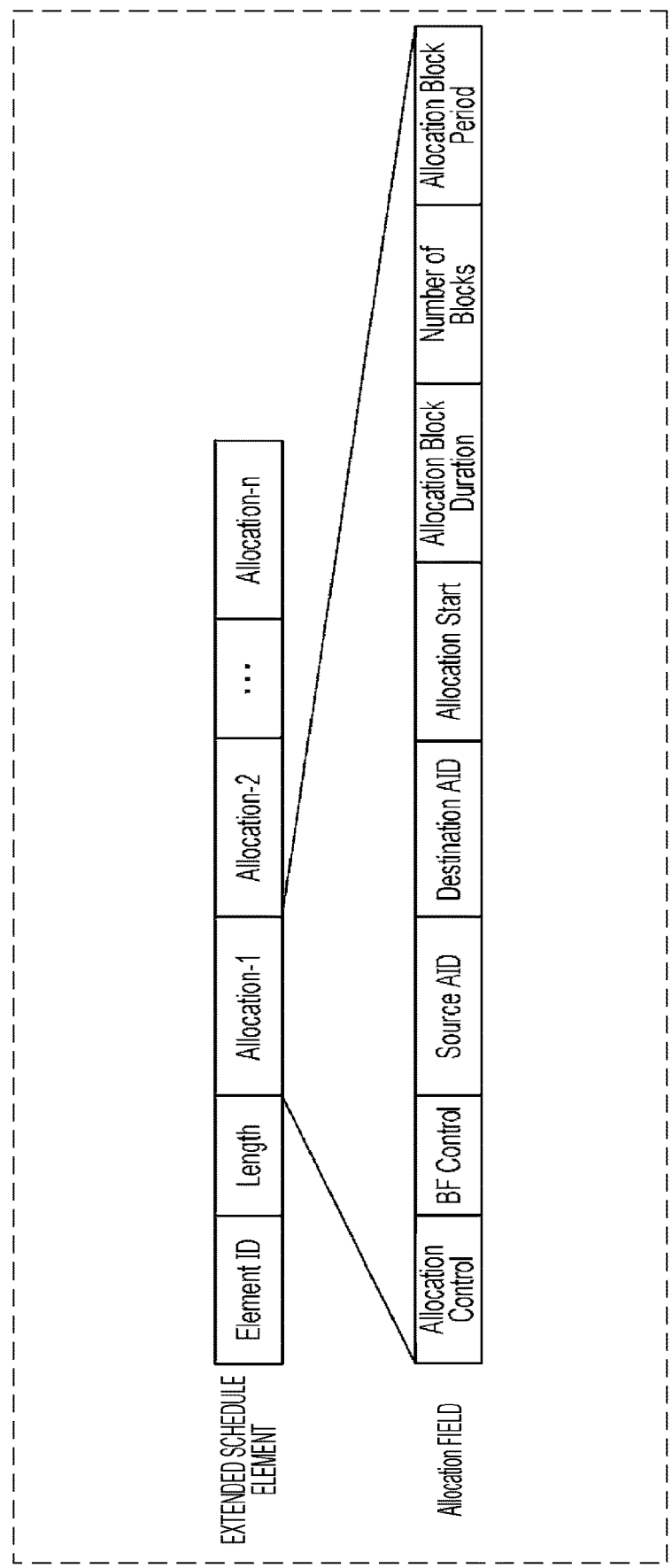
FIG. 30 is a diagram illustrating a format of ESE in the 11ad standard according to the fourth embodiment of the present disclosure.

FIG. 30 illustrates the format of an ESE in the 11ad standard. The AP1 sets the value of the Source AID field of the Allocation-1 to the Association ID (AID) of the STA1, and sets the value of the Destination Aid field to the AID of the AP1. Note that an AID is a value regarding which a different value is decided for each STA at the time of association, and is used instead of an address.

The AP1 includes information indicating the start clock time of Allocation-1 in the Allocation Start field. Also, the AP1 includes information indicating time relating to Allocation-1 in the Allocation Block Duration field. That is to say, the AP1 sets the receiving array antenna 116 to the best sector for performing communication with the STA1 for an amount of time starting at the clock time that the Allocation Start field indicates, for the duration of time indicated by the Allocation Block duration field.

Note that the AP1 may set a value of 2 or greater to the Number of Blocks field, and repeat the time indicated by the Allocation Block duration field (referred to as time block) multiple times, to decide the time of Allocation-1. The AP1 keeps an interval of time indicated by the Allocation Block Period field between two time blocks. In this case, the AP1 sets the receiving array antenna 116 to the best sector to perform communication with the STA1 at each time block.

As described above, the communication device (STA) 100b according to the fourth embodiment includes information relating to the best sector in a Feedback frame, and transmits using WLAN, so even in a case where SSW frames in A-BFT do not reach the communication device (AP) 100a, SLS, association, and data communication can be performed by millimeter wave communication.

The communication device (AP) 100a sets the receiving array antenna 116 to the best sector and performs SLS, based on information from having received the Feedback frame using WLAN, so SLS and data communication can be performed by millimeter wave communication even in a case where SSW frames by A-BFT are not received from the communication device (STA) 100b, and communication can be performed with a distant communication device (STA) 100b.

Modification of First and Second Embodiments

Note that in a case of having reception capabilities that are high as compared to the reception sensitivity level (FIG. 12A) set forth in the standard, the communication device (AP) 100a may include the difference between the value of the standard and reception capabilities in RxGain_ABFT and RxGain_AP_Data and transmit.

For example, in a case of handling reception of MCS0 packets at −81 dBm (which is to say that reception capabilities are 3 dB higher due to being able to handle reception of signals 3 dB lower than the sensitivity level −78 dBm stipulated in the standard), the communication device (AP) 100a may include a value where 3 dB has been added to the value of RxGain_ABFT in the A-BFT RX Antenna Gain field (FIG. 5) and transmit.

Expressing the value of the reception sensitivity level set forth in the standard (see FIG. 12A) as SENSE_REF, and the reception sensitivity of the communication device (AP) 100a as SENSE_AP, additional gain ADD_GAIN_AP is calculated by Expression 11.

ADD_GAIN_AP=SENSE_REF−SENSE_AP        (Expression 11)

Whether or not the communication device (STA) 100b satisfies Expression 12 may be determined in step S104 of FIG. 10.

RSSI_ABFT>SENSE_AP        (Expression 12)

Expression 12 may be modified into the following Expressions 13A through C, using Expression 1, Expression 2, and Expression 11.

EIRP_ABFT−PathLoss_Beacon+
RxGain_ABFT>SENSE_REF−ADD_GAIN_AP        (Expression 13A)

EIRP_ABFT−(EIRP_Beacon+RxGain_Beacon−
RSSI_Beacon)+RxGain_AB FT>SENSE_REF−
ADD_GAIN_AP        (Expression 13B)

(EIRP_ABFT−RxGain_Beacon+RSSI_Beacon)−
(EIRP_Beacon−RxGain_ABFT−
ADD_GAIN_AP)>SENSE_REF        (Expression 13C)

In step S104 in FIG. 10, the values of EIRP_ABFT, RxGain_Beacon, RSSI_Beacon, and SENSE_REF are known to the communication device (STA) 100b. The communication device (STA) 100b makes determination using Expression 13C by receiving the value of (EIRP_Beacon−RxGain_ABFT−ADD_GAIN_AP) from the communication device (AP) 100a.

That is to say, the communication device (STA) 100b determines whether or not an SSW frame in A-BFT will reach the communication device (AP) 100a, including the value of ADD_GAIN_AP, so in a case where the reception capabilities of the communication device (AP) 100a are high as compared to the sensitivity level of the standard, there are more situations where determination can be made that an SSW frame will reach the communication device (AP) 100a.

In step S101 in FIG. 10, the communication device (AP) 100a may transmit a DMG Beacon frame including the values of EIRP_Beacon, RxGain_ABFT, and ADD_GAIN_AP. A method of the communication device (AP) 100a transmitting the values of EIRP_Beacon and RxGain_ABFT has been described in the first embodiment, and a field indicating the value of ADD_GAIN_AP may be included in the EDMG TX RX Info element of the DMG Beacon in the same way (see FIG. 5).

The communication device (AP) 100a may transmit a DMG Beacon frame including the value of (EIRP_Beacon−RxGain_ABFT−ADD_GAIN_AP) in step S101 in FIG. 10. A method of the communication device (AP) 100a including the value of (EIRP_Beacon−RxGain_ABFT) in the Differential Gain field (see FIG. 18) and transmitting has been described in a modification of the second embodiment, and the communication device (AP) 100a may include a field indicating the value of (EIRP_Beacon−RxGain_ABFT−ADD_GAIN_AP) in the Differential Gain field and transmit.

The communication device (AP) 100a may decide the value of the Differential Gain by reading "difference between value of TX EIRP and value of A-BFT RX Antenna Gain" as "value of (EIRP_Beacon−RxGain_ABFT−ADD_GAIN_AP)", and include and transmit in the DMG Beacon frame in FIG. 18.

Figure 31:
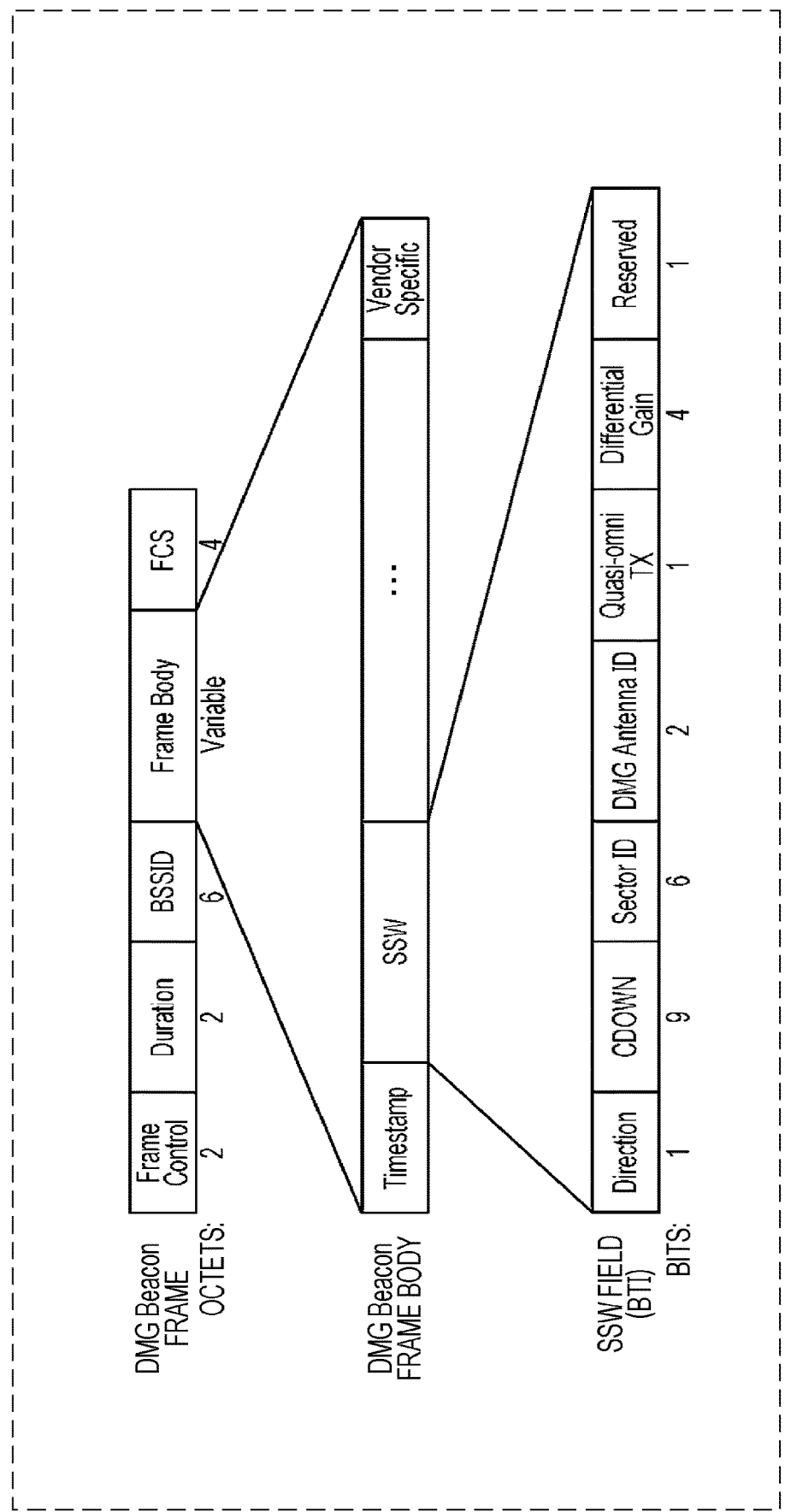
FIG. 31 is a diagram illustrating another example of a format of a DMG Beacon frame according to a modification of the first and second embodiments of the present disclosure.

FIG. 31 is a diagram illustrating a different example of the format of a DMG Beacon frame. In FIG. 31, the Quasi-omni TX field is a field indicating whether or not the DMG Beacon frame has been transmitted by the transmitting q-omni antenna 105. Also, in FIG. 31, the Differential Gain field is four bits.

FIG. 32 is a diagram illustrating an example of the relation between the value of the Differential Gain field and the value of (EIRP_Beacon−RxGain_AB FT−ADD_GAIN_AP). In FIG. 32, for every increase in the value of the Differential Gain field, the value of (EIRP_Beacon−RxGain_AB FT−ADD_GAIN_AP) increases by 6 dB.

The communication device (AP) 100a selects a value closest to the value of (EIRP_Beacon−RxGain_ABFT−ADD_GAIN_AP) from FIG. 32 and decides the value of the Differential Gain field, and transmits this. In a case of not notifying the value of (EIRP_Beacon−RxGain_ABFT−ADD_GAIN_AP) to the communication device (STA) 100b, the communication device (AP) 100a sets the value of the Differential Gain field to 15 (undefined), and includes in a DMG Beacon frame and transmits.

As described above, the communication device (AP) 100a includes the Differential Gain field in a DMG Beacon frame and transmits, and accordingly the communication device (STA) 100b can determine whether an SSW frame in A-BFT will reach the communication device (AP) 100a or not. Accordingly, transmission of unnecessary SSW frames can be avoided, so electric power consumption of the communication device (STA) 100b can be reduced, and unnecessary interference waves to other STAs can be reduced.

Also, the communication device (AP) 100a calculates and transmits the value of the Differential Gain field based on the value of EIRP for transmitting the DMG Beacon (EIRP_Beacon), the reception antenna gain in A-BFT (RxGain_ABFT), and the difference between the sensitivity level of the standard and reception capabilities (ADD_GAIN), so the communication device (STA) 100b can determine whether an SSW frame in A-BFT will reach the communication device (AP) 100a or not. Accordingly, transmission of unnecessary SSW frames can be avoided, so electric power consumption of the communication device (STA) 100b can be reduced, and unnecessary interference waves to other STAs can be reduced.

Fifth Embodiment

A method of the communication device (AP) 100*a* and communication device (STA) 100*b* performing communication, which is different from the first through fourth embodiments, will be described in a fifth embodiment.

Figure 33:
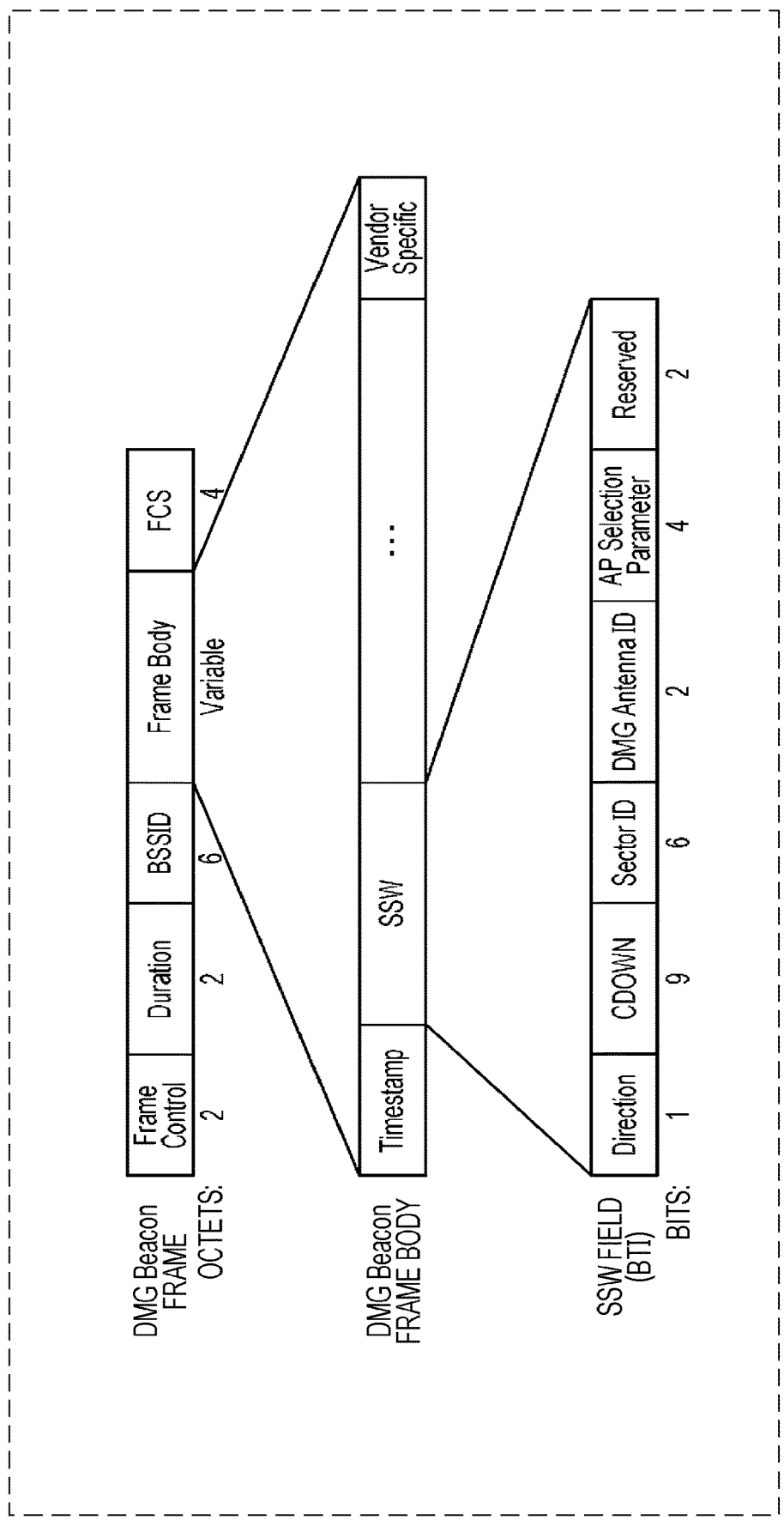
FIG. 33 is a diagram illustrating an example of a DMG Beacon frame according to a fifth embodiment of the present disclosure.

FIG. 33 is a diagram illustrating an example of the DMG Beacon frame that the communication device (AP) 100*a* transmits. In contrast with the DMG Beacon frame in FIG. 31 including the Quasi-omni TX field and Differential Gain field, the DMG Beacon frame in FIG. 33 includes an AP Selection Parameter field.

FIG. 34 is a diagram illustrating an example of values of the AP Selection Parameter field. In a case of transmitting the DMG Beacon frame using the transmitting q-omni antenna 105, the communication device (AP) 100*a* sets the value of the AP Selection Parameter field to 0.

In a case of transmitting the DMG Beacon frame using the transmitting array antenna (directional antenna) 106, the communication device (AP) 100*a* sets the value of the AP Selection Parameter field to a value other than 0, in accordance with the value of (EIRP_Beacon−RxGain_ABFT−ADD_GAIN_AP).

That is to say, the communication device (AP) 100*a* selects a value (1 through 14) that is closest to the value of (EIRP_Beacon−RxGain_ABFT−ADD_GAIN_AP) from FIG. 34, decides the value of the AP Selection Parameter field, and transmits. In a case of not notifying the communication device (STA) 100*b* of the value of (EIRP_Beacon−RxGain_ABFT−ADD_GAIN_AP), the communication device (AP) 100*a* sets the value of the AP Selection Parameter field to 15 (undefined), and includes in the DMG Beacon frame and transmits.

Unlike the Differential Gain field in FIG. 31, each time the value of the AP Selection Parameter field increases by 1, the value of (EIRP_Beacon−RxGain_ABFT−ADD_GAIN_AP) increases by 3 dB. That is to say, the communication device (AP) 100*a* can accurately notify the communication device (STA) 100*b* of the value of (EIRP_Beacon−RxGain_ABFT−ADD_GAIN_AP) by including the AP Selection Parameter field in the DMG Beacon frame and transmitting.

In a case of transmitting the DMG Beacon frame, the communication device (AP) 100*a* notifies whether or not transmission is by the transmitting q-omni antenna 105 by whether or not the value of the AP Selection Parameter field is 0, instead of including the Quasi-omni TX field in FIG. 31 and transmitting, so the Quasi-omni TX field can be omitted. Thus, a greater number of Reserved bits in the DMG Beacon frame can be secured, e.g., two bits in FIG. 33 whereas this is one bit in FIG. 31.

Figure 35:
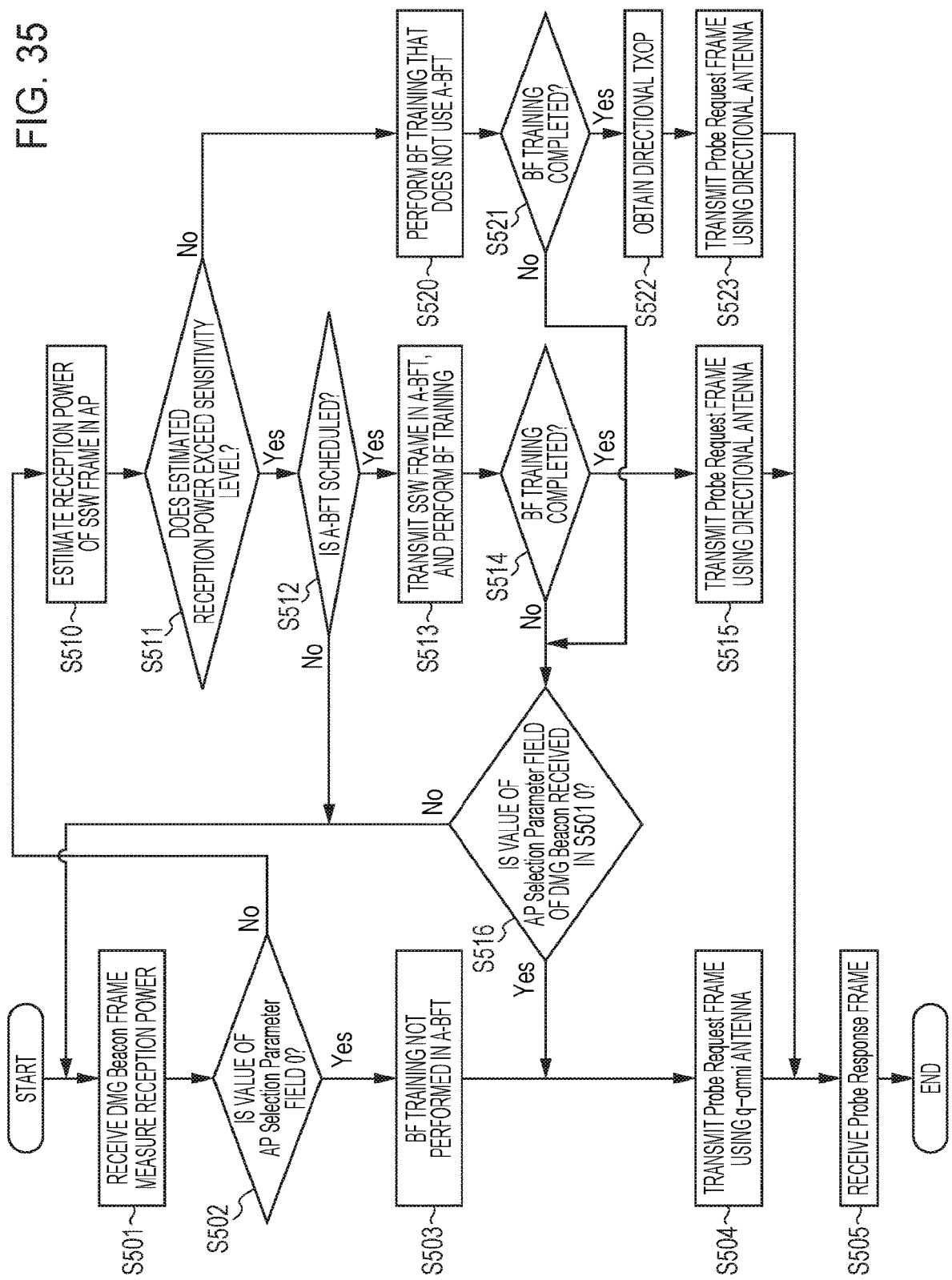
FIG. 35 is a flowchart illustrating reception processing of the DMG Beacon frame in FIG. 33 by a communication device (STA) 100b according to the fifth embodiment of the present disclosure.

FIG. 35 is a flowchart illustrating reception processing of the DMG Beacon frame in FIG. 33 by the communication device (STA) 100*b*. FIG. 35 also illustrates processing of the communication device (STA) 100*b* performing an active scan, i.e., processing of the communication device (STA) 100*b* transmitting a Probe Request frame to the communication device (AP) 100*a* and a Probe Response frame being received. The communication device (STA) 100*b* detects an access point to which the communication device (STA) 100*b* can connect (e.g., the communication device (AP) 100*a*) by repeating the procedures of FIG. 35 for each channel.

In step S501, the communication device (STA) 100*b* receives a DMG Beacon frame. The communication device (STA) 100*b* measures the reception power of the DMG Beacon frame (RSSI_Beacon).

In step S502, the communication device (STA) 100*b* analyzes the received DMG Beacon frame, and extracts the value of the AP Selection Parameter field. The communication device (STA) 100*b* determines whether or not the value of the extracted AP Selection Parameter field is 0, and if the value is 0, e.g., in a case of determining that the DMG Beacon frame has been transmitted by the transmitting q-omni antenna 105, advances to step S503. In a case where the value of the AP Selection Parameter field is 1, determination is made that the DMG Beacon frame has been transmitted by a directional antenna, and the flow advances to step S510.

In step S503, the communication device (STA) 100*b* does not perform beamforming training in A-BFT, and accordingly performs the following processing.

The communication device (STA) 100*b* analyzes the received DMG Beacon frame, and determines whether or not A-BFT is scheduled. If A-BFT is not scheduled, the communication device (STA) 100*b* advances to step S504. In a case where A-BFT is scheduled, the communication device (STA) 100*b* advances to step S504 after the A-BFT period is completed.

Note that in a case where A-BFT is scheduled, in step S503 the communication device (STA) 100*b* may advance to step S513 (the transition from step S503 to step S513 is omitted from illustration).

In step S504, the communication device (STA) 100*b* sets the transmission RF circuit 104 (see FIG. 4) to transmit using the transmitting q-omni antenna 105, and transmits a Probe Request frame.

The communication device (STA) 100*b* may transmit in step S504 using the format for the Probe Request frame stipulated in the 11ad standard. The communication device (STA) 100*b* may also include a field in the Probe Request frame indicating transmission using the transmitting q-omni antenna 105, and transmit.

In step S505, the communication device (STA) 100*b* receives a Probe Response frame transmitted by the communication device (AP) 100*a*, and the processing ends.

Next, a case where the AP Selection Parameter field is other than 0 will be described in step S502.

In step S510, the communication device (STA) 100*b* decides the value of (EIRP_Beacon−RxGain_ABFT−ADD_GAIN_AP) from the values of the received AP Selection Parameter field, using FIG. 34. The communication device (STA) 100*b* calculates the estimated value (estimated reception power) of the reception power of the SSW frame at the communication device (AP) 100*a* from the calculated value of (EIRP_Beacon−RxGain_ABFT−ADD_GAIN_AP) and the RSSI_Beacon value measured in step S501. The estimated reception power may be calculated using the left side of Expression 13C.

In step S511, the communication device (STA) 100*b* determines whether or not the estimated reception power calculated in step S510 exceeds the sensitivity level power (SENSE_REF). That is to say determination of Expression 13C is performed.

In a case where the estimated reception power exceeds the sensitivity level power, the communication device (STA) 100*b* advances to step S512. In a case where the estimated reception power does not exceed the sensitivity level power, the communication device (STA) 100*b* advances toe step S520.

In step S512, the communication device (STA) 100*b* analyzes the received DMG Beacon frame, and determines whether or not A-BFT is scheduled. In a case where A-BFT is not scheduled, the flow returns to step S501, and the next DMG Beacon frame is received. For example, the communication device (STA) 100*b* repeats step S501 through step S512 until the DMG Beacon frame regarding which A-BFT is scheduled has been received (this transition is omitted from illustration).

In step S513, in a case where A-BFT has been scheduled for the received DMG Beacon frame (Yes in S512), the communication device (STA) 100b transmits an SSW frame to the communication device (AP) 100a, and performs BF training. In a case of having received an SSW Feedback frame that the communication device (AP) 100a transmits, the communication device (STA) 100b deems BF training to have been completed.

Also, in a case where no SSW Feedback frame is received at the time of completion of the A-BFT period, in step S513 the communication device (STA) 100b deems BF training to have been incomplete or BF training to have failed. A cause for failed BF training is, for example, in a case where transmission of SSW frames by the communication device (STA) 100b and another STA overlap and SSW frame transmission signals compete, the communication device (AP) 100a may not receive the SSW frame nor transmit the SSW Feedback frame.

In a case of having completed BF training in step S514, the communication device (STA) 100b advances to step S515. In a case of having not completed BF training, the communication device (STA) 100b advances to step S516.

In step S515, the communication device (STA) 100b transmits a Probe Request frame using the directional antenna set to the best sector decided in the BF training in step S513, and advances to step S505.

In step S516, the communication device (STA) 100b determines whether or not the value of the AP Selection Parameter field in the DMG Beacon frame received in S501 is 0, and if the value is 0 advances to S504, but if the value is other than 0, advances to S501.

Note that a case where a determination of Yes is made in step S516 is a case where the communication device (STA) 100b has transitioned from step S503 to S513 (this transition is omitted from illustration). Note that the communication device (STA) 100b may omit the determination in step S516, and transition to step S501 in the same way as in the case of No in step S516.

Next, the operations of the communication device (STA) 100b in a case where the communication device (STA) 100b has determined that the estimated reception power does not exceed the sensitivity level (No) in step S511 will be described.

In step S520, the communication device (STA) 100b performs BF training not using A-BFT. The communication device (STA) 100b may perform the BF training method using Wi-Fi and DTI illustrated in steps S403 through S408 illustrated in FIG. 27, for example, as BF training not using A-BFT. Alternatively, the communication device (STA) 100b may perform Asymmetric Beamforming Training illustrated in FIG. 36 (to be described later) as BF training not using A-BFT during the DTI period.

In step S520, in a case where a SSW Feedback frame or SSW-ACK frame (to be described later) that the communication device (AP) 100a transmits has been received, the communication device (STA) 100b deems BF training to have been completed.

Next, the DMG Beacon frame fields will be described with regard to "perform BF training that does not use A-BFT" of step S520 in FIG. 35, with reference to FIGS. 36 through 38.

Figure 36:
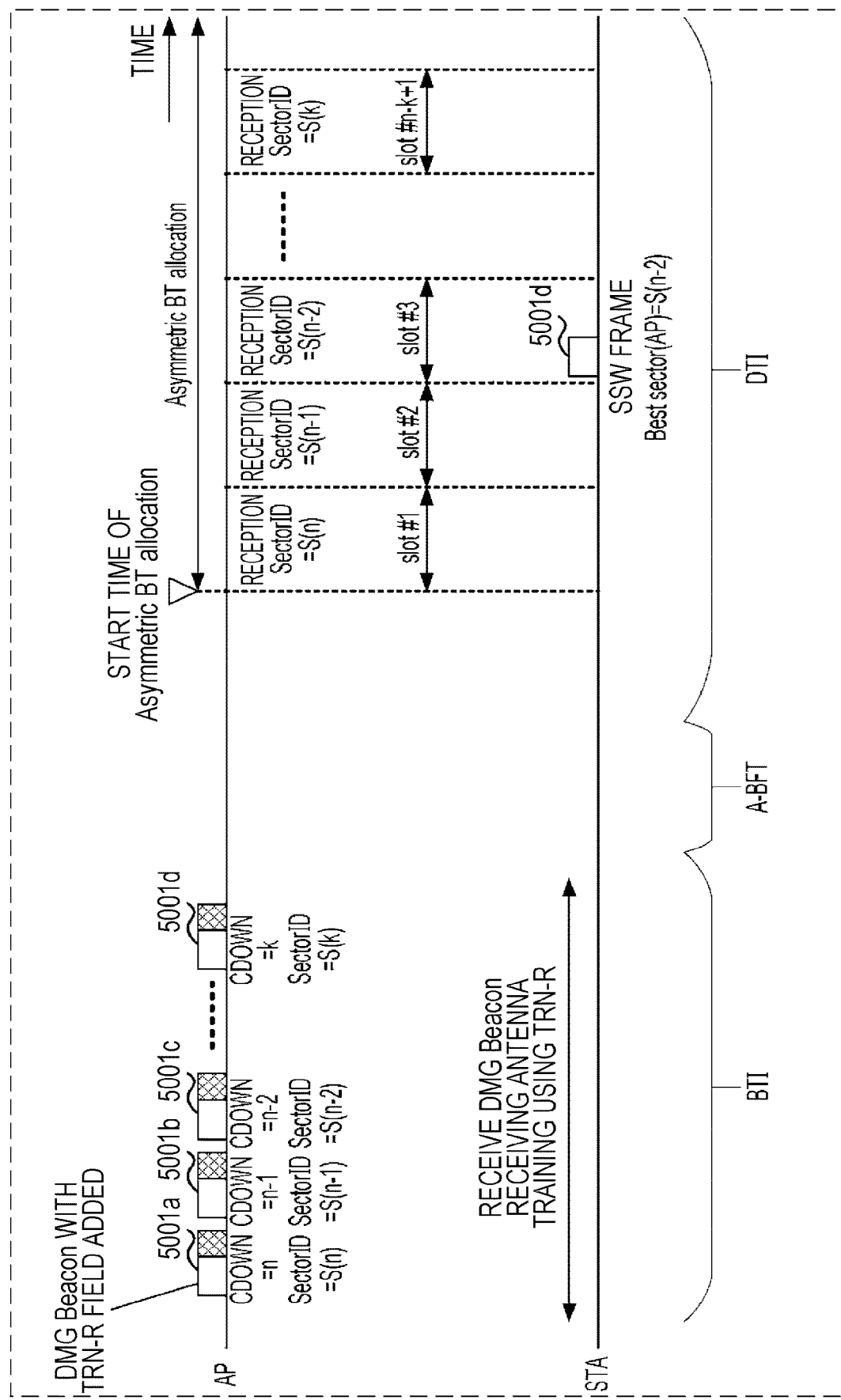
FIG. 36 is a diagram illustrating an example of processing procedures for Asymmetric Beamforming Training according to the fifth embodiment of the present disclosure.

FIG. 36 is a diagram illustrating an example of a method of the communication device (AP) 100a and communication device (STA) 100b carrying out BF training without using A-BFT, in step S520 in FIG. 35.

First, the operations of the communication device (AP) 100a will be described. The communication device (AP) 100a transmits DMG Beacon frames 5001a, 5001b, 5001c, and 5001d, with a TRN-N field attached thereto, for each transmission sector in the BTI period.

Figure 37:
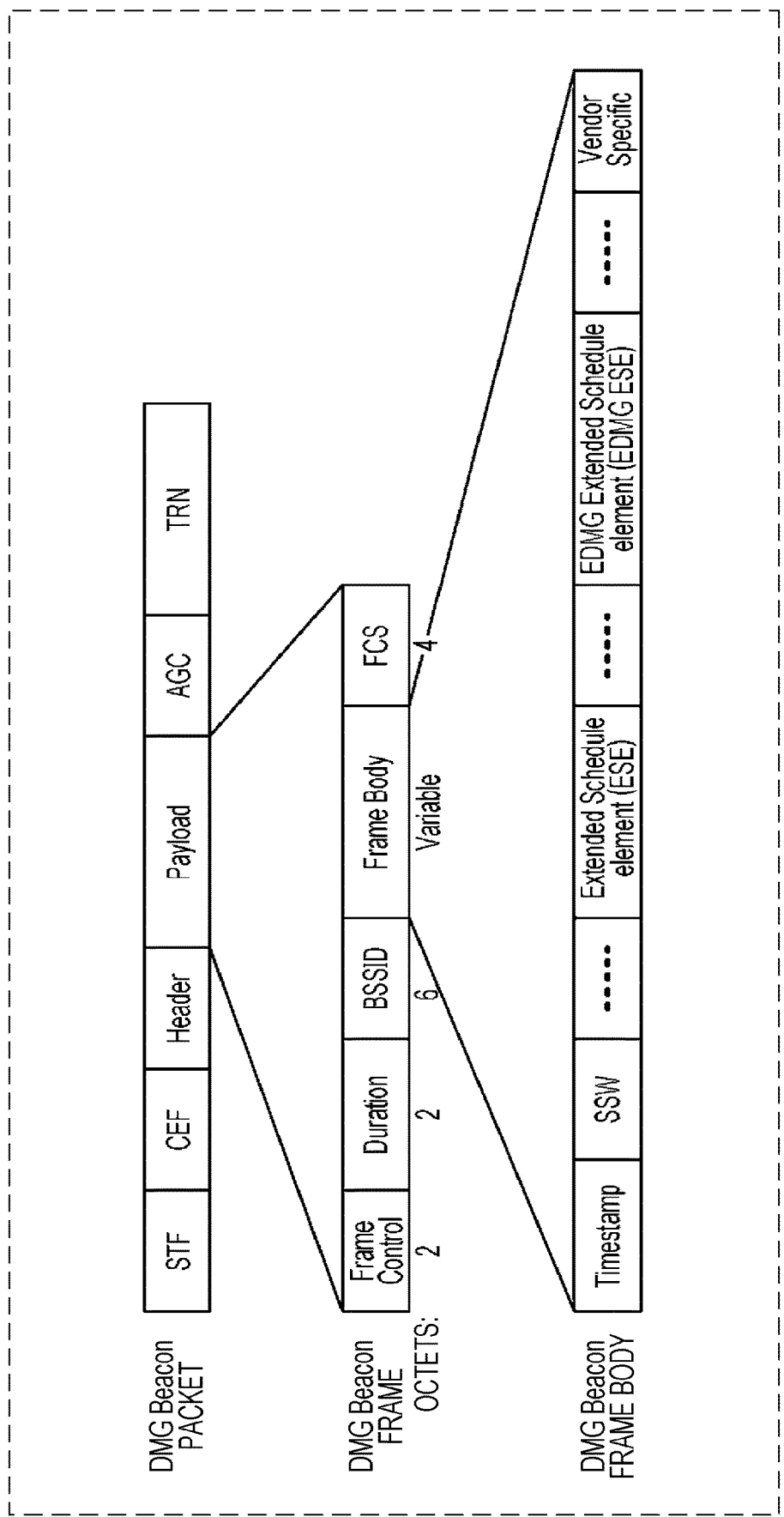
FIG. 37 is a diagram illustrating an example of a format of a DMB Beacon packet according to the fifth embodiment of the present disclosure.

FIG. 37 is a diagram illustrating an example of the format of a PHY packet (referred to as a DMG Beacon packet) including frames of the DMG Beacon frames 5001a, 5001b, 5001c, and 5001d. The DMG Beacon packet is stipulated in the 11ad standard, in and includes the STF (Short Training Field), CEF (Channel Estimation Field), Header (header), Payload, AGC (Automatic Gain Control), and TRN (training) field.

The communication device (AP) 100a includes multiple TRN-R subfields in the TRN field attached to the DMG Beacon frames 5001a, 5001b, 5001c, and 5001d and transmits. The communication device (STA) 100b performs reception, switching reception sectors for each TRN-R subfield of the TRN fields in the DMG Beacon frames 5001a, 5001b, 5001c, and 5001d. The communication device (STA) 100b selects a reception sector of which the reception quality is good, and decides the best sector for the communication device (STA) 100b.

In a case where the communication device (STA) 100b has reception antenna pattern reciprocity, the communication device (STA) 100b sets the best sector of the transmitting antenna and best sector of the receiving antenna to be the same No. For example, in a case where the communication device (STA) 100b has reception antenna pattern reciprocity, and the communication device (STA) 100b performs BF training of the receiving antenna, the best sector of the transmitting antenna may be decided in addition to the best sector of the receiving antenna.

The payload of the DMG Beacon packet in FIG. 37 includes the DMG Beacon frame. The DMG Beacon frame includes a Frame Control field, Duration field, BSSID field, Frame Body field, and FCS field.

The DMG Beacon frames 5001a, 5001b, 5001c, and 5001d include a Timestamp field, SSW (Sector Sweep) field, Extended Schedule element (referred to as ESE), and EDMG (Enhanced Directional Multi-Gigabit) Extended Schedule element (referred to as EDMG ESE).

FIG. 38 is a diagram illustrating an example of the format of the SSW field in the DMG Beacon frames 5001a, 5001b, 5001c, and 5001d. The SSW field includes a Direction subfield, CDOWN subfield, Sector ID subfield, DMG Antenna ID subfield, AP Selection Parameter subfield, and Reserved subfield.

In the BTI, the communication device (AP) 100a transmits a DMG Beacon frame where the value of the CDOWN subfield has been reduced by one each DMG Beacon frame. For example, in a case where the value of the CDOWN subfield in the DMG Beacon frame 5001a is n (where n is an integer of 1 or greater), the communication device (AP) 100a sets the value of the CDOWN subfield in the DMG Beacon frame 5001b to be transmitted next after the DMG Beacon frame 5001a to be n−1. A value k of the CDOWN subfield is an integer of 0 or greater.

Also, the communication device (AP) 100a includes the value of the transmitting antenna No. (sector ID) to be used for transmitting the DMG Beacon frame in the Sector ID subfield of the DMG Beacon frame and transmits. For example, the sector ID of the DMG Beacon frame 5001a is S(n) (where S(n) is an integer that is 1 or greater but 64 or smaller), and the sector ID of the DMG Beacon frame 5001*b* is S(n−1) (where S(n−1) is an integer that is 1 or greater but 64 or smaller).

The communication device (AP) 100*a* decides the value of the AP Selection Parameter subfield in the DMG Beacon frame 5001*a* based on the transmission EIRP where the sector ID is S(n), the gain of the receiving q-omni antenna, and the value of the additional gain (see FIG. 34).

An example of the format of the ESE in the DMG Beacon frames 5001*a*, 5001*b*, 5001*c*, and 5001*d* has been illustrated in FIG. 30, for example. In FIG. 36, the communication device (AP) 100*a* schedules an Asymmetric BT allocation period in the DTI period. For example, the value of an Allocation Start subfield of one allocation field (e.g., allocation-p, where p is an integer of 1 or greater) in the ESE, is set to the start clock time of Asymmetric BT allocation, to allocate time. Also, the communication device (AP) 100*a* sets the values of the Allocation Block Duration subfield of allocation-p, Number of Blocks subfield, and Allocation Block Period subfield, to represent the period of Asymmetric BT allocation.

Here, the communication device (AP) 100*a* sets the value of the Source AID of Allocation-p to 255 (a value indicating broadcast), and notifies that any communication device may start transmission in the Asymmetric BT allocation period indicated by Allocation-p. The communication device (AP) 100*a* may also set the value of Destination AID to the Association ID of the communication device (AP) 100*a* (e.g., 0).

Figure 39:
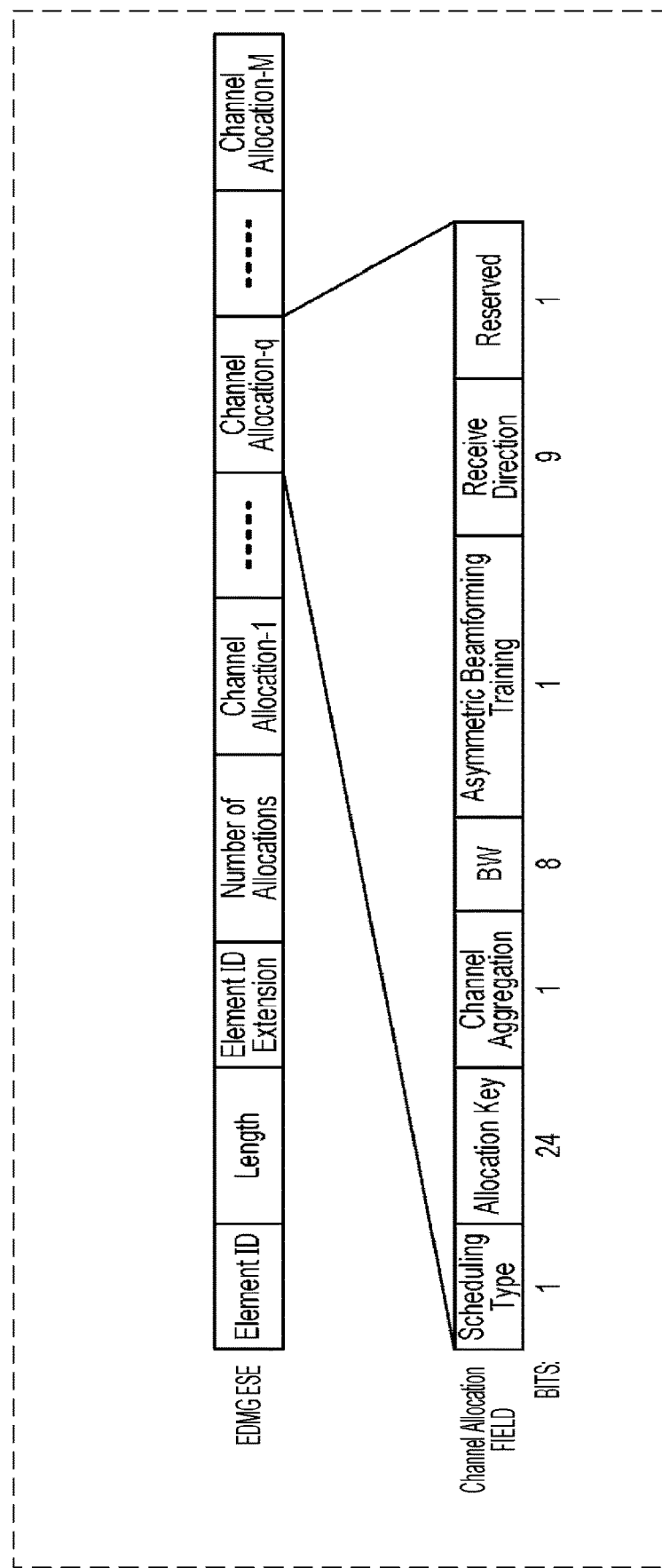
FIG. 39 is a diagram illustrating an example of a format of an EDMG ESE according to the fifth embodiment of the present disclosure.

FIG. 39 is a diagram illustrating an example of the format of the EDMG ESE of the DMG Beacon frames 5001*a*, 5001*b*, 5001*c*, and 5001*d*. The EDMG ESE includes an Element ID field, Length field, Element ID Extension field, Number of Allocations field, and an M count of Channel Allocation fields (where M is an integer of 1 or greater, and q is an integer of 1 or greater but smaller than M).

The Channel Allocation field includes a Scheduling Type subfield, Allocation Key subfield, Channel Aggregation subfield, BW (Bandwidth) subfield, Asymmetric Beamforming Training subfield, Receive Direction subfield, and Reserved subfield.

In a case of scheduling Asymmetric BT allocation in the DTI, the communication device (AP) 100*a* sets the value of the Asymmetric Beamforming Training subfield in one Channel allocation field (e.g., Channel allocation-q) to 1.

The communication device (AP) 100*a* also includes the value of part (e.g., Allocation AID subfield, omitted from illustration) of the Allocation Control subfield (see FIG. 30) of the allocation-p of the ESE in the Allocation Key subfield of Channel allocation-q.

By setting the value of the Asymmetric Beamforming Training subfield to 1, the communication device (AP) 100*a* makes notification that Asymmetric BT allocation is present in the DTI, and by including the value of the AID of Allocation of the allocation-p of the ESE in the Allocation Key subfield in the Cannel allocation-q, makes notification that the start clock time and duration of the Asymmetric BT allocation is the same as the start clock time and duration of the allocation-p.

The communication device (AP) 100*a* also sets the value of the Receive Direction subfield to the value of CDOWN of the DMG Beacon transmitted first in the BTI (e.g., n, which is the value of CDOWN of the DMG Beacon 5001*a* in FIG. 36). This value is referred to as CDOWN initial value.

Now, the processing at the communication device (AP) 100*a* and communication device (STA) 100*b* in the BTI in FIG. 36 corresponds to step S501 in FIG. 35. First, the communication device (AP) 100*a* transmits the DMG Beacon packet in FIG. 37, and schedules Asymmetric BT allocation. Also, when receiving the DMG Beacon packet, the communication device (STA) 100*b* measures the reception power of the DMG Beacon packet, and performs receiving antenna training using the TRN-R subfield. Further, the communication device (STA) 100*b* decides the best sector for the transmitting antenna from antenna pattern reciprocity.

Next, in a case of having made determination of No in both steps S502 and S511 in FIG. 35, the communication device (STA) 100*b* omits transmission of an SSW frame in A-BFT in FIG. 36.

Next, at the start clock time of Asymmetric BT allocation in FIG. 36, the communication device (AP) 100*a* sets the receiving antenna to the same sector as the DMG Beacon transmitted first (e.g., DMG Beacon 5001*a*) in the BTI (e.g., sector with Sector ID of S(n), referred to as first sector).

After a predetermined amount of time (e.g., slot time) has elapsed from the start clock time of Asymmetric BT allocation, the communication device (AP) 100*a* switches the receiving antenna to the same sector as the DMG Beacon transmitted second (e.g., DMG Beacon 5001*b*) in the BTI (e.g., sector with Sector ID of S(n−1), referred to as second sector).

Note that the duration that the communication device (AP) 100*a* sets to the first sector is slot 1 (slot #1) and the duration set to the second sector is slot 2 (slot #2).

Thus, from the start clock time of Asymmetric BT allocation, the communication device (AP) 100*a* sequentially switches reception sectors each slot time, and stands by. The communication device (AP) 100*a* performs switching of reception sectors in Asymmetric BT allocation in the same order as performing switching of transmission sectors in DMG Beacon transmission.

Next, operations of the communication device (STA) 100*b* will be described. In the BTI, the communication device (STA) 100*b* measures the reception quality for each reception of a DMG Beacon frame, and decides the sector ID of a DMG Beacon frame with good quality to be the best sector for the communication device (AP) 100*a*.

For example, the communication device (STA) 100*b* decides the best sector of the communication device (AP) 100*a* (e.g., sector ID of S(n−2)) by receiving the payload of a DMG Beacon packet using the receiving q-omni antenna 115 in the BTI, switches the receiving array antenna (directional antenna) 116, and receives a TRN-R field, thereby deciding the best sector for the communication device (STA) 100*b*.

The communication device (STA) 100*b* sets the transmission sector to the best sector of the communication device (STA) 100*b* in Asymmetric BT allocation, and transmits SSW frame 5001*d*.

In order for the SSW frame 5001*d* to reach the communication device (AP) 100*a*, the communication device (STA) 100*b* transmits the SSW frame to the communication device (AP) 100*a* in the positional relation in FIG. 3D. Accordingly, the communication device (STA) 100*b* transmits the SSW frame in a slot where the reception sector has been set to S(n−2) by the communication device (AP) 100*a*.

Note that the communication device (AP) 100*a* decides which slot is the slot for the communication device (AP) 100*a* to set the reception sector to S(n−2) as follows. In the BTI, it is difficult for the communication device (STA) 100*b* to distinguish what number DMG Beacon frame in sequence the received DMG Beacon frame is from the reception clock time. The reason is that the length (occupation time) of the DMG Beacon frame is variable. Also, the DMG Beacon frame is transmitted from the transmitting array antenna (directional antenna) 106, so there are cases where the communication device (STA) 100*b* does not receive all DMG Beacon frames.

For example, in a case of the communication device (STA) 100*b* receiving a DMG Beacon frame 300 microseconds after the start clock time of the BTI, it is difficult for the communication device (STA) 100*b* to distinguish what number DMG Beacon frame in sequence the received DMG Beacon frame is (i.e., how many DMG Beacons have been transmitted in the aforementioned 300 microseconds), based on the time (300 microseconds).

Now, the communication device (STA) 100*b* is able to distinguish what number DMG Beacon frame in sequence the received DMG Beacon frame is, from the difference between the CDOWN initial value included in the Receive Direction subfield of the received DMG Beacon and the value of the CDOWN subfield in the SSW field of the received DMG Beacon.

For example, in FIG. 36, the value of the Receive Direction subfield in FIG. 39 is n, and the value of the CDOWN subfield of the DMG Beacon frame corresponding to the best sector (e.g., DMG Beacon frame 5001*c*) is n−2, so the communication device (STA) 100*b* adds 1 to the difference (n−(n−2)=2) of the respective values, and distinguishes that the DMG Beacon frame 5001*c* is the DMG Beacon frame transmitted third.

Accordingly, the communication device (STA) 100*b* transmits the SSW frame 5001*d* in slot 3 in the DTI. The communication device (AP) 100*a* sets the reception sector to the same sector in which the DMG Beacon frame 5001*c* was transmitted in slot 3, and stands by for the SSW frame. Accordingly, the communication device (STA) 100*b* can transmit an SSW frame to the communication device (AP) 100*a* that is in the positional relation in FIG. 3D, and the communication device (AP) 100*a* can receive the SSW frame.

Now, in a case of having received an SSW frame that the communication device (STA) 100*b* has transmitted, the communication device (AP) 100*a* deems the BF training to have succeeded. The communication device (AP) 100*a* may transmit an SSW-ACK (Sector Sweep Acknowledgement) frame to the communication device (STA) 100*b*, to notify that BF training has succeeded.

So far, description has been made regarding the "perform BF training that does not use A-BFT" in step S520 in FIG. 35.

In step S521 in FIG. 35, in a case where BF training has been completed (Yes), the communication device (STA) 100*b* advances to step S522. In a case where BF training has not been completed (No), the communication device (STA) 100*b* advances to step S516.

In step S522, the communication device (STA) 100*b* obtains a directional TXOP in order to transmit a Probe Request frame to the communication device (AP) 100*a*. In order to acquire a directional TXOP, the communication device (STA) 100*b* may standby until the communication device (AP) 100*a* transmits a frame including an ESE where the source (originator) address is the communication device (STA) 100*b*, and the destination (addressee) address is the communication device (AP) 100*a* (e.g., DMG Beacon, see step S471 in FIG. 27).

The communication device (AP) 100*a* sets the receiving array antenna to the best sector for communicating with the communication device (STA) 100*b* in the period (allocation) specified by the above-described ESE.

Note that the communication device (AP) 100*a* may include the Sector ID of the best sector in the Receive Direction field of the EDMG ESE, and set the receiving array antenna to the best sector for communicating with the communication device (STA) 100*b* in the period specified by the EDMG ESE (this period is referred to as allocation of directionality).

For example, in a case where the communication device (AP) 100*a* specifies that one allocation of EDMG ESE (e.g., allocation-p) is Asymmetric BF allocation, the Asymmetric Beamforming Training field of allocation-p is set to 1, and the CDOWN initial value is included in the Receive Direction field. Also, in a case where the communication device (AP) 100*a* specifies that another one allocation of EDMG ESE (e.g., allocation-q) is a directional allocation, the Asymmetric Beamforming Training field of allocation-q is set to 0, and the Sector ID of the best sector is included in the Receive Direction field.

Note that in a case of having received an SSW frame from the communication device (STA) 100*b* before association in Asymmetric BF allocation, the communication device (AP) 100*a* may use a DMG Beacon frame in the BTI after the Asymmetric BF allocation to allocate one or more directional allocations, or may allocate one or more directional allocations to multiple beacon intervals.

The communication device (AP) 100*a* may decide the allocation method for directional allocation, in accordance with whether the communication device (STA) 100*b* is before or after association. In a case where the communication device (STA) 100*b* is before association, for example, the communication device (STA) 100*b* transmits a Probe Request frame, Association Request frame, and Authentication Request, but the proportion that the amount of data of frames related to this control occupies in the amount of data that can be transmitted in a single beacon interval is small, so the communication device (AP) 100*a* may transmit an ESE or grant frame, and allocate directional allocation to a single beacon interval.

Also, in a case where the communication device (STA) 100*b* is after association, for example, the communication device (STA) 100*b* transmits a data frame, but amount of data that a data frame occupies in the amount of data that can be transmitted in a single beacon interval is great, so the communication device (AP) 100*a* may transmit an ESE or grant frame, and allocate directional allocation to a multiple beacon intervals. Note that directional allocation may be allocated to multiple beacon intervals even of the communication device (STA) 100*b* is before association.

The communication device (STA) 100*b* may transmit an SSW frame in Asymmetric BF allocation even after association, and the communication device (AP) 100*a* may request scheduling of directional allocation. Accordingly, the communication device (AP) 100*a* periodically schedules directional allocation, so usage efficiency of wireless resources is improved, and throughput can be improved.

Also, in step S522, the communication device (STA) 100*b* may standby for transmission of a Grant frame from the communication device (AP) 100*a* (see step S409 in FIG. 27) and transmission of an RTS frame from the communication device (AP) 100*a* (see step S450 in FIG. 27).

The communication device (AP) 100*a* sets the receiving array antenna 116 to the best sector for communicating with the communication device (STA) 100*b* over the period (allocation) that the aforementioned Grant frame specifies. The communication device (AP) 100*a* also sets the receiving array antenna 116 to the best sector for communicating with the communication device (STA) 100b over the period that the aforementioned RTS frame specifies.

In step S523, the communication device (STA) 100b uses the transmitting array antenna (directional antenna) 106 set to the best sector decided in the BF training in step S520 to transmit a Probe Request frame. The communication device (AP) 100a has set the receiving array antenna 116 to the best sector for communicating with the communication device (STA) 100b, so even in a case where determination of No has been made in step S511 (e.g., an SSW frame in A-BFT will not reach the communication device (AP) 100a from the communication device (STA) 100b), the Probe Request frame that the communication device (STA) 100b has transmitted will reach the communication device (AP) 100a.

After having transmitted a Probe Request frame, the communication device (STA) 100b advances to step S505. Note that in a case where the DMG Beacon packet received in step S501 includes a TRN-R subfield, and also the value of the AP Selection Parameter field is 0, the communication device (STA) 100b may perform training for the best sector for the communication device (STA) 100b using the TRN-R subfield, and transmit a Probe Request using the best sector (transmitting array antenna 106) of the communication device (STA) 100b instead of using the transmitting q-omni antenna 105 in step S504.

Note that in a case where the DMG Beacon packet received in step S501 includes a TRN-R subfield, and also a determination of No has been made in step S502 and step S511, the communication device (STA) 100b may advance to step S523 instead of performing Asymmetric BT in step S520, and use Wi-Fi instead of using the transmitting array antenna (directional antenna) 106 to transmit a Probe Request frame to the communication device (AP) 100a.

The communication device (STA) 100b may also transmit a Probe Request frame using OCT (On-channel Tunneling). The communication device (STA) 100b may transmit a Probe Request frame format according to the 11ad and 11ay standards using Wi-Fi.

Note that the communication device (STA) 100b may include an SSW Feedback field in the Probe Request frame and transmit. Accordingly, the communication device (STA) 100b can notify the communication device (AP) 100a of the best sector without performing BF training using A-BFT (step S513) or BF training not using A-BFT (step S520), so delay required for BF training can be reduced, and inference on other STAs due to BF training can be reduced.

The steps of FIG. 35 have been described so far. Note that in a case where a predetermined amount of time elapses after starting the operations of FIG. 35, the communication device (STA) 100b ends the operations of FIG. 35 even if step S505 has not been performed.

According to the above, in step S502 in FIG. 35, the communication device (STA) 100b determines whether or not the value of the AP Selection Parameter field is 0, and in a case where the value is 0, transmits a Probe Request frame using the transmitting q-omni antenna 105, so a Probe Response frame can be received, omitting execution of the BF training in step S513 and step S520. Accordingly, the communication device (STA) 100b can reduce the amount of time necessary for an active scan, and initial connection operations with the communication device (AP) 100a can be completed at an early stage and data communication can be started.

Also, in step S512 in FIG. 35, the communication device (STA) 100b can use the value of the AP Selection Parameter field to determine whether or not an SSW frame in A-BFT will reach the communication device (AP) 100a. In a case of having determined that an SSW frame will reach the communication device (AP) 100a, the communication device (STA) 100b performs BF training using A-BFT (step S513). BF training using A-BFT has a shorter delay as compared with BF training not using A-BFT, so the communication device (STA) 100b can complete BF training at an early stage, and can complete active scanning at an early stage.

Also, in step S511 of FIG. 35, in a case of determining that an SSW frame will not reach the communication device (AP) 100a, the communication device (STA) 100b performs BF training not using A-BFT (step S520), thereby suppressing transmission of SSW frames in A-BFT, which can reduce interference as to the communication device (AP) 100a, other APs, and other STAs.

Also, the communication device (AP) 100a includes the AP Selection Parameter field in the DMG Beacon and transmits, so the STA that has received the DMG Beacon (e.g., the communication device (STA) 100b) can complete active scanning at an early stage, and start data communication with the communication device (AP) 100a.

As described above, the communication device (AP) 100a transmits the DMG Beacon frame with the AP Selection Parameter field included, so whether or not the Probe Request frame will reach the communication device (AP) 100a by Quasi-omni transmission can be determined at the communication device (STA) 100b. Accordingly, the communication device (AP) 100a can avoid transmission of unnecessary SSW frames in A-BFT, so the electric power consumption of the communication device (STA) 100b can be reduced, and occurrence of unnecessary interference waves as to other STAs can be reduced.

Also, the communication device (AP) 100a transmits the DMG Beacon frame including the EDMG ESE field scheduling Asymmetric BT allocation, and a field indicating the CDOWN initial value (Receive Direction field), so the communication device (STA) 100b can distinguish the order of the DMG Beacon frame corresponding to the best sector, and can decide a time slot where an SSW frame can reach the communication device (AP) 100a in Asymmetric BT allocation.

Accordingly, even in cases where the transmission power of the communication device (AP) 100a and communication device (STA) 100b are different, the communication device (STA) 100b can complete beamforming training. Thus, the communication device (AP) 100a can have a wide coverage area.

Sixth Embodiment

Figure 40:
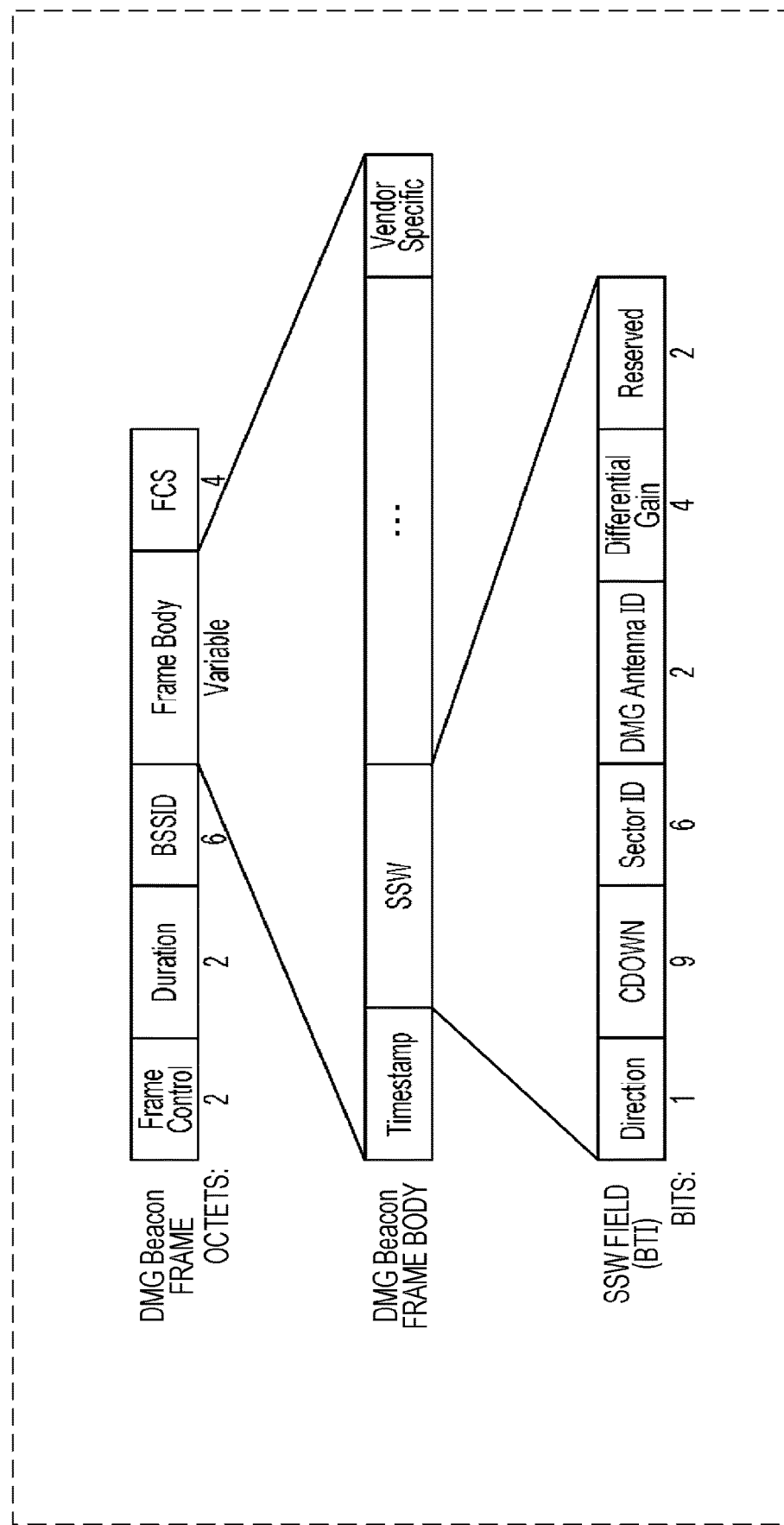
FIG. 40 is a diagram illustrating an example of a DMG Beacon frame transmitted by a communication device (AP) 100a according to a sixth embodiment of the present disclosure.

Another method for the communication device (AP) 100a and communication device (STA) 100b to communicate will be described in a sixth embodiment. FIG. 40 is a diagram illustrating an example of a DMG Beacon frame transmitted by the communication device (AP) 100a. In comparison with the DMG Beacon frame in FIG. 31 that includes the Quasi-omni TX field and Differential Gain field, the DMG Beacon frame in FIG. 40 includes the Differential Gain field and does not include the Quasi-omni TX field.

The communication device (AP) 100a sets the value of the Differential Gain field to one of values (0 through 14) corresponding to the value of (EIRP_Beacon−RxGain_ABFT−ADD_GAIN_AP) and a value (15) corresponding to undefined, in the same way as the modification of the first and second embodiments (FIG. 32), and transmits the DMG Beacon frame with the Differential Gain field included.

Figure 41:
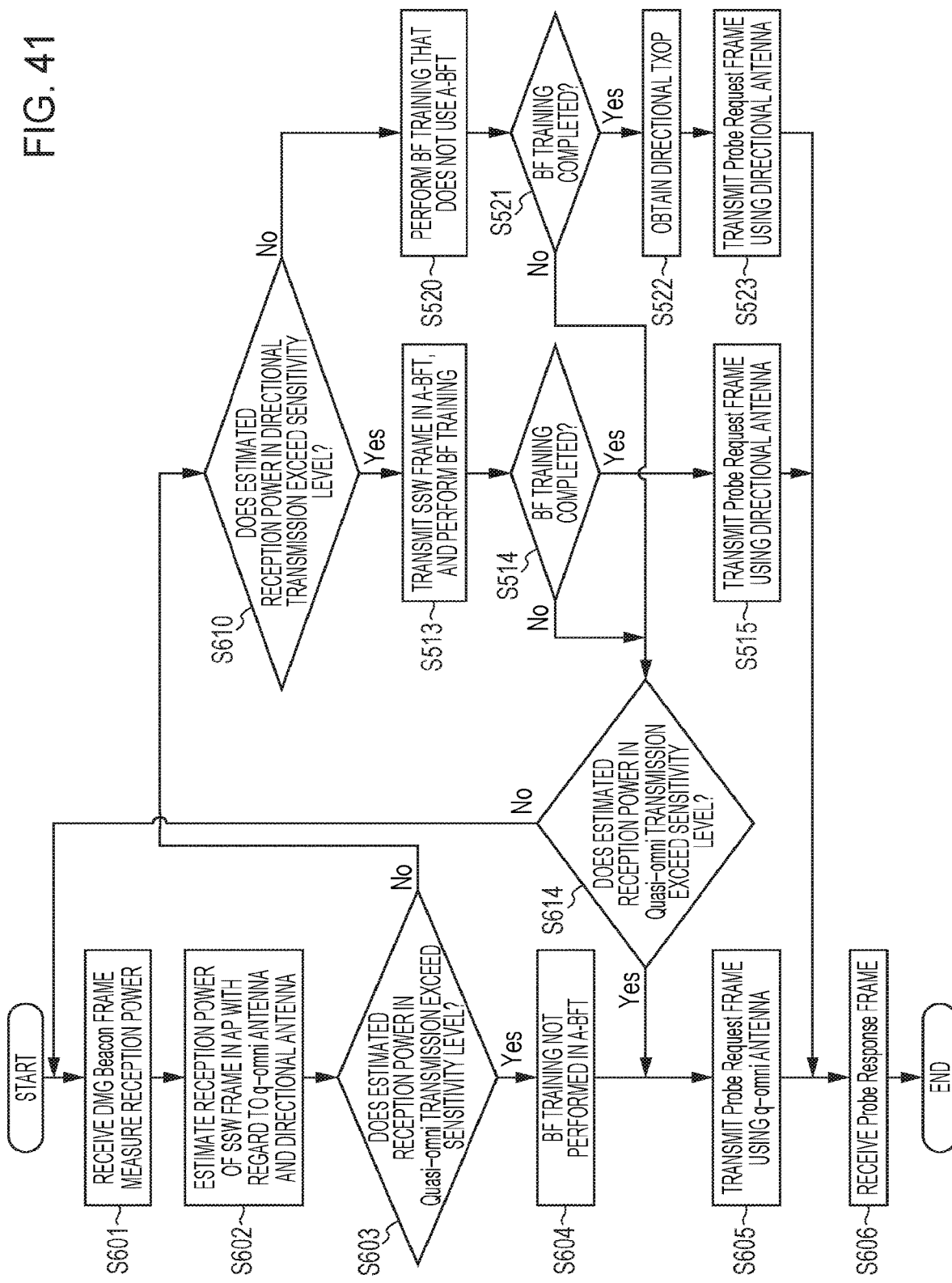
FIG. 41 is a flowchart illustrating reception processing of the DMG Beacon frame in FIG. 40 by a communication device (AP) 100b according to the sixth embodiment of the present disclosure.

FIG. 41 is a flowchart illustrating reception processing of the DMG Beacon frame in FIG. 40 by the communication device (STA) 100b. Note that the communication device (STA) 100b may perform the reception processing in FIG. 41 in a case of having received the DMG Beacon frame in FIG. 31. Steps that are the same processing as in FIG. 35 are denoted by the same symbols, and description will be omitted.

In step S601, the communication device (STA) 100b receives the DMG Beacon frame. The communication device (STA) 100b measures the reception power of the DMG Beacon frame (RSSI_Beacon).

In step S602, the communication device (STA) 100b decides the value of (EIRP_Beacon−RxGain_ABFT−ADD_GAIN_AP) from the value of the Differential Gain field included in the received DMG Beacon frame, using FIG. 32.

The communication device (STA) 100b calculates an estimation value of reception power of an SSW frame by the communication device (AP) 100a in a case where the communication device (STA) 100b has transmitted using the transmitting q-omni antenna 105 (referred to as "estimated received power in Quasi-omni transmission"), based on the calculated value of (EIRP_Beacon−RxGain_ABFT−ADD_GAIN_AP) and the RSSI_Beacon value measured in step S601.

The communication device (STA) 100b also calculates an estimation value of reception power of an SSW frame by the communication device (AP) 100a in a case where the communication device (STA) 100b has transmitted using the transmitting array antenna (directional antenna) 106 (referred to as "estimated received power in directional transmission"), based on the calculated value of (EIRP_Beacon−RxGain_ABFT−ADD_GAIN_AP) and the RSSI_Beacon value measured in step S601.

In step S603, the communication device (STA) 100b determines whether or not the estimated received power in Quasi-omni transmission calculated in step S602 exceeds the sensitivity level power (SENSE_REF). That is to say, determination of the following Expression 14 is performed.

(EIRP_ABFT_Qomni−RxGain_Beacon+RSSI_Beacon)−(EIRP_Beacon−Rx Gain_ABFT−ADD_GAIN_AP)>SENSE_REF    (Expression 14)

Note that the communication device (STA) 100b may calculate the estimated received power in Quasi-omni transmission using the left side of Expression 14 in step S602.

In a case where the estimated received power in Quasi-omni transmission exceeds the sensitivity level power (Yes in S603), the communication device (STA) 100b advances to step S604.

In a case where the estimated received power in Quasi-omni transmission does not exceed the sensitivity level power (No in S603), the communication device (STA) 100b advances to step S610.

In step S604, the communication device (STA) 100b performs the following processing to not perform beamforming training in A-BFT. The communication device (STA) 100b analyzes the received DMG Beacon frame, and determines whether or not A-BFT is scheduled. In a case where A-BFT is not scheduled, the communication device (STA) 100b advances to step S605. In a case where A-BFT is scheduled, the communication device (STA) 100b advances to step S605 after the A-BFT period has been completed.

Note that in a case where A-BFT is scheduled in step S604, the communication device (STA) 100b may advance to step S513 (the transition from step S604 to step S513 is omitted from illustration).

In step S605, the communication device (STA) 100b sets the transmission RF circuit 104 (see FIG. 4) to transmit using the transmitting q-omni antenna 105, and transmits a Probe Request frame.

In step S605, the communication device (STA) 100b may transmit using the format of the Probe Request frame stipulated in the 11ad standard. The communication device (STA) 100b may also include a field indicating that transmission will be performed using the transmitting q-omni antenna 105 in the Probe Request frame, and transmit.

In step S606, the communication device (STA) 100b receives a Probe Response frame transmitted by the communication device (AP) 100a, and the processing ends.

Next, a case where the communication device (STA) 100b has determined in step S603 that the estimated received power in Quasi-omni transmission does not exceed the sensitivity level power will be described.

In step S610, the communication device (STA) 100b determines whether or not the estimated received power in directional transmission calculated in step S602 exceeds the sensitivity level power (SENSE_REF). That is to say, the determination of Expression 13C is performed.

In a case where the estimated received power in directional transmission exceeds the sensitivity level power (Yes in S610), the communication device (STA) 100b advances to step S513. In a case where the estimated received power not exceed the sensitivity level power (No in S610), the communication device (STA) 100b advances to step S520.

Also, in S614, the communication device (STA) 100b determines whether or not the estimated received power in Quasi-omni transmission calculated in step S602 exceeds the sensitivity level power (SENSE_REF), and if exceeding (Yes) advances to step S605, and if not exceeding (No) advances to step S601. The steps in FIG. 41 have thus been described.

Note that in a case where a predetermined amount of time has elapsed from starting the operations of FIG. 41, the communication device (STA) 100b ends the operations of FIG. 41 even if step S606 has not been executed.

As described above, in the reception processing in FIG. 35, the communication device (STA) 100b references the value of the AP Selection Parameter field and judges whether or not to transmit a Probe Request using the transmitting q-omni antenna 105, but in the reception processing in FIG. 41, the communication device (STA) 100b references the value of the Differential Gain field and judges whether or not to transmit a Probe Request using the transmitting q-omni antenna 105.

Also, by performing the reception processing in FIG. 41, in a case of having transmitted a Probe Request frame using the transmitting q-omni antenna 105, the communication device (STA) 100b can omit execution of the BF training in step S513 and S520, in the same way as using the reception processing in FIG. 35, and receive a Probe Response frame. Accordingly, the communication device (STA) 100b can reduce the time required for an active scan, and can complete initial connection operations with the communication device (AP) 100a at an early stage and start data communication.

As described above, the communication device (AP) 100a transmits a DMG Beacon frame including the Differential Gain field, so the communication device (STA) 100b can determine whether or not a Probe Request frame will reach the communication device (AP) 100*a* by Quasi-omni transmission. Accordingly, transmission of unnecessary SSW frames in A-BFT can be avoided, so electric power consumption of the communication device (STA) 100*b* can be reduced, and occurrence of unnecessary interference waves as to other STAs can be reduced.

Summarization of Embodiments

A non-personal basic service point/access point (PCP/AP) communication device according to a first aspect of the present disclosure includes a reception circuit that receives a DMG Beacon frame, a judging circuit that judges whether or not to transmit a frame used for beamforming training (BFT), using information relating to reception antenna gain of a PCP/AP communication device included in a DMG Beacon frame and information relating to reception power of a DMG Beacon frame, and a transmission circuit that transmits the frame used for BFT in a case of the judging circuit having judged to transmit the frame used for BFT.

A non-personal basic service point/access point (PCP/AP) communication method according to a second aspect of the present disclosure includes receiving a DMG Beacon frame, judging whether or not to transmit a frame used for beamforming training (BFT), using information relating to reception antenna gain of a PCP/AP communication device included in a DMG Beacon frame and information relating to reception power of a DMG Beacon frame, and transmitting the frame used for BFT in a case of having judged to transmit the frame used for BFT.

A personal basic service point/access point (PCP/AP) communication device according to a third aspect of the present disclosure includes a frame generating circuit that generates a DMG Beacon frame including information relating to reception antenna gain of a PCP/AP communication device, and a transmission circuit that transmits the DMG Beacon frame in BTI.

A personal basic service point/access point (PCP/AP) communication method according to a fourth aspect of the present disclosure includes generating a DMG Beacon frame including information relating to reception antenna gain of a PCP/AP communication device, and transmitting the DMG Beacon frame in BTI.

Although various embodiments have been described above with reference to the drawings, it is needless to say that the present disclosure is not restricted to these examples. It is clear that one skilled in the art will be able to reach various alterations and modifications within the scope of the Claims, and such should be understood to belong to the technical scope of the present disclosure as a matter of course. Various components in the above-described embodiments may be optionally combined without departing from the essence of the disclosure.

Although examples of configuring the present disclosure using hardware have been described in the above-described embodiments, the present disclosure may be realized by software in cooperation with hardware as well.

The functional blocks used in the description of the above-described embodiments typically are realized as large-scale integration (LSI) that is an integrated circuit having input terminals and output terminals. These may be individually formed into one chip, or part or all may be included in one chip. Also, while description has been made here regarding an LSI, there are different names such as integrated circuit (IC), system LSI, super LSI, and ultra LSI, depending on the degree of integration.

The circuit integration technique is not restricted to LSIs, and dedicated circuits or general-purpose processors may be used to realize the same. An FPGA (Field Programmable Gate Array) which can be programmed after manufacturing the LSI, or a reconfigurable processor where circuit cell connections and settings within the LSI can be reconfigured, may be used.

Further, in the event of the advent of an integrated circuit technology which would replace LSIs by advance of semiconductor technology or a separate technology derived therefrom, such a technology may be used for integration of the functional blocks, as a matter of course. Application of biotechnology, for example, is a possibility.

An aspect of the present disclosure is suitable for a communication system conforming to the 11ay standard.

What is claimed is:

1. A non-personal basic service set control point/access point (non-PCP/AP) communication apparatus, comprising:
    a reception circuit which, in operation, receives a Directional Multi-Gigabit (DMG) Beacon frame including a sector sweep (SSW) field, the SSW field including a Parameter subfield indicating a value obtained by using a transmission Equivalent Isotropic Radiated Power (EIRP) of a PCP/AP communication partner apparatus and a reception antenna gain of the PCP/AP communication partner apparatus;
    an estimation circuit which, in operation, estimates an expected reception power at the PCP/AP communication partner apparatus by using the value of the Parameter subfield, and checks inequality between the estimated expected reception power and a receiver sensitivity value; and
    a transmission circuit which, in operation, transmits a frame for Association Beamforming Training (A-BFT) if the estimated expected reception power is larger than the receive sensitivity value.

2. The non-PCP/AP communication apparatus according to claim 1, wherein if the estimated expected reception power is equal to or less than the receiver sensitivity value, the estimation circuit decides to skip the A-BFT.

3. The non-PCP/AP communication apparatus according to claim 1, wherein the value of the Parameter subfield is obtained by subtracting the reception antenna gain from the transmission EIRP.

4. The non-PCP/AP communication apparatus according to claim 3, wherein the value of the Parameter subfield is obtained by further subtracting an additional gain from the transmission EIRP, the additional gain being a difference between the receiver sensitivity value and an actual receiver sensitivity value.

5. A communication method for a non-personal basic service set control point/access point (non-PCP/AP) communication apparatus, the communication method comprising:
    receiving a Directional Multi-Gigabit (DMG) Beacon frame including a sector sweep (SSW) field, the SSW field including a Parameter subfield indicating a value obtained by using a transmission Equivalent Isotropic Radiated Power (EIRP) of a PCP/AP communication partner apparatus and a reception antenna gain of the PCP/AP communication partner apparatus;
    estimating an expected reception power at the PCP/AP apparatus by using the value of the Parameter subfield;
    checking inequality between the estimated expected reception power and a receiver sensitivity value; and transmitting a frame for Association Beamforming Training (A-BFT) if the estimated expected reception power is larger than the receive sensitivity value.

6. The communication method according to claim 5, wherein if the estimated expected reception power is equal to or less than the receiver sensitivity value, the communication method includes deciding to skip the A-BFT.

7. The communication method according to claim 5, wherein the value of the Parameter subfield is obtained by subtracting the reception antenna gain from the transmission EIRP.

8. The communication method according to claim 7, wherein the value of the Parameter subfield is obtained by further subtracting an additional gain from the transmission EIRP, the additional gain being a difference between the receiver sensitivity value and an actual receiver sensitivity value.

\* \* \* \* \*